United States Patent [19]

Richards et al.

[11] 4,409,621
[45] Oct. 11, 1983

[54] METHOD AND APPARATUS FOR COMPACTING AND DECOMPACTING CHARACTER IN ACCORDANCE WITH A VARIETY OF METHODS

[75] Inventors: John S. Richards; Alan G. DePaoli, both of Bolingbrook, Ill.

[73] Assignee: Information International, Inc., Culver City, Calif.

[21] Appl. No.: 51,945

[22] Filed: Jun. 25, 1979

Related U.S. Application Data

[62] Division of Ser. No. 908,772, May 23, 1978.

[51] Int. Cl.³ .............................................. H04N 7/12
[52] U.S. Cl. .................................... 358/260; 358/261
[58] Field of Search ................................ 358/260, 261

[56] References Cited

U.S. PATENT DOCUMENTS 3,394,352  7/1968  Wernikoff et al. .................. 358/261
3,830,966  8/1974  Aldrich et al. ...................... 358/261

FOREIGN PATENT DOCUMENTS 1432935  4/1976  United Kingdom ................ 358/260

Primary Examiner—Joseph A. Orsino, Jr.
Attorney, Agent, or Firm—Mason, Fenwick & Lawrence

[57] ABSTRACT

There is described method and apparatus for use in phototypesetting operations wherein a character is scanned by a plurality of scans or strokes of a light spot output of a cathode ray tube (CRT) of the phototypesetting apparatus, and output signals derived from a photosensor device in response to the light spot, are compacted to be stored in a magnetic storage device. In particular, each stroke is examined to determine which method of a plurality of compacting methods will produce the smallest quantity of image data, thus requiring the minimum storage area within the storage device.

32 Claims, 49 Drawing Figures

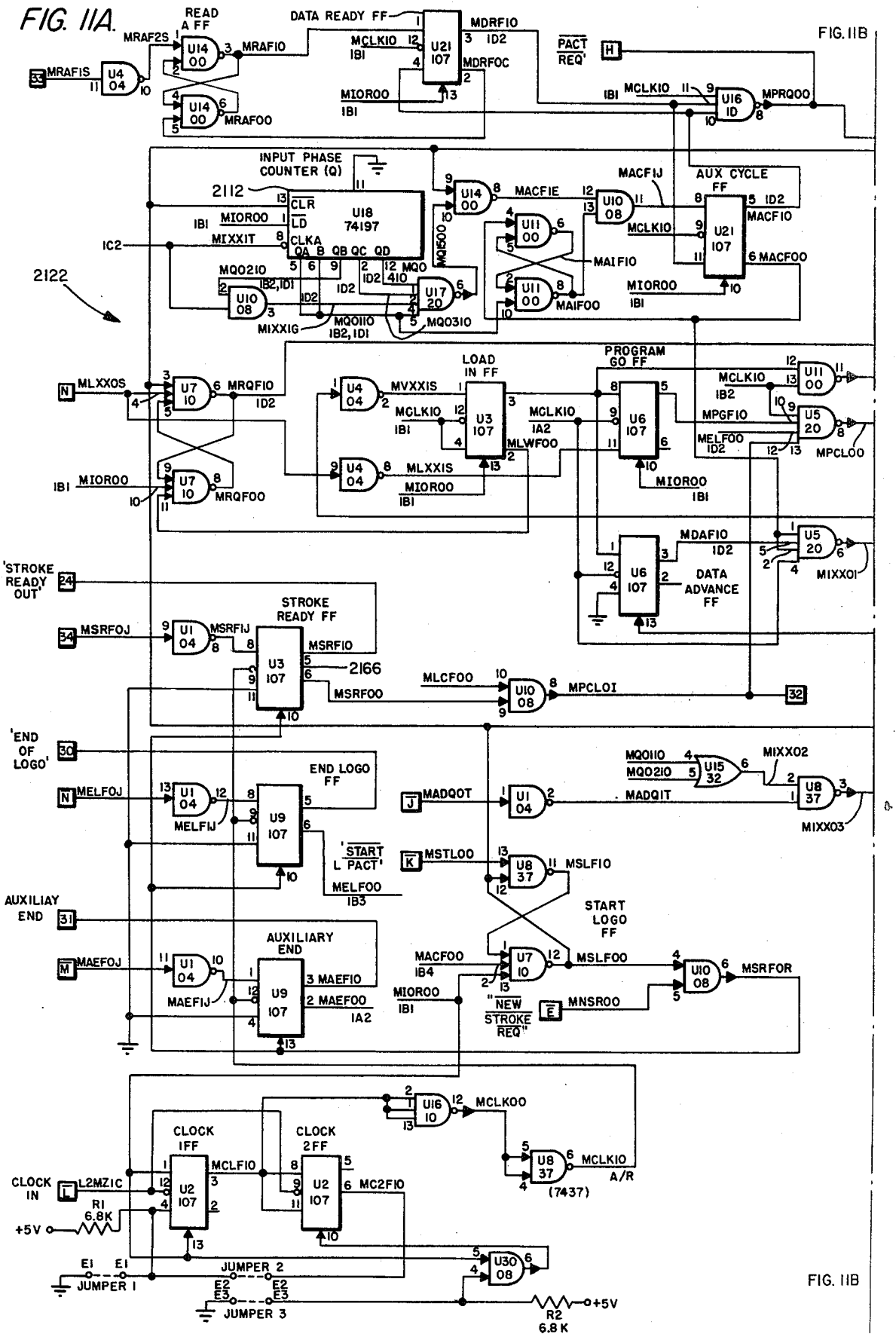

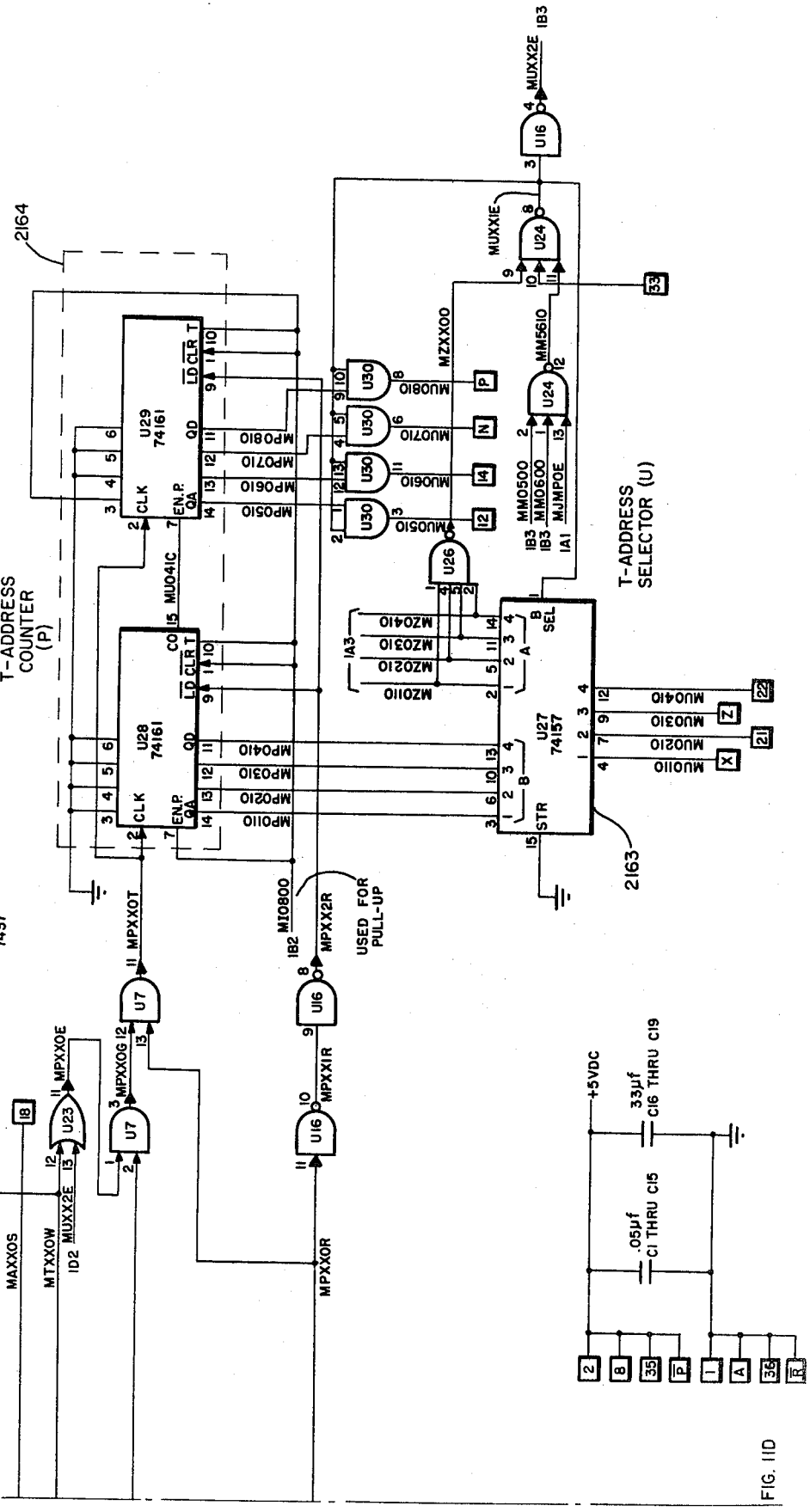

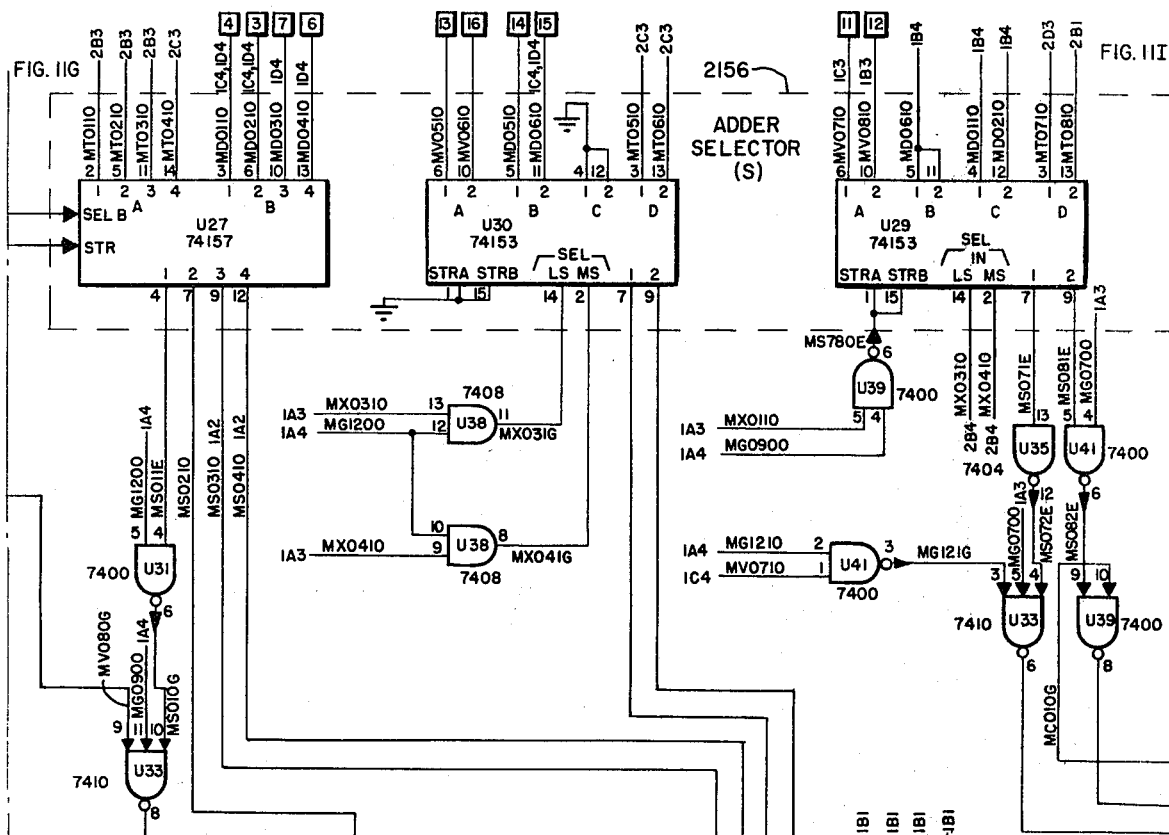
FIG. 11H.
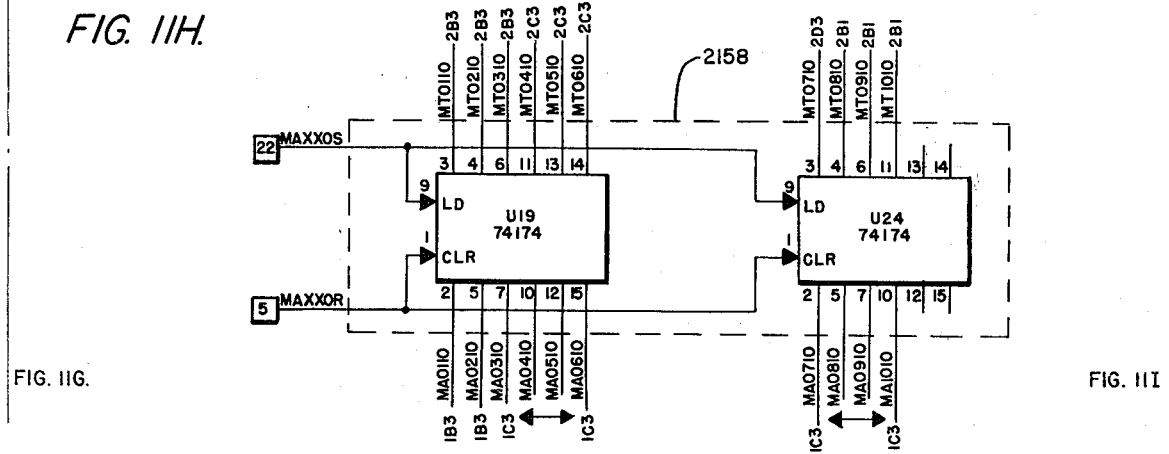

FIG. 12A.

ROM.P , REV. 6
10/07/76

| Start Addr. | OP. No. | Program Operation | Addr. | Mnemonic | Program Instruction ROM Output MZ0810-MZ0110 | Instruction Meaning |
|---|---|---|---|---|---|---|
| 0 | 0 | INITIAL SHIFT OF 8 BITS | 0 | CLA | 01110011 | CLEAR A |
|  |  |  | 1 | CLP | 01110100 | CLEAR P TO 16 |
|  |  |  | 2 | EGS(01) | 11000001 | END, GO TO STATE 1 |
| 4 | 1 | LOAD LAAL, BITS 1-8 | 4 | SEL1 | 00000001 | D01 D02 D03 D04 V05 V06 V07 V08 0 0 0 0 0 0 0 0 (LAAL) |
|  |  |  | 5 | LTT(00) | 01010000 | LOAD INTO T(00) (LAAL) |
|  |  |  | 6 | EGS(02) | 11000010 | END, GO TO STATE 2 |
| 8 | 2 | LOAD LAAL, BITS 9, 10 | 8 | LAT(00) | 01100000 | LOAD T(00) INTO A (LAAL) |
|  |  |  | 9 | SEL10 | 00001010 | 0 0 0 0 0 0 0 0 0 D01 D02 0 0 0 0 0 (LAAL) |
|  |  |  | 10 | LTT(00) | 01010000 | LOAD INTO T(00) (LAAL) |
|  |  |  | 11 | EGS(03) | 11000011 | END, GO TO STATE 3 |
| 12 | 3 | LOAD UAAL, BITS 1-8 (COMPL.) | 12 | SEL1 | 00000001 | D01 D02 D03 D04 V05 V06 V07 V08 0 0 0 0 0 0 0 0 (UAAL) |
|  |  |  | 13 | CLA | 01110011 | CLEAR A |
|  |  |  | 14 | LTT(01) | 01010001 | LOAD INTO T(01) (UAAL) |
|  |  |  | 15 | EGS(04) | 11000100 | END, GO TO STATE 4 |
| 16 | 4 | LOAD UAAL, BITS 9, 10 | 16 | LAT(01) | 01100001 | LOAD T(01) INTO A (UAAL) |
|  |  |  | 17 | SEL10 | 00001010 | 0 0 0 0 0 0 0 0 0 D01 D02 0 0 0 0 0 (UAAL) |
|  |  |  | 18 | LTT(01) | 01010001 | LOAD INTO T(01) (UAAL) |
|  |  |  | 19 | EGS(05) | 11000101 | END, GO TO STATE 5 |
| 20 | 5 | P/WORD 1 (0), NOP | 20 | EGS(05) | 11000101 | END, GO TO STATE 5 |
| 24 | 6 | P/WORD 1 (1), REPEAT METHOD | 24 | CLP | 01110100 | CLEAR P TO 16 |
|  |  |  | 25 | EGS(06) | 11000110 | END, GO TO STATE 6 |
| 28 | 7 | P/WORD 1 (2), DELTA 2 METHOD | 28 | CLP | 01110100 | CLEAR P TO 16 |
|  |  |  | 29 | EGS(07) | 11000111 | END, GO TO STATE 7 |

FIG. 12B.

| | | | | |
|---|---|---|---|---|
| 32 | 8 | P/WORD 1 (3), DELTA 3 METHOD | | |
| | | 32 | CLP | 01110100 | CLEAR P TO 16 |
| | | 33 | EGS(08) | 11001000 | END, GO TO STATE 8 |
| 36 | 9 | P/WORD 1 (4), DELTA 4 METHOD | | |
| | | 36 | CLP | 01110100 | CLEAR P TO 16 |
| | | 37 | EGS(09) | 11001001 | END, GO TO STATE 9 |
| 40 | 10 | P/WORD 1 (5), SECTOR TRANS METHOD | | |
| | | 40 | CLP | 01110100 | CLEAR P TO 16 |
| | | 41 | LAT(00) | 01100000 | LOAD T(00) INTO A (LAAL) |
| | | 42 | SEL8 | 00001000 | 0   0   0   0   0   0   0   0 |
| | | 43 | LTT(06) | 01010110 | LOAD INTO T(06) (STROKE IN PROGRESS) |
| | | 44 | EGS(10) | 11001010 | END, GO TO STATE 10 |
| 48 | 11 | P/WORD 1 (6), AUTO-SECTOR METHOD | | |
| | | 48 | CLP | 01110100 | CLEAR P TO 16 |
| | | 49 | LAT(00) | 01100000 | LOAD T(00) INTO A (LAAL) |
| | | 50 | SEL8 | 00001000 | 0   0   0   0   0   0   0   0 |
| | | 51 | LTT(06) | 01010110 | LOAD INTO T(06) (STROKE IN PROGRESS) |
| | | 52 | EGS(12) | 11001100 | END, GO TO STATE 12 |
| 56 | 12 | P/WORD 1 (7), VECTOR 3 METHOD | | |
| | | 56 | CLP | 01110100 | CLEAR P TO 16 |
| | | 57 | LAT(00) | 01100000 | LOAD T(00) INTO A (LAAL) |
| | | 58 | SEL8 | 00001000 | 0   0   0   0   0   0   0   0 |
| | | 59 | LTT(06) | 01010110 | LOAD INTO T(06) (STROKE IN PROGRESS) |
| | | 60 | EGS(13) | 11001101 | END, GO TO STATE 13 |
| 64 | 13 | P/WORD 1 (8), CONTROL WORD | | |
| | | 64 | EGS(17) | 11010001 | END, GO TO STATE 17 |
| 68 | 14 | P/REPEAT VALUE | | |
| | | 68 | CLA | 01110011 | CLEAR A |
| | | 69 | SEL1 | 00000001 | D01 D02 D03 D04 V05 V06 V07 V08   0   0   0   0 |
| | | 70 | LTT(02) | 01010010 | LOAD INTO T(02) (REPEAT COUNT) |
| | | 71 | EGS(18) | 11010010 | END, GO TO STATE 18 |
| 72 | 15 | REPEAT COUNTDOWN | | |
| | | 72 | LAT(02) | 01100010 | LOAD T(02) INTO A (REPEAT COUNT) |
| | | 73 | SEL5 | 00000101 | D01 D02 D03 D04 D05 D06 D06 D06 D06   0   0   0 |
| | | 74 | LTT(02) | 01010010 | LOAD INTO T(02) (REPEAT COUNT) |
| | | 75 | LAT(02) | 01100010 | LOAD INTO A (REPEAT COUNT) |
| | | 76 | JH(02) | 10010010 | JUMP 4 IF A+SEL<1024 @ T=T(02) |
| | | 77 | CLP | 01110100 | CLEAR P TO 16 |

FIG. 12C

| | | | | | |
|---|---|---|---|---|---|
| 16 | 84 | | | | 2/ DELTA VALUE |
| | | 78 | SSRF | 01110000 | SET STROKE READY FLIP-FLOP |
| | | 79 | EGS(18) | 11010010 | END, GO TO STATE 18 |
| | | 80 | CLP | 01110100 | CLEAR P TO 16 |
| | | 81 | SSRF | 01110000 | SET STROKE READY FLIP-FLOP |
| | | 82 | EGS(05) | 11000101 | END, GO TO STATE 5 |
| | | 84 | LAT(P) | 01101111 | LOAD T(P) INTO A |
| | | 85 | SEL5 | 00000101 | D01 D02 D03 D04 D05 D06 D06 D06 D06 0 |
| | | 86 | LTT(P) | 01011111 | LOAD INTO T(P), INCREMENT P |
| | | 87 | JT(P) | 10101111 | JUMP 4 IF T11=1 @ T(P) |
| | | 88 | EGS(07) | 11000111 | END, GO TO STATE 7 |
| | | 89 | NOP | 01111111 | NO OPERATION |
| | | 90 | NOP | 01111111 | NO OPERATION |
| | | 91 | EGS(19) | 11010011 | END, GO TO STATE 19 |
| 17 | 92 | | | | STROKE READY, GENERAL |
| | | 92 | CLA | 01110011 | CLEAR A |
| | | 93 | SEL6 | 00000110 | D01 D02 D03 D04 D05 D06 0 0 0 1 |
| | | 94 | LTT(P) | 01011111 | LOAD INTO T(P), INCREMENT P |
| | | 95 | CLP | 01110100 | CLEAR P TO 16 |
| | | 96 | SSRF | 01110000 | SET STROKE READY FLIP-FLOP |
| | | 97 | EGS(05) | 11000101 | END, GO TO STATE 5 |
| 18 | 100 | | | | 3/DELTA VALUE |
| | | 100 | LAT(P) | 01101111 | LOAD T(P) INTO A |
| | | 101 | SEL5 | 00000101 | D01 D02 D03 D04 D05 D06 D06 D06 D06 0 |
| | | 102 | LTT(P) | 01011111 | LOAD INTO T(P), INCREMENT P |
| | | 103 | JT(P) | 10101111 | JUMP 4 IF T11=1 @ T(P) |
| | | 104 | EGS(08) | 11001000 | END, GO TO STATE 8 |
| | | 105 | NOP | 01111111 | NO OPERATION |
| | | 106 | NOP | 01111111 | NO OPERATION |
| | | 107 | EGS(23) | 11010111 | END, GO TO STATE 23 |
| 19 | 108 | | | | 4/ DELTA VALUE |
| | | 108 | LAT(P) | 01101111 | LOAD T(P) INTO A |
| | | 109 | SEL5 | 00000101 | D01 D02 D03 D04 D05 D06 D06 D06 D06 0 |
| | | 110 | LTT(P) | 01011111 | LOAD INTO T(P), INCREMENT P |
| | | 111 | JT(P) | 10101111 | JUMP 4 IF T11=1 @ T(P) |
| | | 112 | EGS(09) | 11001001 | END, GO TO STATE 9 |
| | | 113 | NOP | 01111111 | NO OPERATION |
| | | 114 | NOP | 01111111 | NO OPERATION |
| | | 115 | EGS(19) | 11010011 | END, GO TO STATE 19 |
| 20 | 116 | | | | SECTOR BYTE LOAD |
| | | 116 | CLA | 01110011 | CLEAR A |

FIG. 12D.

|  |  |  |  |  |  |
|---|---|---|---|---|---|
|  | 21 | SECT TRANS VALUE, NO JUMP | | | |
| 124 | | 117 | SEL1 | 00000001 | D01 D02 D03 D04 V05 V06 V07 V08 0 0 0 |
|  | | 118 | LE | 01110001 | LOAD E REG |
|  | | 119 | SCCF | 01111000 | SET CLOCK C FLIP-FLOP |
|  | | 120 | NOP | 01111111 | NO OPERATION |
|  | | 121 | LAT(00) | 01100000 | LOAD T(00) INTO A (LAAL) |
|  | | 122 | EGS(11) | 11001011 | END, GO TO STATE 11 |
|  | 22 | SECT TRANS VALUE, JUMP | | | |
| 128 | | 124 | SEL12 | 00001100 | V08 D02 D03 D04 V05 V06 V07 C01 C02 C03 0 |
|  | | 125 | LTI(P) | 01011111 | LOAD INTO T(P), INCREMENT P |
|  | | 126 | EGS(11) | 11001011 | END, GO TO STATE 11 |
|  | | 128 | SEL12 | 00001100 | V08 D02 D03 D04 V05 V06 V07 C01 C02 C03 0 |
|  | | 129 | LTI(P) | 01011111 | LOAD INTO T(P), INCREMENT P |
|  | | 130 | CKCE | 01110010 | SET CLOCK C FF, CLOCK C AND E |
|  | | 131 | NOP | 01111111 | NO OPERATION |
|  | | 132 | JC | 10000000 | JUMP 4 IF C04=1 |
|  | | 133 | EGS(11) | 11001011 | END, GO TO STATE 11 |
|  | | 134 | NOP | 01111111 | NO OPERATION |
|  | | 135 | NOP | 01111111 | NO OPERATION |
|  | | 136 | EGS(19) | 11010011 | END, GO TO STATE 19 |
|  | 23 | AUTO-SECTOR TRANS VALUES 0-11 | | | |
| 140 | | 140 | LAT(06) | 01100110 | LOAD T(06) INTO A (STROKE IN PROGRESS) |
|  | | 141 | SEL4 | 00000100 | D01 D02 D03 D04 D05 D06 0 0 0 0 |
|  | | 142 | LTI(06) | 01010110 | LOAD INTO T(06) (STROKE IN PROGRESS) |
|  | | 143 | LTI(P) | 01011111 | LOAD INTO T(P), INCREMENT P |
|  | | 144 | EGS(12) | 11001100 | END, GO TO STATE 12 |
|  | 24 | AUTO-SECTOR TRANSITION JUMPS 12,24,48 | | | |
| 148 | | 148 | LAT(06) | 01100110 | LOAD T(06) INTO A (STROKE IN PROGRESS) |
|  | | 149 | SEL4 | 00000100 | D01 D02 D03 D04 D05 D06 0 0 0 0 |
|  | | 150 | LTI(06) | 01010110 | LOAD INTO T(06) (STROKE IN PROGRESS) |
|  | | 151 | LAT(06) | 01100110 | LOAD T(06) INTO A (STROKE IN PROGRESS) |
|  | | 152 | EGS(12) | 11001100 | END, GO TO STATE 12 |
|  | 25 | AUTO-SECTOR TRANSITION JUMP 96 | | | |
| 156 | | 156 | LAT(06) | 01100110 | LOAD T(06) INTO A (STROKE IN PROGRESS) |
|  | | 157 | SEL7 | 00000111 | D01 D02 D03 D04 D05 D06 1 0 0 0 |
|  | | 158 | LTI(06) | 01010110 | LOAD INTO T(06) (STROKE IN PROGRESS) |
|  | | 159 | JH(01) | 10010001 | JUMP 4 IF A+SEL<1024 @ T=T(01) |
|  | | 160 | EGS(19) | 11010011 | END, GO TO STATE 19 |
|  | | 161 | NOP | 01111111 | NO OPERATION |
|  | | 162 | NOP | 01111111 | NO OPERATION |

FIG. 12E.

| | | | | | |
|---|---|---|---|---|---|
| 172 | 26 | VECTOR 3, VECTORS 2-12 | | | |
| | | 163 | LAT(06) | 01100110 | LOAD T(06) INTO A (STROKE IN PROGRESS) |
| | | 164 | SEL13 | 00001101 | T01 T02 T03 T04 T05 T06 T07 T08 T09 T10 0 |
| | | 165 | JH(01) | 10010001 | JUMP 4 IF A+SEL<1024 @ T=T(01) |
| | | 166 | EGS(19) | 11010011 | END, GO TO STATE 19 |
| | | 167 | NOP | 01111111 | NO OPERATION |
| | | 168 | NOP | 01111111 | NO OPERATION |
| | | 169 | EGS(12) | 11001100 | END, GO TO STATE 12 |
| | | 172 | LAT(06) | 01100110 | LOAD T(06) INTO A (STROKE IN PROGRESS) |
| | | 173 | SEL4 | 00000100 | D01 D02 D03 D04 D05 D06 0 0 0 0 0 |
| | | 174 | LTT(06) | 01010110 | LOAD INTO T(06) (STROKE IN PROGRESS) |
| | | 175 | LTT(P) | 01011111 | LOAD INTO T(P), INCREMENT P |
| | | 176 | EGS(13) | 11001101 | END, GO TO STATE 13 |
| 180 | 27 | VECTOR 3, 3-BIT WORD 2 FOLLOWS | | | |
| | | 180 | EGS(14) | 11001110 | END, GO TO STATE 14 |
| 184 | 28 | VECTOR 3, 6-BIT WORD 2 FOLLOWS | | | |
| | | 184 | EGS(15) | 11001111 | END, GO TO STATE 15 |
| 188 | 29 | VECTOR 3, JUMPS 64, 128, 832 | | | |
| | | 188 | LAT(06) | 01100110 | LOAD T(06) INTO A (STROKE IN PROGRESS) |
| | | 189 | SEL11 | 00001011 | 0 0 0 0 0 D01 D02 D03 D04 0 |
| | | 190 | LTT(06) | 01010110 | LOAD INTO T(06) (STROKE IN PROGRESS) |
| | | 191 | JH(01) | 10010001 | JUMP 4 IF A+SEL<1024 @ T=T(01) |
| | | 192 | EGS(20) | 11010100 | END, GO TO STATE 20 |
| | | 193 | NOP | 01111111 | NO OPERATION |
| | | 194 | NOP | 01111111 | NO OPERATION |
| | | 195 | LAT(06) | 01100110 | LOAD T(06) INTO A (STROKE IN PROGRESS) |
| | | 196 | SEL13 | 00001101 | T01 T02 T03 T04 T05 T06 T07 T08 T09 T10 0 |
| | | 197 | JH(01) | 10010001 | JUMP 4 IF A+SEL<1024 @ T=T(01) |
| | | 198 | EGS(20) | 11010100 | END, GO TO STATE 20 |
| | | 199 | NOP | 01111111 | NO OPERATION |
| | | 200 | NOP | 01111111 | NO OPERATION |
| | | 201 | EGS(13) | 11001101 | END, GO TO STATE 13 |
| 204 | 30 | VECTOR 3, STROKE READY | | | |
| | | 204 | CLA | 01110011 | CLEAR A |
| | | 205 | SEL6 | 00000110 | D01 D02 D03 D04 D05 D06 0 0 0 0 0 |
| | | 206 | LTT(P) | 01011111 | LOAD INTO T(P), INCREMENT P |
| | | 207 | CLP | 01110100 | CLEAR P TO 16 |
| | | 208 | SSRF | 01110000 | SET STROKE READY FLIP-FLOP |
| | | 209 | EGS(21) | 11010101 | END, GO TO STATE 21 |

```
 31  212  VECTOR 3, VECTORS 13-15, 29-31, 45-47, 61-63
         212  LAT(06)   01100110   LOAD T(06) INTO A (STROKE IN PROGRESS)
         213  SEL2      00000010   D01 D02 D03 D04 V05 V06 0 0 0 0
         214  LTT(06)   01010110   LOAD INTO T(06) (STROKE IN PROGRESS)
         215  LTT(P)    01011111   LOAD INTO T(P), INCREMENT P
         216  EGS(13)   11001101   END, GO TO STATE 13

32  220  VECTOR 3, VECTORS 16, 17, 32, 33, 48, 49, 64, 65
         220  LAT(06)   01100110   LOAD TO T(06) INTO A (STROKE IN PROGRESS)
         221  SEL2      00000010   D01 D02 D03 D04 V05 V06 0 0 0 0
         222  JV        10110000   JUMP 4 IF V05 AND V06 ARE ZERO
         223  LTT(06)   01010110   LOAD INTO T(06) (STROKE IN PROGRESS)
         224  LTT(P)    01011111   LOAD INTO T(P), INCREMENT P
         225  EGS(13)   11001101   END, GO TO STATE 13
         226  SEL7      00000111   D01 D02 D03 D04 D05 D06 1 0 0 0
         227  LTT(06)   01010110   LOAD INTO T(06) (STROKE IN PROGRESS)
         228  LTT(P)    01011111   LOAD INTO T(P), INCREMENT P
         229  EGS(13)   11001101   END, GO TO STATE 13

33  232  VECTOR 3, END OF METHOD ROUTINE, VECTORS 18, 34, 50
         232  LAT(06)   01100110   LOAD T(06) INTO A (STROKE IN PROGRESS)
         233  SEL2      00000010   D01 D02 D03 D04 V05 V06 0 0 0 0
         234  JV        10110000   JUMP 4 IF V05 AND V06 ARE ZERO
         235  LTT(06)   01010110   LOAD INTO T(06) (STROKE IN PROGRESS)
         236  LTT(P)    01011111   LOAD INTO T(P), INCREMENT P
         237  EGS(13)   11001101   END, GO TO STATE 13
         238  EGS(22)   11010110   END, GO TO STATE 22

34  240  VECTOR 3, JUMPS 192-768, VECTORS 19-28, 35-44, 51-60
         240  LAT(06)   01100110   LOAD T(06) INTO A (STROKE IN PROGRESS)
         241  SEL2      00000010   D01 D02 D03 D04 V05 V06 0 0 0 0
         242  JV        10110000   JUMP 4 IF V05 AND V06 ARE ZERO
         243  LTT(06)   01010110   LOAD INTO T(06) (STROKE IN PROGRESS)
         244  LTT(P)    01011111   LOAD INTO T(P), INCREMENT P
         245  EGS(13)   11001101   END, GO TO STATE 13
         246  SEL11     00001011   0  0  0  0  0  D01 D02 D03 D04
         247  LTT(06)   01010110   LOAD INTO T(06) (STROKE IN PROGRESS)
         248  EGS(13)   11001101   END, GO TO STATE 13

35  252  ERROR STATE
         252  CLA       01110011   CLEAR A
         253  CAUXFFS   01111101   CLEAR 4 AUX FFS
         254  SAUXIFF   01111001   SET AUXILIARY 1 FF
         255  SELF      01110110   SET END OF LOGO FLIP-FLOP
         256  EGS(00)   11000000   END, GO TO STATE 0
```

FIG. 12F.

| | | | | | | | |
|---|---|---|---|---|---|---|---|
| 260 | 36 | P/CONTROL, NO OPERATION | | | | | |
| | | 260 | EGS(05) | 11000101 | END, GO TO STATE 5 | | 1 |
| 264 | 37 | P/CONTROL, END OF LOGO | | | | | |
| | | 264 | CLA | 01110011 | CLEAR A | | |
| | | 265 | SELF | 01110110 | SET END OF LOGO FLIP-FLOP | | 0 |
| | | 266 | EGS(00) | 11000000 | END, GO TO STATE 0 | | 0 |
| 268 | 38 | STROKE READY, NO TRANSITIONS | | | | | |
| | | 268 | CLA | 01110011 | CLEAR A | | |
| | | 269 | CLP | 01110100 | CLEAR P TO 16 | | |
| | | 270 | SEL6 | 00001110 | D01 D02 D03&D04 D05 D06 | 0 | 0 |
| | | 271 | LTT(P) | 01011111 | LOAD INTO T(P), INCREMENT P | | |
| | | 272 | CLP | 01110100 | CLEAR P TO 16 | | |
| | | 273 | SSRF | 01110000 | SET STROKE READY FLIP-FLOP | | |
| | | 274 | EGS(05) | 11000101 | END, GO TO STATE 5 | | 1 |
| 276 | 39 | ADVANCE TO NEXT FOUR-BIT BOUNDARY | | | | | |
| | | 276 | ADV | 01110111 | ADVANCE TO 4-BIT BOUNDARY | | |
| | | 277 | ADV | 01110111 | ADVANCE TO 4-BIT BOUNDARY | | |
| | | 278 | ADV | 01110111 | ADVANCE TO 4-BIT BOUNDARY | | |
| | | 279 | EGS(05) | 11000101 | END, GO TO STATE 5 | | |
| 280 | 40 | 3/DELTA STROKE READY | | | | | |
| | | 280 | CLA | 01110011 | CLEAR A | | |
| | | 281 | SEL6 | 00000110 | D01 D02 D03 D04 D05 D06 | 0 | 0 |
| | | 282 | LTT(P) | 01011111 | LOAD INTO T(P), INCREMENT P | | |
| | | 283 | CLP | 01110100 | CLEAR P TO 16 | | |
| | | 284 | SSRF | 01110000 | SET STROKE READY FLIP-FLOP | | |
| | | 285 | EGS(22) | 11010110 | END, GO TO STATE 22 | | 1 |

FIG. 12G.

| STATE DEFINITION | STATE | WORD SIZE | GO TO OPERATION NO: 00 01 02 03 04 05 06 07 08 09 10 11 12 13 14 15 | DATA WORD IN 00 01 02 03 04 05 06 07 08 09 10 11 12 13 14 15 | DATA WORD OUT (6 BITS) |
|---|---|---|---|---|---|
| INITIAL SHIFT IN | 00 | 8 | 00 00 00 00 00 00 00 00 00 00 00 00 00 00 00 00 | XX XX XX XX XX XX XX XX XX XX XX XX XX XX XX XX | |
| INITIALIZE, WORD 1 | 01 | 8 | 01 01 01 01 01 01 01 01 01 01 01 01 01 01 01 01 | 00 01 02 03 04 05 06 07 08 09 10 11 12 13 14 15 | |
| INITIALIZE, WORD 2 | 02 | 2 | 02 02 02 02 02 02 02 02 02 02 02 02 02 02 02 02 | 00 01 02 03 04 05 06 07 08 09 10 11 12 13 14 15 | |
| INITIALIZE, WORD 3 | 03 | 8 | 03 03 03 03 03 03 03 03 03 03 03 03 03 03 03 03 | 00 01 02 03 04 05 06 07 08 09 10 11 12 13 14 15 | |
| INITIALIZE, WORD 4 | 04 | 2 | 04 04 04 04 04 04 04 04 04 04 04 04 04 04 04 04 | 00 01 02 03 04 05 06 07 08 09 10 11 12 13 14 15 | |
| METHOD NUMBER WORD | 05 | 4 | 05 06 07 08 09 10 11 12 13 35 35 35 35 35 35 35 | XX XX XX XX XX XX XX XX XX XX XX XX XX XX XX XX | |
| REPEAT COUNT | 06 | 8 | 14 14 14 14 14 14 14 14 14 14 14 14 14 14 14 14 | 00 01 02 03 04 05 06 07 08 09 10 11 12 13 14 15 | |
| DELTA 2 WORD IN | 07 | 2 | 16 16 16 16 16 16 16 16 16 16 16 16 16 16 16 16 | 62 63 00 01 62 63 00 01 62 63 00 01 62 63 00 01 | |
| DELTA 3 WORD IN | 08 | 3 | 18 18 18 18 18 18 18 18 18 18 18 18 18 18 18 18 | 60 61 62 63 00 01 02 03 60 61 62 63 00 01 02 03 | |
| DELTA 4 WORD IN | 09 | 4 | 19 19 19 19 19 19 19 19 19 19 19 19 19 19 19 19 | 56 57 58 59 60 61 62 63 00 01 02 03 04 05 06 07 | |
| ST METHOD, SECTOR WORD | 10 | 8 | 20 20 20 20 20 20 20 20 20 20 20 20 20 20 20 20 | 00 01 02 03 04 05 06 07 08 09 10 11 12 13 14 15 | |
| ST METHOD, WORD IN | 11 | 8 | 21 22 21 22 21 22 21 22 21 22 21 22 21 22 21 22 | 00 01 02 03 04 05 06 07 08 09 10 11 12 13 14 15 | |
| AUTOSECTOR TRANSITION | 12 | 4 | 23 23 23 23 23 23 23 23 23 23 23 23 23 23 23 23 | 00 01 02 03 04 05 06 07 08 09 10 11 12 24 48 32 | |
| VECTOR 3, WORD 1 | 13 | 3 | 26 26 26 26 27 28 26 26 26 27 28 26 26 26 27 28 | 03 04 05 06 07 08 XX XX 03 04 05 06 07 08 XX XX | |
| VECTOR 3, WORD 2 | 14 | 3 | 26 26 26 26 29 26 26 26 26 29 26 26 26 26 29 26 | 02 09 10 11 12 13 02 09 10 11 12 13 02 09 10 11 | |
| VECTOR 3, WORD 3 | 15 | 6 | 32 33 34 34 34 34 31 31 32 33 34 34 34 34 31 31 | 00 01 02 03 04 05 06 07 00 01 02 03 04 05 06 07 | |
| ERROR STATE | 16 | 0 | 35 35 35 35 35 35 35 35 35 35 35 35 35 35 35 35 | XX XX XX XX XX XX XX XX XX XX XX XX XX XX XX XX | |
| CONTROL WORD IN | 17 | 4 | 36 37 35 38 35 35 35 35 35 35 35 35 35 35 35 35 | XX XX 01 XX XX XX XX XX XX XX XX XX XX XX XX XX | |
| REPEAT COUNTDOWN | 18 | 0 | 15 15 15 15 15 15 15 15 15 15 15 15 15 15 15 15 | 63 63 63 63 63 63 63 63 63 63 63 63 63 63 63 63 | |
| STROKE READY, GENERAL | 19 | 0 | 17 17 17 17 17 17 17 17 17 17 17 17 17 17 17 17 | 01 01 01 01 01 01 01 01 01 01 01 01 01 01 01 01 | |
| STROKE READY, VECTOR 3 | 20 | 0 | 30 30 30 30 30 30 30 30 30 30 30 30 30 30 30 30 | 01 01 01 01 01 01 01 01 01 01 01 01 01 01 01 01 | |
| VECTOR 3, NEXT STROKE | 21 | 0 | 12 12 12 12 12 12 12 12 12 12 12 12 12 12 12 12 | XX XX XX XX XX XX XX XX XX XX XX XX XX XX XX XX | |
| ADVANCE TO 4-BIT BOUNDARY | 22 | 0 | 39 39 39 39 39 39 39 39 39 39 39 39 39 39 39 39 | XX XX XX XX XX XX XX XX XX XX XX XX XX XX XX XX | |
| STROKE READY, DELTA 3 | 23 | 0 | 40 40 40 40 40 40 40 40 40 40 40 40 40 40 40 40 | 01 01 01 01 01 01 01 01 01 01 01 01 01 01 01 01 | |
| | 24 | 0 | 35 35 35 35 35 35 35 35 35 35 35 35 35 35 35 35 | XX XX XX XX XX XX XX XX XX XX XX XX XX XX XX XX | |
| | 25 | 0 | 35 35 35 35 35 35 35 35 35 35 35 35 35 35 35 35 | XX XX XX XX XX XX XX XX XX XX XX XX XX XX XX XX | |
| | 26 | 0 | 35 35 35 35 35 35 35 35 35 35 35 35 35 35 35 35 | XX XX XX XX XX XX XX XX XX XX XX XX XX XX XX XX | |
| | 27 | 0 | 35 35 35 35 35 35 35 35 35 35 35 35 35 35 35 35 | XX XX XX XX XX XX XX XX XX XX XX XX XX XX XX XX | |
| | 28 | 0 | 35 35 35 35 35 35 35 35 35 35 35 35 35 35 35 35 | XX XX XX XX XX XX XX XX XX XX XX XX XX XX XX XX | |
| | 29 | 0 | 35 35 35 35 35 35 35 35 35 35 35 35 35 35 35 35 | XX XX XX XX XX XX XX XX XX XX XX XX XX XX XX XX | |
| | 30 | 0 | 35 35 35 35 35 35 35 35 35 35 35 35 35 35 35 35 | XX XX XX XX XX XX XX XX XX XX XX XX XX XX XX XX | |
| | 31 | 0 | 35 35 35 35 35 35 35 35 35 35 35 35 35 35 35 35 | XX XX XX XX XX XX XX XX XX XX XX XX XX XX XX XX | |

XX=DON'T CARE

FIG. 13.

METHOD AND APPARATUS FOR COMPACTING AND DECOMPACTING CHARACTER IN ACCORDANCE WITH A VARIETY OF METHODS

This is a division of application Ser. No. 908,772, filed May 23, 1978.

BACKGROUND OF THE INVENTION

1. Field of the Invention

The present invention relates to methods and apparatus for use in phototypesetting apparatus and more particularly to such methods and apparatus for compacting or encoding character data in one of a variety of methods that will result in the smallest quantity of character data.

2. Description of the Prior Art

In phototypesetting apparatus marketed under the trade name "METRO SET" by the assignee of the present application, photosensitive material (film or paper) is directly exposed by the light output of a cathode ray tube which is provided with a fiber optic faceplate which is the face of the tube for culminating the light output therefrom for increasing the efficiency of light transfer to the photosensitive material, minimizing the light spot size and accurately exposing the photosensitive material. The copy which is to be phototypeset is inputted into the apparatus via punched paper tape, magnetic tape, or direct computer link, which, in addition to its information content, selects the style, case, size, position (both vertically and horizontally) and slant of letters, if desired, of the type to be phototypeset. Stored in the apparatus on a magnetic disc are digital instructions for reproducing copy in up to one hundred master-type fonts of a common size. Under the control of a digital computer and in response to the input information, the scanning operation of the cathode ray tube is performed to sequentially access the coordinate points of the cathode ray tube screen with the digital instructions stored in the magnetic disc being outputted to processing circuitry for determining the light output of the cathode ray tube. The light output of the cathode ray tube as generated across the fiber optic faceplate thereof is representative of a line of type being set from left to right, with an individual letter being formed, for example, from the bottom to the top. The photosensitive material is exposed in response to the spot of light output of the cathode ray tube and is mechanically transported across the face of the fiber optic faceplate to be stored in a take-up cassette for eventual development by normal photographic techniques.

A typical format for the type in the font of master-type consists of a matrix of 1,024 bits by 1,024 bits in a normalized em quad of 1"×1". Thus, approximately one million bits of information are required to define the X, Y coordinate points in the format, with 0.001" being the spacial displacement of coordinate points. If bulk storage were to be employed this would require one million bits to define the coordinate points for each letter or symbol of each of the fonts. To avoid such a large storage capacity required in bulk storage, a processor is provided in the phototypesetting apparatus for compacting the digital instruction storage requirement. Thus, rather than storing individual coordinate point information, instructions in multi-bit digital word form are recorded on the font magnetic disc to which the uncompacting processor is responsive for producing the necessary outputs to control the cathode ray tube light output. A suitable uncompacting controller system and method to effect such storage and operation are disclosed in U.S. Pat. No. 4,029,947 and assigned to the same assignee as the present application.

Each of the letters and symbols in a particular type style in each of the up to one hundred fonts must be encoded in digital instruction form for recording, which is an expensive and time-consuming operation, requiring that each letter and symbol be individually analyzed so that it can be properly encoded for providing appropriate instructions to the uncompacting processor. The time expense involved is justified in the case of providing fonts composed of typical letters and symbols commonly employed in phototypesetting operations. If, however, a user desires to phototypeset specialized characters, a serious problem arises in storing and encoding such characters not ordinarily found in a standard font. For example, if a newspaper has a need to print a particular company's trademark symbol in classified advertising, it would presently be necessary that this symbol be encoded and recorded according to the compacting system of the phototypesetting apparatus. As previously mentioned, this is an expensive and time-consuming operation, as well as not possible with complex logos. Present practice is for the phototypeset copy to be developed without the specialized character, with space being left for it. The character is then manually affixed to the copy for ultimate reproduction. Thus, the user of the phototypesetting apparatus is faced with the option of acquiring and storing individualized digital instructions for the specialized character compatible with the compacting processor used or to insert manually each specialized character on the developed phototypeset copy.

A method and apparatus for scanning a character or logo and storing the resultant character data in a storage device, are described in U.S. Pat. No. 4,038,493, assigned to the assignee of this invention. There is described an apparatus including a cathode ray tube (CRT) for directing a light beam in a raster fashion across a logo which is incrementally moved past the CRT, whereby the transmissive portions of the logo transmit the light beam and the opaque portions intercept the light, the transmitted light beam being detected by a photocell. The transitions from the transmissive portions of the logo to the opaque portions are detected by a threshold detector to provide a signal indicative of such a transition. As described in the noted patent, each such transition or individual coordinate point data is converted into a 16 bit word to be stored in the storage device. However, the disadvantage of such a scheme is that each transition requires a word location within the storage device. In those instances where there is a need to store a significant number of transitions, such as reproducing a logo with a half tone characteristic, the number of transitions and words to represent that logo becomes excessive thus requiring an exceptionally large storage device.

Further, there are other schemes of encoding or compacting character data, whereby the size of the storage device required is decreased. For example, run length coding and skipping light coding produce more compact representation of the transition data points. However, such methods work well only when the genreal content of the image can be characterized in advance in order to fit such coding techniques to the particular character logo. Variable length codings do offer some improvement in the data compaction techniques of images.

SUMMARY OF THE INVENTION

It is therefore an object of this invention to provide a new and improved method and apparatus for encoding or compacting data representative of a character or logo.

It is a more specific object of this invention to decrease the size of the storage device required to receive data indicative of a logo, by improving the technique of compacting such data.

It is a still further object of this invention to provide an improved method and apparatus for compacting data in a variety of methods dependent upon the configuration of the logo or character to be stored.

It is a further object of this invention to provide improved apparatus and method for using a variety of techniques for compacting data to be stored in a storage device and for decompacting such stored data to be reproduced for subsequent phototypeset reproduction.

In accordance with these and other objects of the invention, there is provided a method and apparatus for first scanning a logo or character to be reproduced in a succession of strokes, whereby transitions between dark or opaque, and light or transparent areas of the logo are detected. Next, the transitions of a single stroke are examined to determine which of a plurality of compacting methods is most suitable for storing the resultant data. In particular, that method of compacting that will result in the minimum character data, i.e., the minimum number of bits, is selected. Thereafter, the data is stored in a storage device for eventual uncompaction and reproduction.

The invention further contemplates that each such method is given a code word and in preparation for reproducing the data for subsequent phototype set reproduction, the word is detected, whereby the data decompaction apparatus is prepared to reproduce the data in accordance with the selected method.

In a further aspect of this invention, the transitions resulting from each stroke of the light beam across the logo is examined to determine the optimum method for compacting the data. First, a determination is made to determine whether the same number of transitions exist in the present stroke as compared to the number of transitions in an adjacent stroke.

Next, in one illustrative method of compacting data, a determination is made whether the transition points in two adjacent strokes are identical and if so a REPEAT method is selected, whereby the number of strokes in which the orthogonal values of the transition points are identical, is determined and stored. In particular, the resulting data identifies the REPEAT method and the number of strokes in which the orthogonal values are identical.

In a further method of compacting, a determination is made that there are identical number of transitions in two successive strokes but the orthogonal values of the transitions are changed. In such instance, one of the DELTA methods may be selected wherein the magnitude of the difference of the orthogonal values, i.e., a delta or transition value, is determined and dependent upon such magnitude, a particular DELTA method is selected dependent upon the amount of data required to store the delta values. The data stored into the storage device first indicates the particular method, i.e., the DELTA method, as well as the original value of each transition minus the present transition values.

If upon examination of the strokes resulting from a transition, it is discovered that the number of transitions varies from stroke to stroke, it is then necessary to choose one of other possible methods. In the instance where there is a relatively small number of transitions with any spacing therebetween, a SECTORED TRANSITION method is selected, wherein the stroke is divided into a given number of sectors, e.g., 8, and the transitions within a particular sector are identified and the spacing between the beginning or bottom most limit of the sector and the transition is determined. In decoding and storing such data, a code word indicative of the sector method is first stored followed by a second word indicative of which sector(s) within a stroke that transitions appear. Thereafter, data indicative of the spacing from the initial limit of that sector to each of the transitions therein are provided. In decompacting by the SECTORED TRANSITION method successive values are added indicative of the spacing between the beginning of the stroke and the position in which the designated sectors appear to the transition values within the sector from the starting point of that sector, to thereby define the absolute position of the transition within the stroke.

Further, wherein there is a medium number of transitions, any spacing therebetween within a stroke, the AUTO SECTOR method is chosen. In this method, the transition is defined of terms of a number of jumps and vectors that are required to define the transition point. A jump is one of a plurality of designated lengths that does not result in a transition point. A vector is one of a plurality of defined lengths, that terminates at a point defining a transition. For example, a transition could be defined by one or more jumps and a vector. Each vector and jump is defined by a particular coding. In defining the jumps and vectors, the maximum jump required from the initial point of the stroke is first defined, and thereafter the required vector that is needed from the termination point of the jump to the transition is defined. Thus, the compacted data includes a code word, a second word defining jumps if required and a further word defining the vector which terminates in the transition point.

If the number of transitions is relatively large and the transitions are relatively closely spaced apart, a "VECTOR 3" method is used whereby a relatively larger number of jumps and vectors are available from which to select. The first word after the encoding word defines a relatively small number of vectors and may alternatively be decoded to determine whether a second relatively small word or a second relatively large word is needed to define the jumps and vectors. If a jump is required, it has been determined by analysis that certain jumps will be most often needed to define a vector and these are encoded by a second word of the relatively small number of bits. Those jumps that are not required so often are defined by the second word of a greater number of bits. Thus, a transition is examined and is compared with each of the available jumps beginning with the largest and is encoded dependent upon which jump is required. If a jump is required one of two subsequent words is selected dependent upon which jump is required to define the transition. After the jump is defined, a vector is encoded by a further word or words. In similar fashion, the vectors were analyzed to determine the frequency of occurrence. Thus, if a relatively common vector is required, the first word will suffice. Similarly, the second word of the relatively small number of bits is used to define a vector that is less commonly used. Vectors that are not so commonly used are encoded by the second word of the relatively larger number of bits.

In the selection process between the AUTO SECTOR, the VECTOR 3 and the SECTORED TRANSITION method, the transitions resulting from a stroke are encoded by each of these three methods to determine the number of bits to define the transition points in a stroke. The method that requires the least number of bits to encode the transition within a stroke is then selected, and the data encoded by the selected method is loaded into the storage device.

In a further aspect of this invention, decompacting apparatus is used to detect the code word and to adopt a routine based upon the particular method of compacting the data. In particular, as the data is read out from the storage device, the first code word is analyzed to determine the method whereby a particular routine as stored within a read-only-memory (ROM) is selectively read out and applied to an arithmetic unit for calculating the transition values which are stored in an output or transition register. Upon completion of the calculation of the transitions within a stroke, the transitions are read out and applied to control circuitry for controlling a scanning device such as a cathode ray tube (CRT) whereby the CRT light beam is alternately turned on and off in response to the calculated transition values. The address of the routine within the ROM is determined by the code word and a state word that is entered into a latch, as determined by the last instruction of the present routine.

DESCRIPTION OF THE DRAWINGS

FIGS. 11A to 11K show the detailed circuitry of the circuit shown in the functional block diagram of FIG. 10.

FIGS. 12A to G provide a list of the instructions as stored in the P-ROM shown in FIG. 10, for calculating the transition values at which the CRT as shown in FIG. 1 is turned off and on; and FIG. 13 defines a series of states as stored into a state latch as shown in FIG. 10, to facilitate the forming of addresses of the next instruction to be addressed in the P-ROM of FIG. 10, and of the next piece of data to be read out and processed by the arithmetic unit of FIG. 10.

DESCRIPTION OF THE PREFERRED EMBODIMENT

Figure 1:
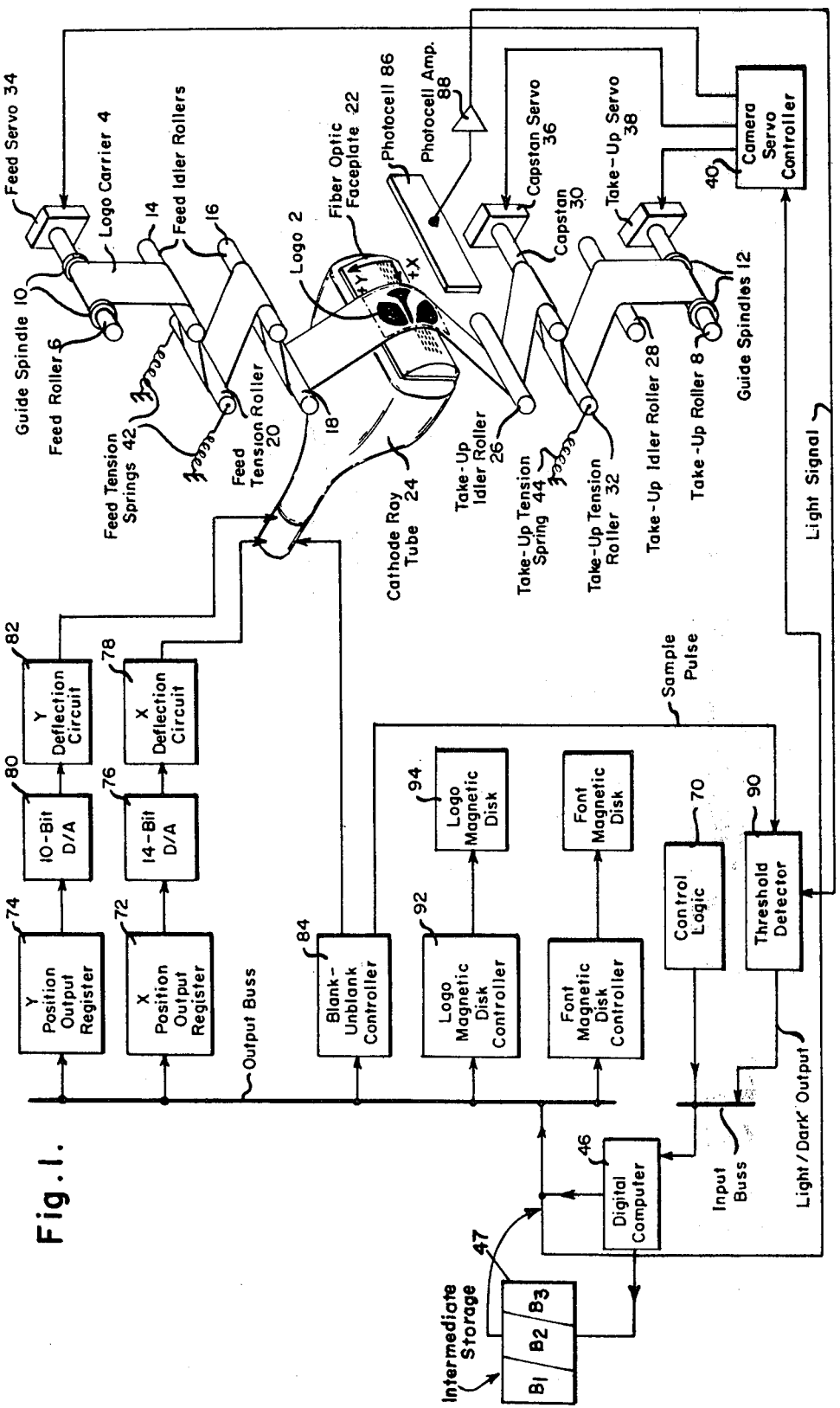
FIG. 1 is a simplified block-schematic diagram of the present invention set up in its record mode of operation.

Referring to FIG. 1, the system is shown schematically set up for operation in the record mode. A logo 2, in transparency form, is mounted on a logo carrier 4, which may comprise a transparent flexible material such as a polyester film. The logo 2 is aligned with respect to logo carrier 4 in a precise manner as will be discussed with respect to FIG. 2 below. The logo carrier 4 is wound at one end onto a feed roller 6 and at the other and thereof onto a take-up roller 8. Guide spindles 10 and 12 on the rollers 6 and 8, respectively, restrain the logo carrier 4 in the proper position during loading and advancing operations. The logo carrier 4 is threaded around three feed idler rollers 14, 16 and 18, a feed tension roller 20, a fiber optic faceplate 22 of a cathode ray tube (CRT) 24, a pair of take-up idler rollers 26 and 28, a capstan 30 and a take-up tension roller 32. The logo carrier 4 is advanced across the fiber optic faceplate 22 by the feed roller 6, the capstan 30 and the take-up roller 8, which are respectively driven by a feed servo 34 connected to the feed roller 6, a capstan servo 36 connected to the capstan 30 and a take-up servo 38 connected to the take-up roller 8. During the record mode of operation proper tension is maintained on the logo carrier 4 by a camera servo controller 40 which drives the feed servo 34, the capstan servo 36 and the take-up servo 38. Also ensuring proper tensioning is a feed tension spring 42 biasing the feed tension roller 20 and a take-up tension spring 44 biasing the take-up tension roller 32. The input for controlling the camera servo controller 40 is provided from the output bus of a digital computer 46 of the phototypesetting apparatus.

Figure 2:
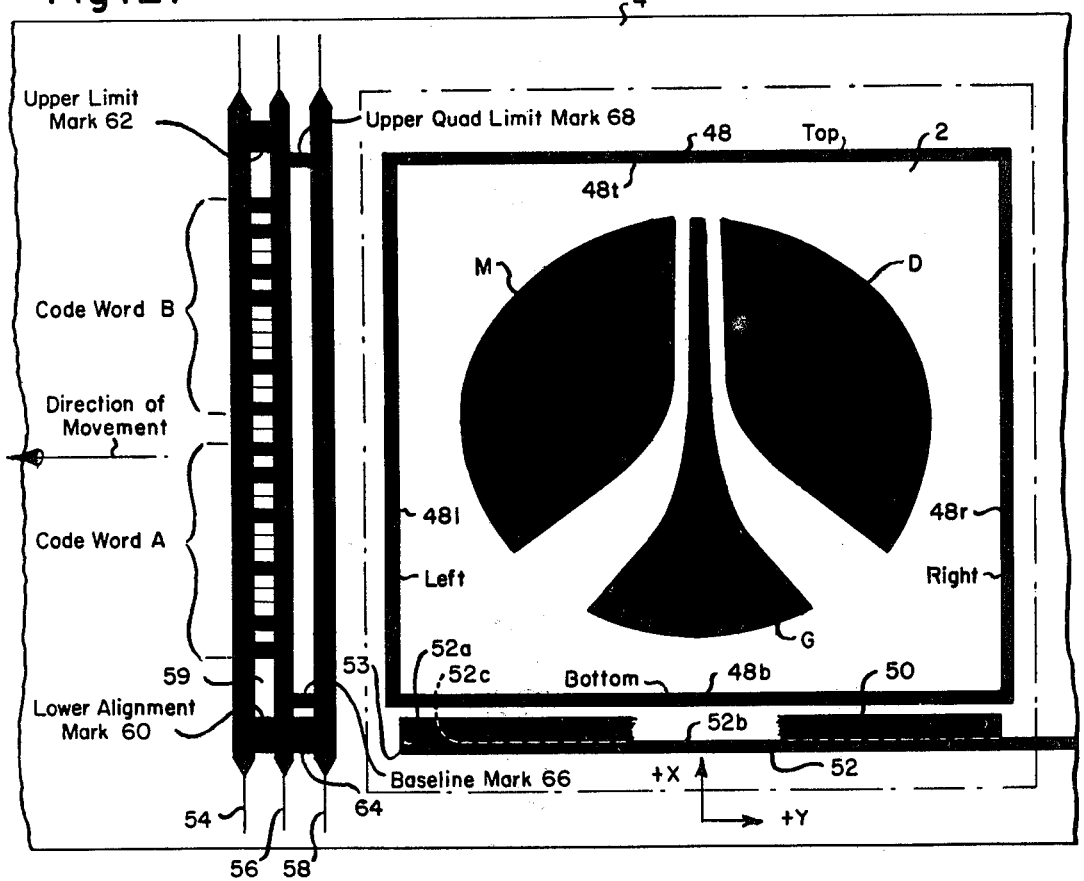
FIG. 2 is a schematic representation of a logo carrier having a logo fixed thereon for recording into the system of FIG. 1.

Reference is now made to FIG. 2 which illustrates how the logo 2 is aligned with respect to the logo carrier 4 and hence with respect to the fiber optic faceplate 22 of the CRT 24. In FIG. 2, the black or opaque areas are to be considered as being non-light transmitting areas, while the unshaded (white) areas are to be considered as transparent in both the logo and the logo carrier 4. The logo 2, in transparency form, includes the central symbolic character comprising three black areas M, G and D, which are bounded by a black border 48 having top 48t, bottom 48b, left side 48l and right side 48r portions. It is mandatory that the border 48 be black only when the logo is a negative of the logo. The top, bottom, left and right directions are as shown on the drawing and the portions M, G, D will be described in the orientation as shown throughout the description. The bottom to top dimension 48b to 48t of the actual logo can be selected to be 8", when an 8 to 1 enlargement factor is desired, considering the 1" height format employed in the phototypesetter apparatus for fonts permanently stored therein.

A bottom logo alignment bar 50 is provided parallel to the bottom border 48b of the logo on the transparency. Permanently imprinted on the logo carrier 4 is a bottom carrier alignment bar 52. The carrier alignment bar 52 includes a left portion 52a, which is of a thickness equal to that of the logo alignment bar 50. The right top edge 52c of the left portion 52a slopes downwardly and a long thin bottom portion 52b formed which extends beyond the right edge of the logo alignment bar 50. The bar 50 is cut away in the central portion to show the bottom portion 52b of the carrier alignment bar 52. The logo alignment bar 50 is then brought into alignment with carrier alignment bar 52 with the lower left hand corner 53 of both bars serving as a reference point.

The logo 2 transparency is then fixed to the carrier 4 in this alignment by means, for example, such as adhesive tape. Proper alignment is important to ensure proper orientation of the logo upon reproduction.

Disposed to the left of and perpendicular to the logo and carrier alignment bars 50 and 52 are three opaque sync bars 54, 56 and 58 which extend from the bottom portion to the top portion of the carrier 4. Disposed between the bars 54 and 56 is a code word area 59 including a space for two 16-bit code words A and B. Below the code word A area is a bottom alignment mark 60 aligned with the carrier and logo alignment bars 52 and 50. At the top end of the code word B is an upper limit mark 62 for defining the upper limit of the X scan of the cathode ray tube. The code words A and B may be suitably encoded for supplying control information to the digital computer 46 as will be discussed in further detail below. Between the sync bars 56 and 58 is affixed a quad limit mark 64 in alignment with the bars 50 and 52. A base line mark 66 is affixed to define the eventual alignment of the logo when reproduced with respect to the base line of type. An upper quad limit mark 68 is affixed to be in alignment with the top border 48t of the logo 2. The quad limit marks 68 and 64 may be moved and placed in accordance with the size of the particular art work being used.

Figure 3:
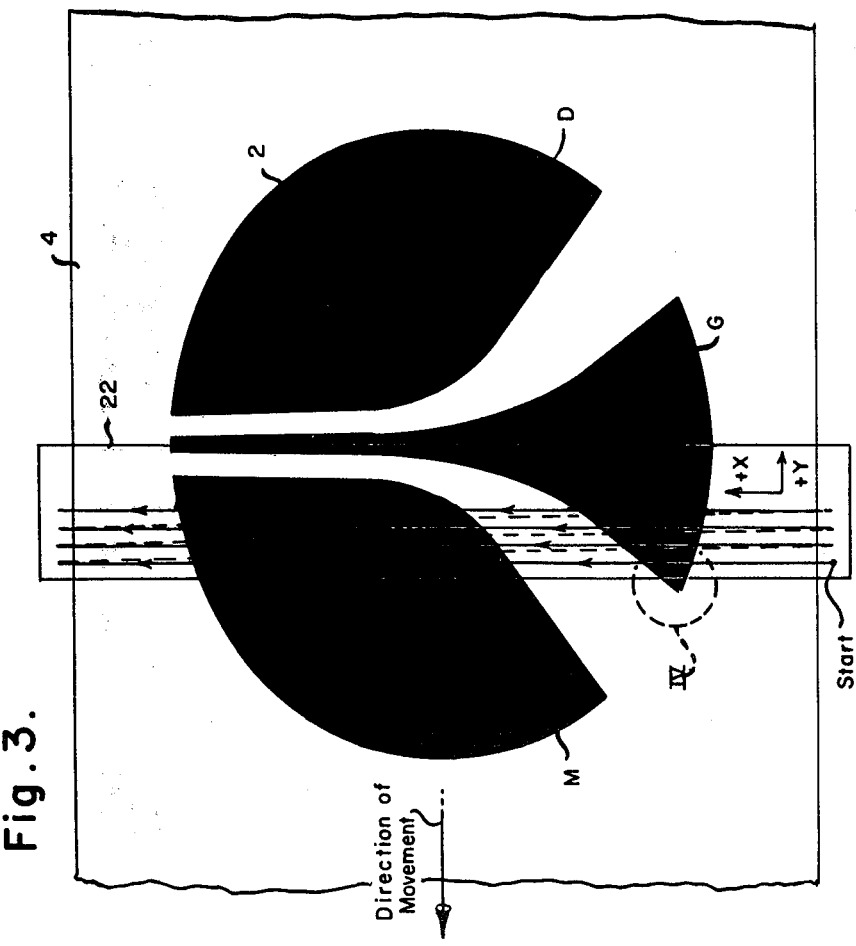
FIG. 3 is a schematic diagram used for explaining the operation of the record mode of operation.
Figure 4:
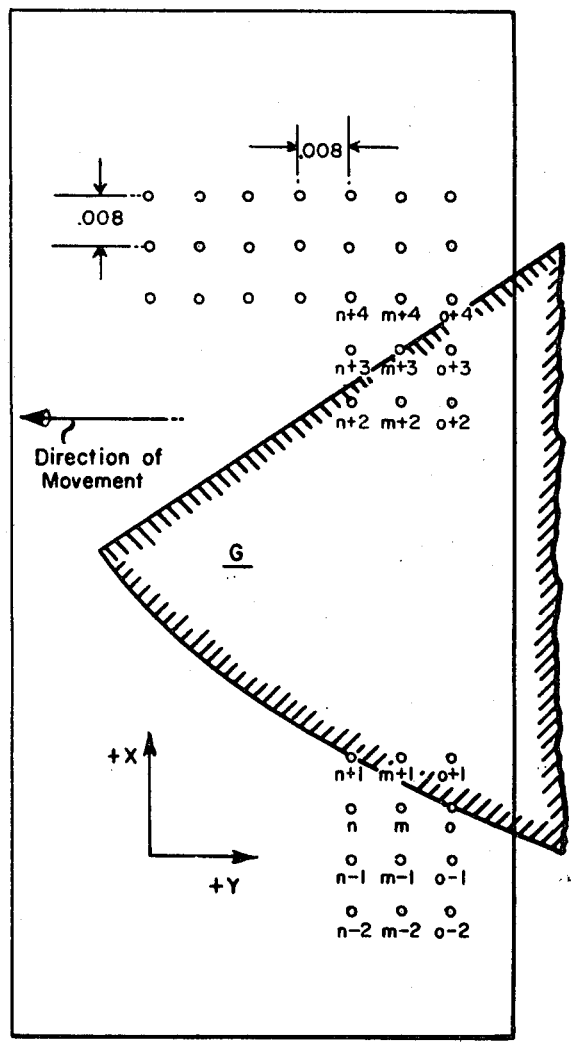
FIG. 4 is an enlarged portion of the area IV in FIG. 3.

Reference is now made to FIGS. 3 and 4. For simplicity in explaining the recording mode of operation, it will be described from the physical orientation as shown in FIG. 3, where the logo 2 is disposed on the logo carrier 4 over the fiber optic faceplate 22 so that the logo 2 has portions of the sections M and G thereof in a position to be scanned in the +X and +Y directions by the light output emitted by the cathode ray tube 24.

The sequence of operation in the record mode is as follows: In FIG. 1 a control logic circuit 70 is set to be the record mode and a logo access address is manually inputted so that access to the logo 2 being recorded can be provided for later use during the typeset mode. Using control circuit 70, an input is provided therefrom to the digital computer 46 which, in turn, provides on the output buss digital X and Y coordinate words to an X positon output register 72 and a Y position output register 74, respectively. The registers 72 and 74 operate as temporary storage for the X and Y position words until the next X, Y data input thereto is supplied from the digital computer 46. The digital words stored in the registers 72 and 74 are indicative of the X and Y coordinate positions, respectively, that are to be sampled by the cathode ray tube by emitting a lightspot output therefrom. The X digital word stored in the register 72 is provided to a 14-bit digital/analog (D/A) converter 76 whose analog output is supplied to an X deflection circuit 78. In response to the activation of the X deflection circuit 78, the electron beam of the CRT 24 is deflected to an X position corresponding to the digital word stored in register 72. The Y digital word output of the register 74 is applied to a 10-bit digital/analog converter 80, whose analog output is applied to a Y deflection circuit 82, which deflects the electron beam of the CRT 24 to a corresponding Y position.

The direction of the scan is shown in FIG. 3 from the start position in the lower left hand proceeding in the +X direction from the bottom to the top of the logo 2 and retracing to begin the next line of the scan in the +X direction indexed in the +Y direction by one line. Fast scan is then in the +X longitudinal direction and the slow scan is in the +Y transverse direction in the record mode of operation. The direction of movement of the logo carrier 4 is shown toward the left in FIG. 3; thus, the logo is spot scanned from bottom to top (+X direction) in fast scan and from left to right (+Y direction) in slow scan. This orientation is required since the phototypeset operation is performed in this manner, with characters being formed from bottom to top and left to right.

Referring to FIG. 4, assume that the digital computer 46 has established X and Y coordinates corresponding to the sampling point n with the next sampling point to be n+1. At the sampling point n, the computer 46 provides a signal to a blank-unblank controller 84, which has its output connected to a control grid of the CRT 24 causing the CRT to be unblanked thereby permitting the electron beam to excite the phosphor screen of the CRT at the sampling point n to provide a light output at this point from the fiber optic faceplate 22. Since the sampling point n is in a transparent point in the logo 2, the light output from the faceplate 22 will be transmitted through the logo 2 and sensed by a photocell 86. The dimensions of the photocell 86 (e.g., 9"×¼") are selected to permit sensing a light output transmitted through the transparent portions of the bottom to top dimension of the logo 2.

Hence, at the sample point n the photocell 86 is excited to provide a signal to a photocell amplifier 88 for amplification and which, in turn, provides a light signal to a threshold detector 90. The other input to the threshold detector 90 is a sample pulse provided by the blank-unblank controller 84. The sample pulse is provided in time correspondence to the unblanking of the cathode ray tube 24 so as to permit the threshold detector 90 to provide a light output signal therefrom if a light signal is inputted thereto from the photocell amplifier 88 at any time during the sampling interval for the spot n. Thus, in the present example, at the sample point n, a light output is provided to the input buss of the digital computer 46. Since the last previous sample point n−1 was also in a light area of the logo, no transition (light to dark or dark to light) occurred between n−1 and n. Thus, in that recording is performed on a transition basis, as will be explained in further detail below, no data is recorded for the point n.

At the end of the sample period for the point n, the digital computer 46 outputs a new digital coordinate word for the X position to the X position register 72 corresponding to the next sample point n+1 in the X dimension. The Y position output register continues to output the Y position corresponding to the n line of scan in the X dimension. The 14-bit D/A converter 76 thus outputs an analog signal corresponding to the sample point n+1 to the X deflection circuit 78 which causes the electron beam to index to the next sample position n+1. The blank-unblank controller 84 is unblanked in response to the output from the digital computer 46 so that the electron beam is provided at the n+1 location on the CRT screen to cause a light output therefrom. However, as can be seen from FIG. 4, the n+1 sample point is in a dark area of the logo 2 in the G portion thereof. Thus, no light output will be transmitted therethrough so that the photocell 86 will not sense a light output and provide a signal to the photo amplifier 88. Hence, the sample pulse supplied from the blank-unblank controller 84 to the threshold detector 90 for the sample point n+1 in the absence of a light signal input thereto will cause a dark output to be provided to the input buss of the digital computer 46.

Since a transition from light to dark has occurred from the sample point n to the sample point n+1, in response thereto the digital computer 46 will provide a transition address output to the digital computer 46, wherein the transitions are compacted by a selected one of a plurality of methods, as will be explained below, before being recorded on a logo magnetic disc 94.

As illustrated in FIG. 4, the sampling process will continue in the +X dimension. The dark output continues to be generated at each sampling point across the G portion of logo G through the sampling point n+2. When the electron beam of the CRT 24 is indexed to the next sampling point in the n line, that is n+3, a light is transmitted through the transparent area of the carrier 4 and logo 2 so that the photocell 86 receives a light input thereto, which is amplified in the photocell amplifier 88 and provided as a light signal input to the threshold detector 90. The output of the threshold detection 90 is a light output and also indicates that a transition from dark to light has occurred to the digital computer 46. The sampling then continues in the n line in 0.008" increments until the end of the n line is reached. No transitions will be recorded, however, until a sample point in the n column is reached where the bottom portion of the dark area M on the logo 2 is reached as is better seen in FIG. 3.

At the end of the n line the electron beam retraces and is indexed in the +Y direction to the next line, that is the m line, by the digital computer 46 providing the m line address to the Y position output register 74. Thus, the converter 80 and the Y deflection circuit 82 responding thereto provide a corresponding Y deflection output to the electron beam to index the CRT to the m line. The scan operation then begins in the +Y direction with the points m-2 m-1, m being sampled and found to be light areas, with a transition occurring with the sampling of the point m+1. The dark sampling points are indicated in the m column until the sample point m+4 is reached, which indicates a transition point between the sample point m+3 and m+4, which is recorded. The sequence of operation continues along the m line in the +Y direction until its end. Next, the CRT beam is indexed to the line to be then scanned. This operation continues until the entire logo 2 is scanned in the +Y direction from left to right and the information corresponding to the address.

In a typical implementation of the system the logo carrier 4 is stopped, for example, for six lines of scan and then indexed for an additional six lines before the next movement of the logo carrier 4. This is accomplished under the control of the digital computer 46 providing an input to the camera servo controller 40 at the time it is desired that the logo carrier 4 be moved. The camera servo controller 40 thus provides an output drive to the capstan servo 36, the feed servo 34 and the take-up servo 38, respectively, to effect the transport.

As indicated above, the output of the photocell 86 is applied to the threshold detector 90, which detects a transition from a high light signal output from the photocell 86 to a low light signal output (or vice-versa) to provide a manifestation or signal indicative of a transition. Thus, as the CRT beam is scanned in a single scan or stroke, the threshold detector 90 provides manifestation of a series of transitions to be applied to the digital computer 46, which may illustratively take the form of a Nova 1200, as manufactured by Data General Corp. As shown in FIG. 1, an intermediate storage 47 is shown comprising three buffers B-1, B-2 and B-3; it is understood that though shown separately for the purposes of illustration of FIG. 1, the intermediate storage 47 comprises typically a part of the digital computer 46. The digital computer 46 performs under the control of a program to be explained in detail, the process of compacting the data. The basic reason for transition data compaction is to minimize the storage requirements for the logo magnetic disc 94. In accordance with teachings of this invention, a variety of different methods for compacting are available and one thereof is selected depending upon the configuration of the character or logo to compact transition data so that the minimum storage space within the logo magnetic disc 94 is required. In operation, the output of the threshold 90, indicative of a series of transitions for each stroke, is applied to the digital computer 46 and is particularly placed into the buffer B-2 of the intermediate storage 47 to be examined to determine which of a plurality of methods for compaction would be most economical in terms of storage space.

Figure 7A:
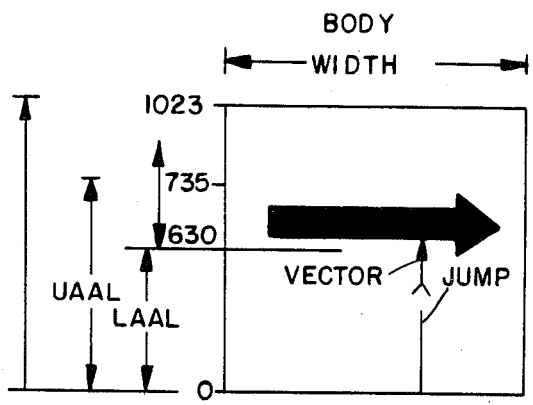
FIGS. 7A to E show various characters or logos that may be compacted and decompacted in accordance with the teachings of this invention, as they relate to a particular method of compaction and decompaction.

Referring now to FIG. 7A, there is shown a character to be scanned by the CRT light spot. In FIG. 7A, a lower active area limit (LAAL) is disposed between a Y coordinate of between 0 and 1023 and serves to define that lower limit that is two counts below the lowest point at which a transition can occur. The upper active area limit (UAAL) is that number which defines along the 1024 count vertical axis, the highest point at which data can occur. Illustratively, these upper and lower active area limits are defined respectively by the lower quad limit mark 64 and the upper quad limit mark 68, as shown in FIG. 2. Upon the scanning of these marks 66 and 68, the limits are entered into the intermediate storage 47 to be used in a manner to be described. After establishing the upper and lower active area limits, the scan of the CRT light spot is confined therebetween. For example, the CRT light spot may scan in a range of between 630 and 735 to provide transition outputs from the threshold detector 90 in that range. These transition values are stored as 0 to 105, and, upon uncompaction, are added to the value of the lower active area limit as previously stored. For example, where the lower active area limit is set at 630, as shown in FIG. 7A, the values of the transitions in the range of 0 to 105 are added to the 630 value to determine a transition point in the CRT stroke of the character.

As an illustrative embodiment of this invention, there are seven methods for compacting and decompacting character data and one method is selected from the following:

1. REPEAT (RE)
2. SECTORED TRANSITION (ST)
3. AUTO-SECTOR (AS)
4. VECTOR 3 (V3)
5. DELTA 2 (D2)
6. DELTA 3 (D3)

7. DELTA 4 (D4)

Of the above methods, the REPEAT and DELTA methods may be selected only upon the detection that the number of transitions in two or more consecutive or adjacent strokes is the same. An analysis is made of the transitions stored in the buffer B-3 of the intermediate storage 47 to determine the size of the character data necessary to record a particular image or portion of an image and to select one of the above methods that will produce the minimum compacted data to be stored in the logo magnetic disc 94.

Referring again to FIG. 7A, the character shown therein in essentially the form of an arrow, is particularly adapted to be encoded by the REPEAT method. The REPEAT method is used where identical numbers of transitions and identical transition points or values are used in successive, adjacent strokes. In an illustrative embodiment of this invention, up to 255 identical strokes may be successively implemented by the use of a single eight bit binary word having values from 1 to 255 in indicating the number of the times the stroke is to be repeated. Thus, once the orthogonal values of the transitions within the first stroke are recorded for the character of FIG. 7A, it will be only necessary then to provide the additional four bit binary word indicative of the REPEAT method and an eight-bit word to indicate how many times the initial stroke is to be duplicated. It is thus apparent that it is not necessary to re-record each of the previous transitions but to indicate the method and the number of times it is to be repeated. As will be explained in detail, the REPEAT number is determined by evaluating each successive stroke to determine whether in that next successive stroke, there are the same number of transitions and the transitions are of the same orthogonal value as in the previous stroke.

Figure 7B:
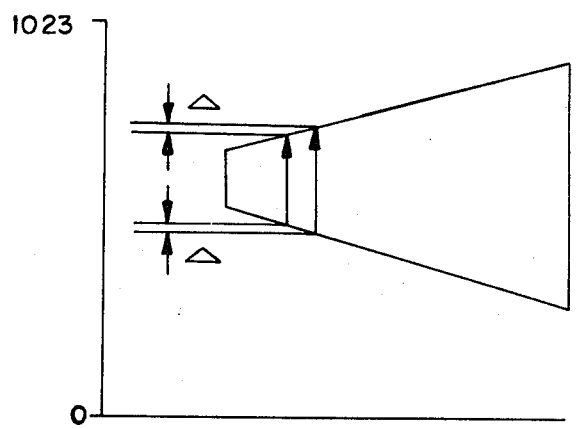

The use of the DELTA methods is illustrated with respect to FIG. 7B. The DELTA methods are employed where the same number of transitions exist in successive strokes of the character, but the position of the transitions varying from one stroke to the next. The DELTA 2 method is selected where there is the same number of transitions and the boundary of the image is varying relatively slowly at an angle in the illustrative range of $-63°$ to $+45°$. In all the DELTA methods, a word is formed of a given number of bits indicating the difference or $\Delta$ between orthogonal values of a transition in adjacent strokes and this $\Delta$ is stored. For example, in the DELTA 2 method, a single two bit word for each $\Delta$ is stored the value of the word defining the $\Delta$ or difference in accordance with the following equation:

$$\text{Transition coordinate or value} = \text{corresponding transition value from the last stroke} + \Delta \text{value.} \quad (1)$$

For the DELTA 2 method, the number of transitions in the present last stroke must be equal and the values are encoded in accordance with the following Table 1:

TABLE 1

| 2-BIT WORD VALUE | DELTA VALUE |
| --- | --- |
| 0 | −2 |
| 1 | −1 |
| 2 | 0 |
| 3 | +1 |

Similarly, the DELTA 3 method is selected when there are the same number of transitions in successive or adjacent strokes and the boundary of the character changes at an angle in the order of $-75°$ to $+71°$. The DELTA 3 method encodes the $\Delta$ values by the use of a three bit word, the transition value being calculated in accordance with equation 1 above. The three bit word is selected in accordance with the following Table 2:

TABLE 2

| 3-BIT WORD VALUE | DELTA VALUE |
| --- | --- |
| 0 | −4 |
| 1 | −3 |
| 2 | −2 |
| 3 | −1 |
| 4 | 0 |
| 5 | +1 |
| 6 | +2 |
| 7 | +3 |

Similarly, the DELTA 4 method is used where there are the same number of transitions in adjacent strokes, with the boundary as formed by the transitions varying in the range of $-82°$ to $+81°$. The increased range of angle of transition requires that a four bit word be used for each $\Delta$, the absolute value of the transition point being determined by equation 1 and the values of the $\Delta$ values being defined by the following Table 3:

| 4-BIT WORD VALUE | DELTA VALUE |
| --- | --- |
| 0 | −8 |
| 1 | −7 |
| 2 | −6 |
| 3 | −5 |
| 4 | −4 |
| 5 | −3 |
| 6 | −2 |
| 7 | −1 |
| 8 | 0 |
| 9 | 1 |
| 10 | 2 |
| 11 | 3 |
| 12 | 4 |
| 13 | 5 |
| 14 | 6 |
| 15 | 7 |

The SECTORED TRANSITION (ST) method provides an efficient method of compacting image data where there are a small number of transitions in a given stroke, with any spacing therebetween, and one of the REPEAT or DELTA methods may not be chosen because a different number of transitions exists in successive strokes, or a delta exists larger than can be encoded.

Figure 7C:
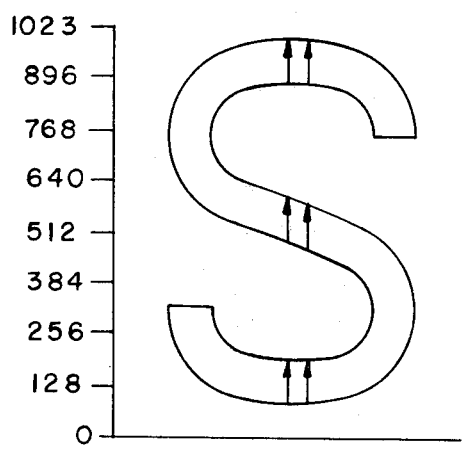

Referring now to FIG. 7C, the 1024 vertical count field is illustratively broken up into eight sectors, each 128 counts high. In encoding the character, the first word is an eight bit word, each bit of this word defining whether there are any transitions in its corresponding eights of the 1024 count vertical field. The eights are called sectors and each is 128 counts. If a "1" is placed in a given bit of the encoded word, there is an indication that there are transitions in the corresponding sector and it is termed an active sector. Illustratively, the bits are arranged in order with bit 1 representing sector 1, i.e., the sector from 0 to 128, as shown in FIG. 7C, and is indicated in the following Table 4:

TABLE 4

| BIT | SECTOR NO. | SECTOR BOUNDARIES |
| --- | --- | --- |
| 1 | 1 | 0–127 |
| 2 | 2 | 128–255 |
| 3 | 3 | 256–383 |
| 4 | 4 | 384–511 |

TABLE 4-continued

| BIT | SECTOR NO. | SECTOR BOUNDARIES |
|---|---|---|
| 5 | 5 | 512-639 |
| 6 | 6 | 640-767 |
| 7 | 7 | 768-895 |
| 8 | 8 | 896-1023 |

The transitions within a sector as defined by the first eight bit word, are coded in the form of a second eight bit word, each such eight bit word defining a transition value within the sector defined by the first eight bit word. Thus, each transition point is defined in accordance with the following equation:

$$\text{TRANSITION VALUE} = \text{LOWER SECTOR BOUNDARY} + \text{LOWER ACTIVE AREA LIMIT} + \text{7 BIT TRANSITION VALUE} \quad (2)$$

In the second eight bit words, the bits 2 to 7 are weighted 1 through 64, respectively, to define the orthogonal transition value within its sector. The first bit is used to perform an advance to the next active sector after this transition, a "1" in the first bit indicating an advance whereas "0" indicates no advance. With respect to FIG. 7C, it is seen for the two strokes (separation exagerated in FIG. 7B), a first transition from light to dark occurs in the first sector, whereas a second transition from dark to clear occurs in the second sector. Similarly, further transitions occur in the fourth and fifth sectors and in the seventh and eighth sectors.

Figure 7D:
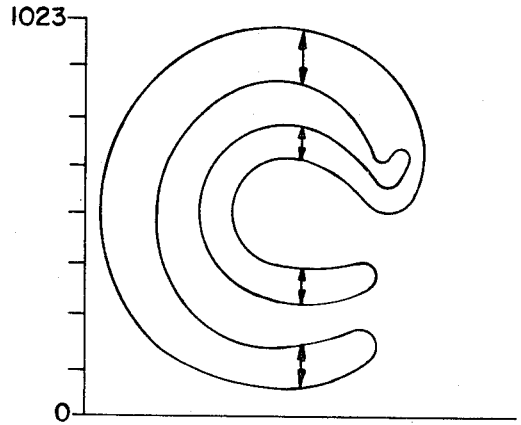

The AUTO-SECTOR method (AS) is particularly adapted to encode a medium number of transitions within a stroke having any spacing therebetween, such as shown in FIG. 7D, wherein a different number of transitions occur in successive strokes of the CRT light spot. The AUTO-SECTOR method, as well as the VECTOR 3 method (V3) employs two types of orthogonal lengths from the lower active area limit (LAAL) to define a transition point. With reference to FIG. 7A, transition values are defined from the lower active area limit including one or more jumps which define lengths of any of a predetermined value, always to be followed by a vector, a vector ending in a transition. In other words, vectors cause a transition to be generated at the accumulated value or spacing as defined by the jump(s) and the terminating vector; on the other hand, jumps do not define a transition point. The various possible values of the four bit encoded word to define jumps and vectors are defined in the following Table 5:

TABLE 5

| 4-BIT WORD VALUE | JUMP (J) OR VECTOR (V) | VALUE |
|---|---|---|
| 0 | V | 0 |
| 1 | V | 1 |
| 2 | V | 2 |
| 3 | V | 3 |
| 4 | V | 4 |
| 5 | V | 5 |
| 6 | V | 6 |
| 7 | V | 7 |
| 8 | V | 8 |
| 9 | V | 9 |
| 10 | V | 10 |
| 11 | V | 11 |
| 12 | J | 12 |
| 13 | J | 24 |
| 14 | J | 48 |
| 15 | J | 96 |

After the occurrence of the last transition, sufficient repetitions of a jump 96 are programmed causing the accumulated orthogonal values to exceed the upper area limit (UAAL), thereby terminating a single stroke and indicating the commencement of the next.

Figure 7E:
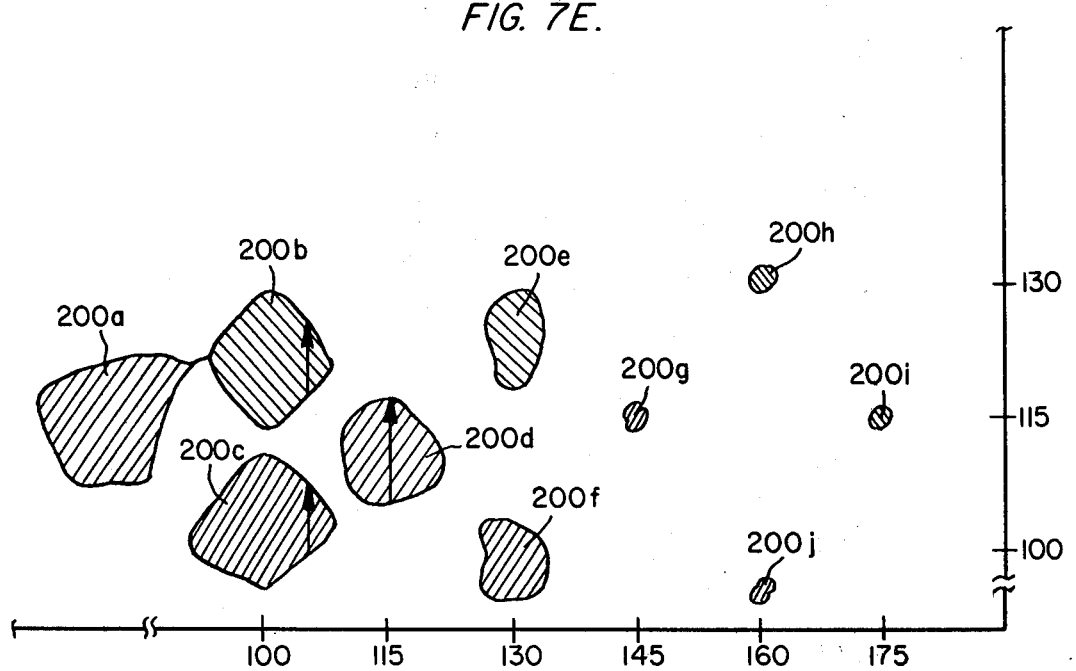

The VECTOR 3 (V3) is a method of compaction that permits a large number of transitions, for example, those as would be employed in the reproduction of half-tone image to be reproduced. In this regard, reference is made to FIG. 7E which shows a greatly enlarged view of an area of a half-tone picture. The illustrated picture is a photograph that has been processed by the well known half-tone screen method wherein the logo to be reproduced is photographed through a half-tone screen. As shown in FIG. 7E, the photograph that is to be scanned by the apparatus of FIG. 1 is comprised of a series of areas 200a to 200g of differing configurations and sizes dependent upon the configuration and shade of gray of the original. As seen in FIG. 7E, a single stroke scanning an enlarged area comprised of many of these sectors 200 would encounter a great number of transitions from a clear to a black area, thus requiring an encoding technique such as the VECTOR 3. The VECTOR 3 method uses three bit words entering in selected groups of one or two words to define vectors and jumps, as defined above with respect to the AUTO-SECTOR method. These are accumulated in a fashion similar to that of the AUTO-SECTOR method, to define each of the transition points. The first three bit word of a group defines vectors and group size, i.e., one or two words, according to the following Table 6:

TABLE 6

| 3-BIT WORD VALUE FOR WORD 1 | TOTAL NO. OF ADDITIONAL BITS TO FOLLOW | ADDITIONAL MEANING |
|---|---|---|
| 0 | 0 | Vector 3 |
| 1 | 0 | Vector 4 |
| 2 | 0 | Vector 5 |
| 3 | 0 | Vector 6 |
| 4 | 0 | Vector 7 |
| 5 | 0 | Vector 8 |
| 6 | 3 | None |
| 7 | 6 | None |

If the first three bit word is encoded as either six or seven, a second three or six bit word, respectively, is to follow. If the second bit word as indicated from the above Table 6 is to be a three bit word, a second word is defined in Table 7, as follows:

TABLE 7

| 3-BIT WORD VALUE FOR WORD 2 | MEANING |
|---|---|
| 0 | Vector 2 |
| 1 | Vector 9 |
| 2 | Vector 10 |
| 3 | Vector 11 |
| 4 | Vector 12 |
| 5 | Jump 64 |
| 6 | Jump 128 |
| 7 | Jump 832 |

On the other hand, if the first word indicates that a second six bit word is to follow, the second word has a meaning as defined by the following Table 8:

TABLE 8

| 6-BIT WORD VALUE FOR WORD 2 | MEANING |
|---|---|
| 0,1 | Vector 64, 65 |
| 13–63 | Vector 13–63 |
| 3 | Jump 192 |
| 4 | Jump 256 |
| 5 | Jump 320 |
| 6 | Jump 384 |
| 7 | Jump 448 |
| 8 | Jump 512 |
| 9 | Jump 576 |
| 10 | Jump 640 |
| 11 | Jump 704 |
| 12 | Jump 768 |
| 2 | End of method V3 and end of stroke |

Upon the occurrence of the last transition, one or two jumps 832 counts causes the accumulated value to exceed the upper active limit (UAAL), thus terminating the immediate stroke and commencing the next. All transition points, occurring within each stroke compacted by the VECTOR 3 method, must be two counts larger than the lower active area limit value.

Figure 8A:
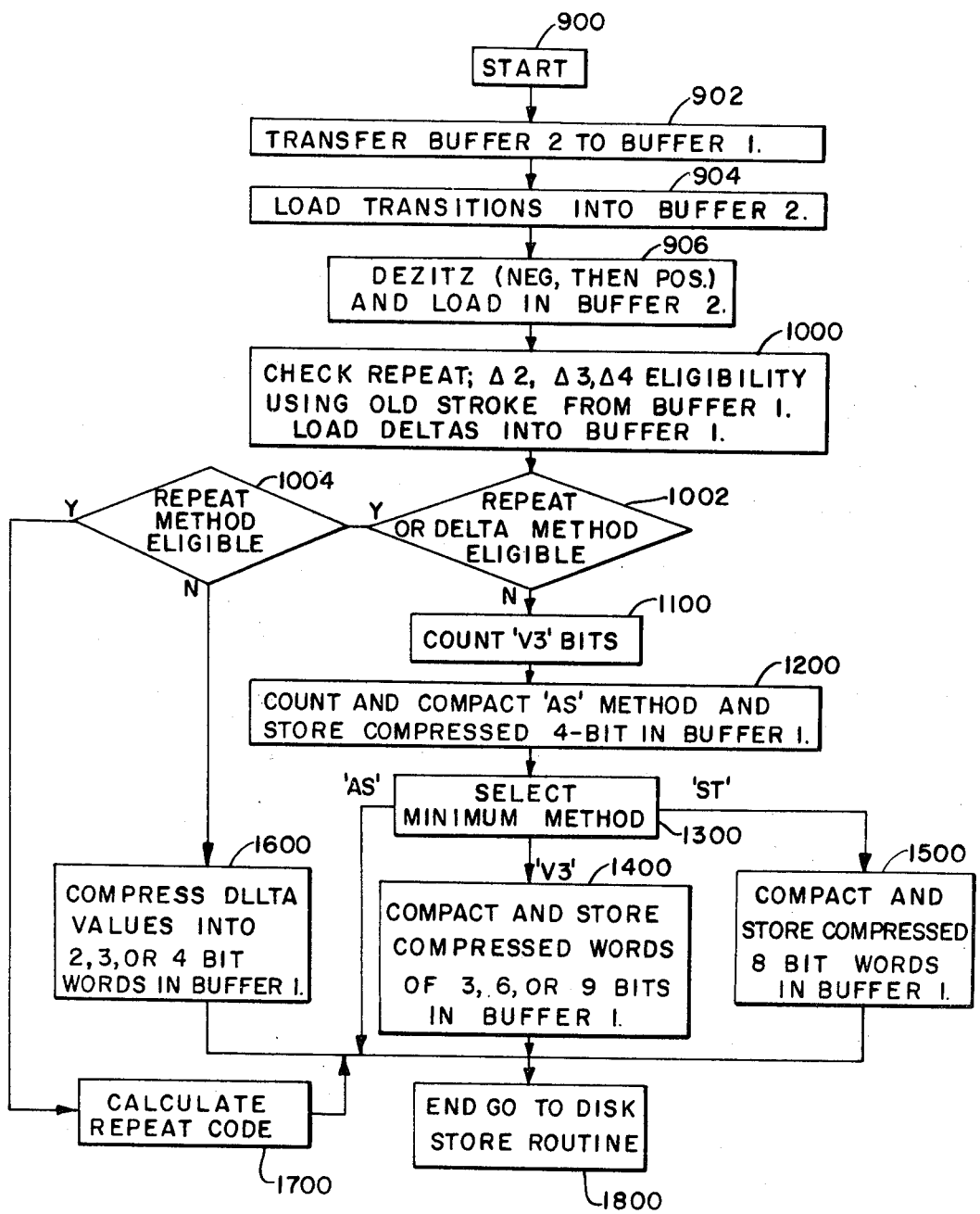
FIG. 8A is a high level flow diagram illustrating the steps by which transition data resulting from two strokes is analyzed to select a particular method.
Figure 8B:
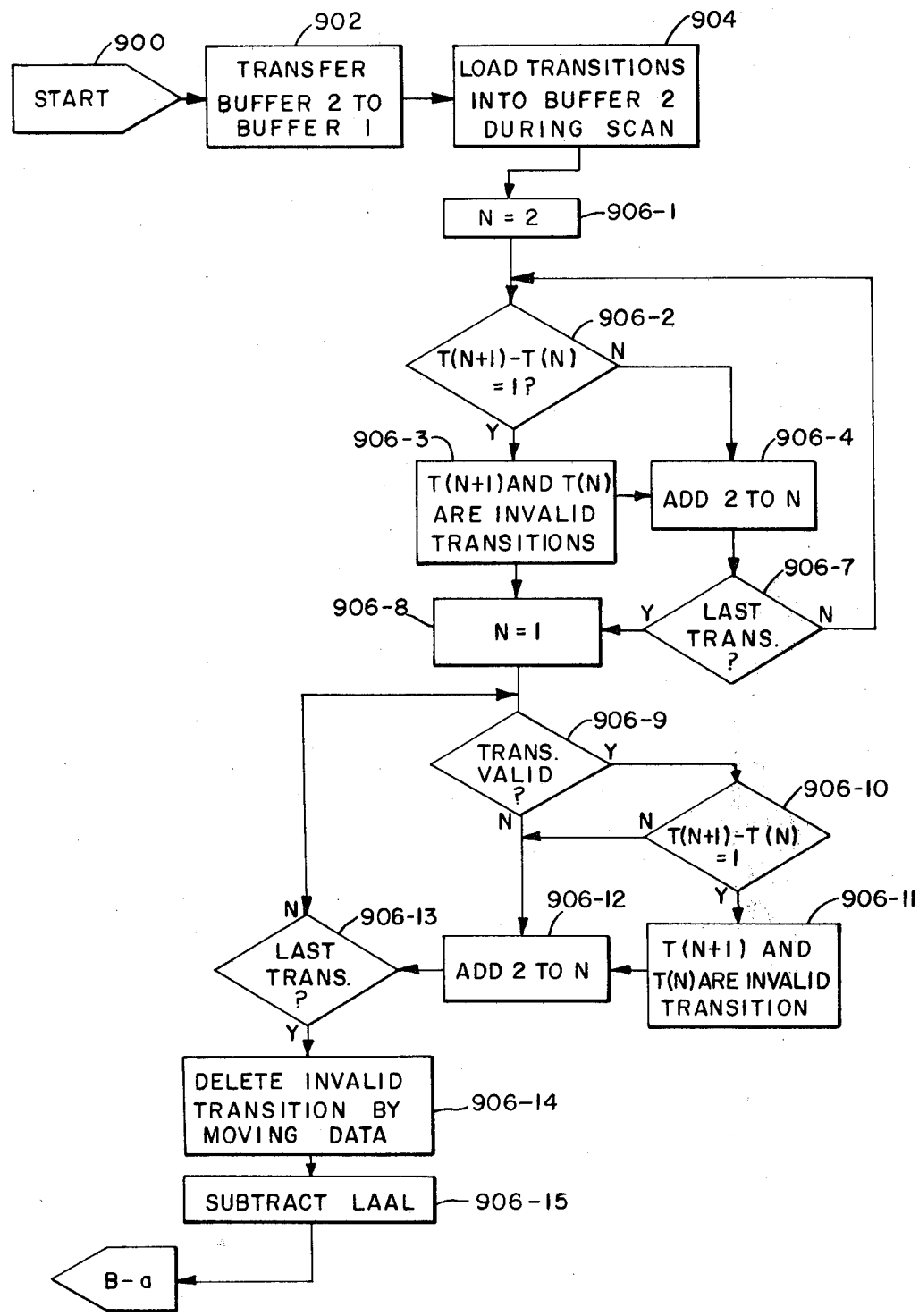
FIGS. 8B to 8H, and 8J to 8R show in detail the steps of the routines necessary to implement the general program of FIG. 8A.
Figure 8C:
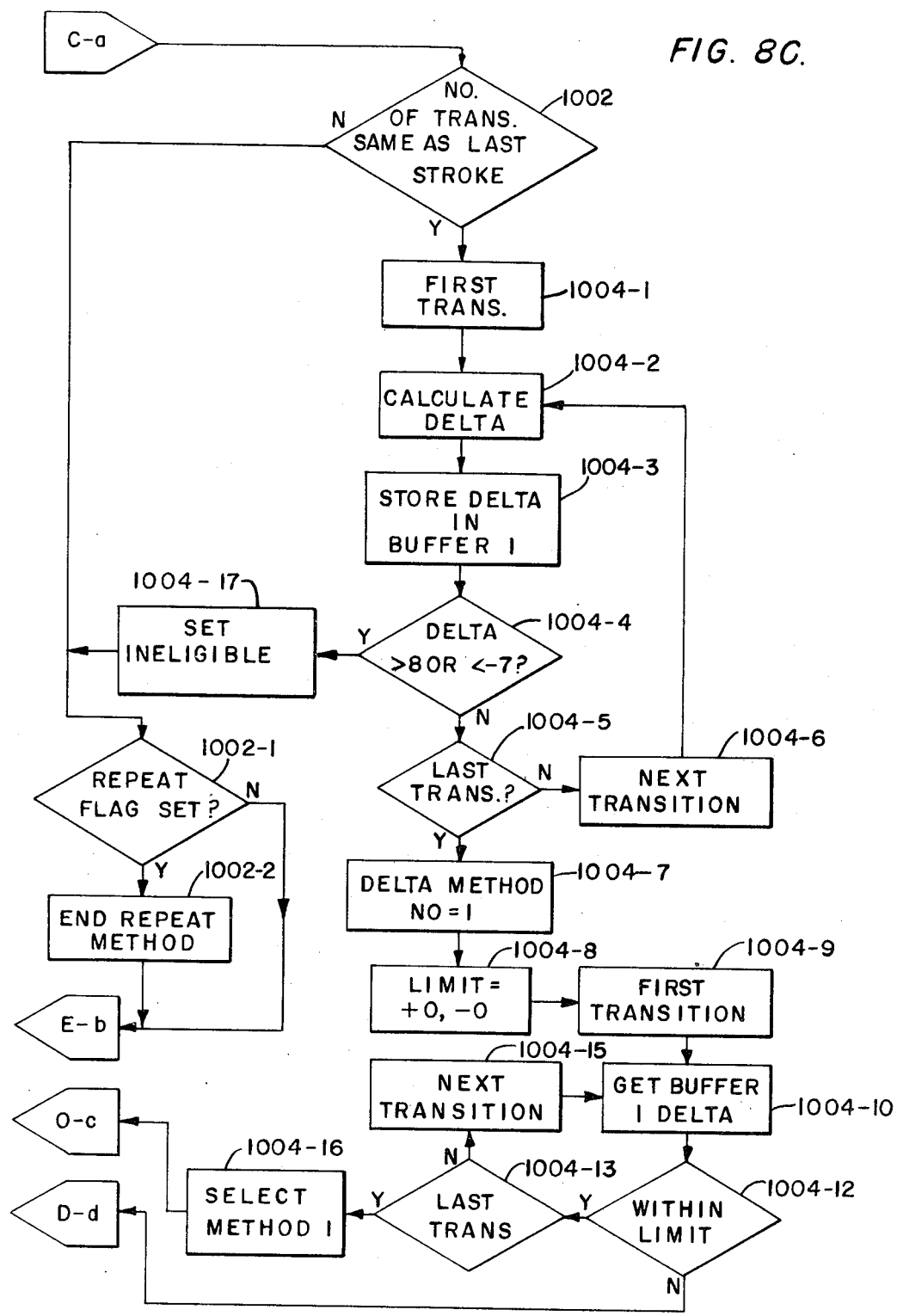
Figure 8D:
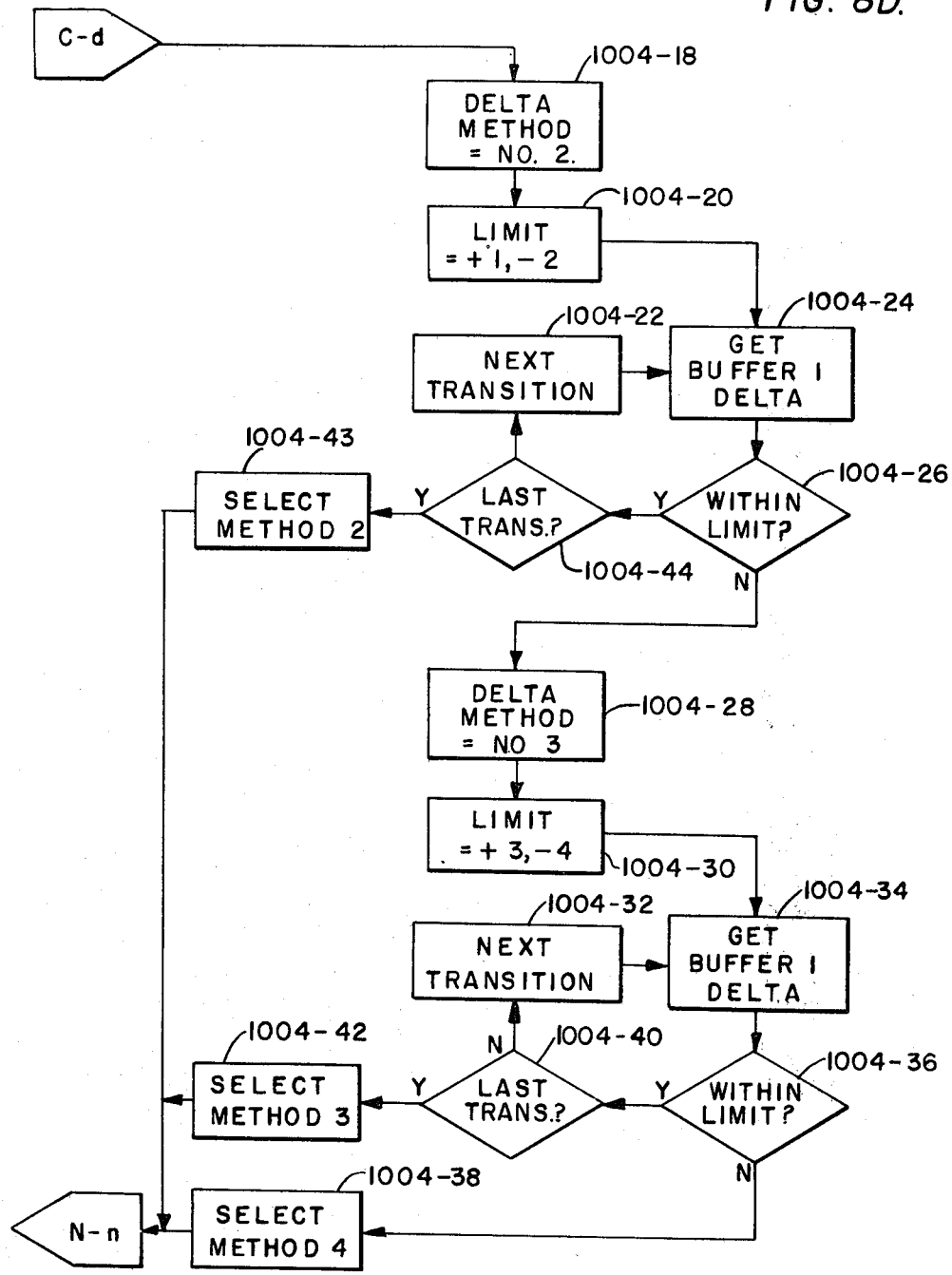
Figure 8E:
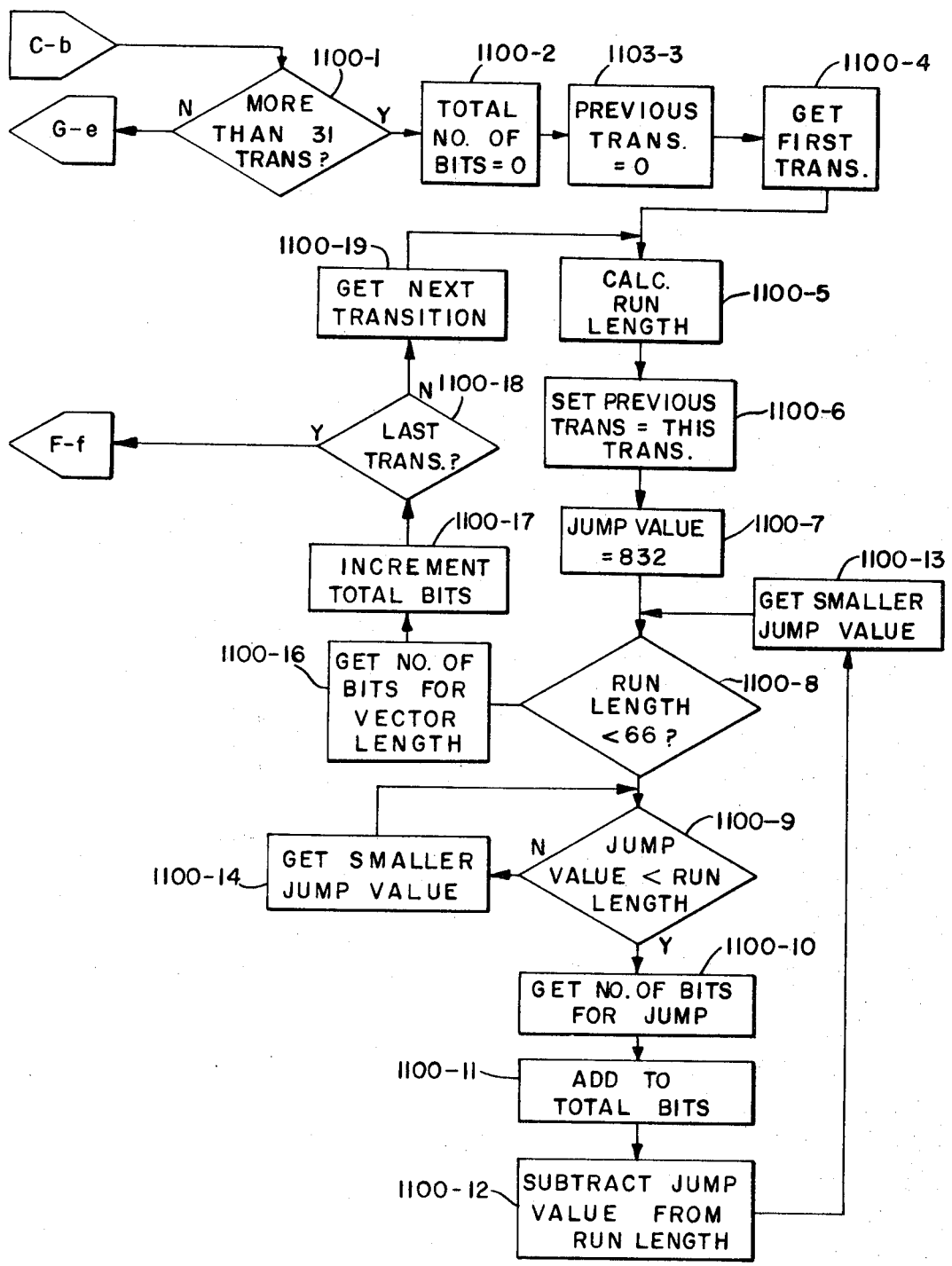
Figure 8F:
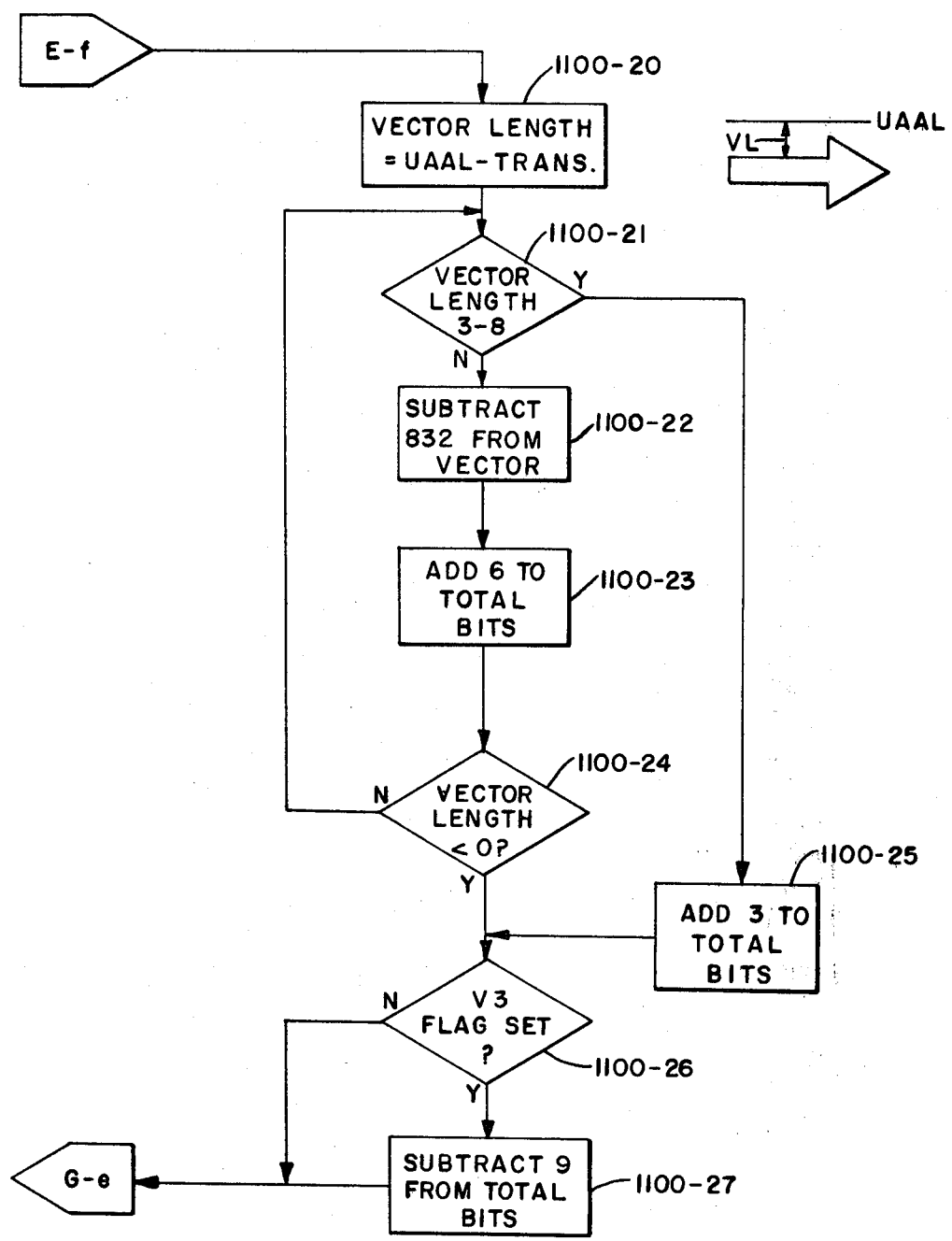
Figure 8G:
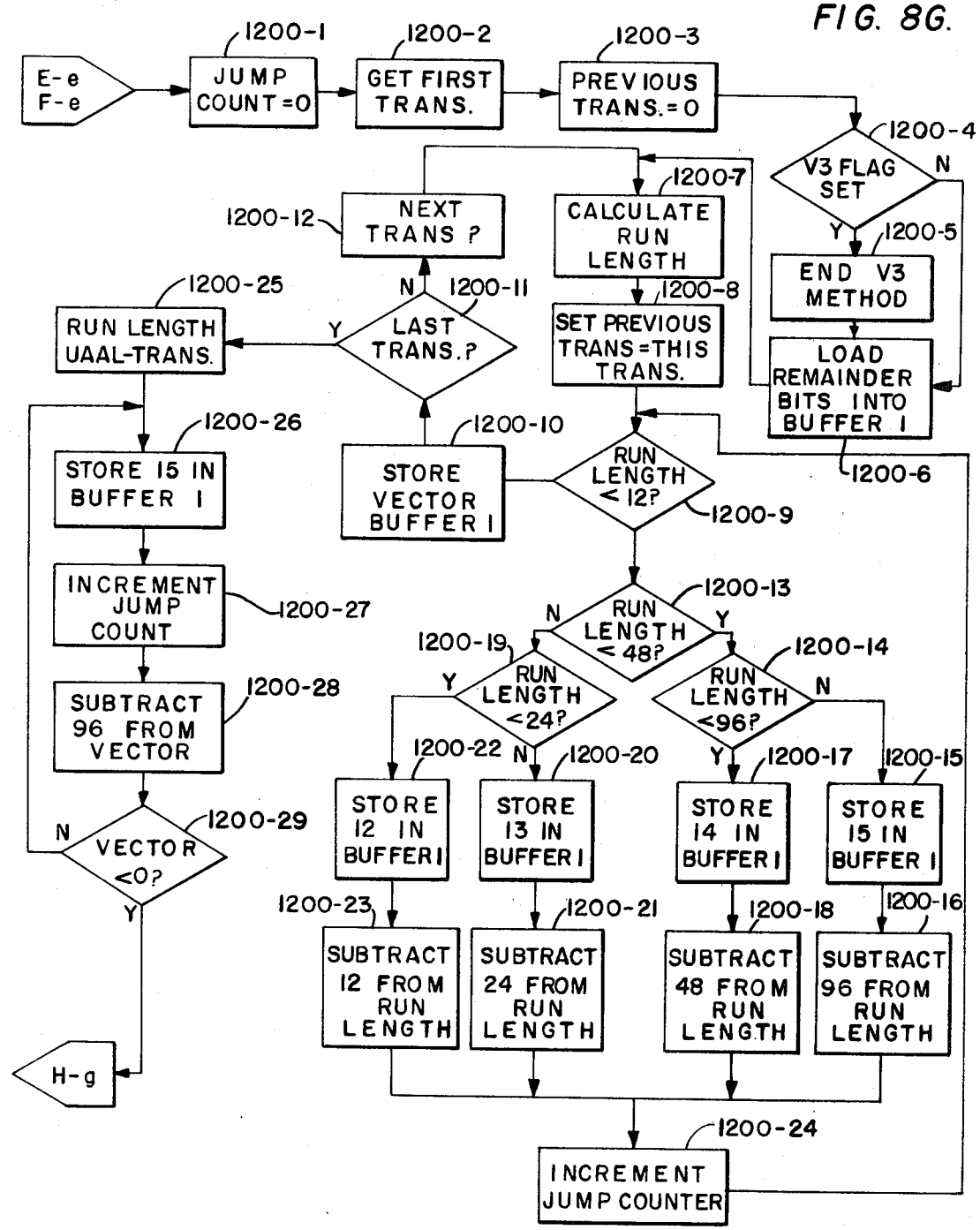
Figure 8H:
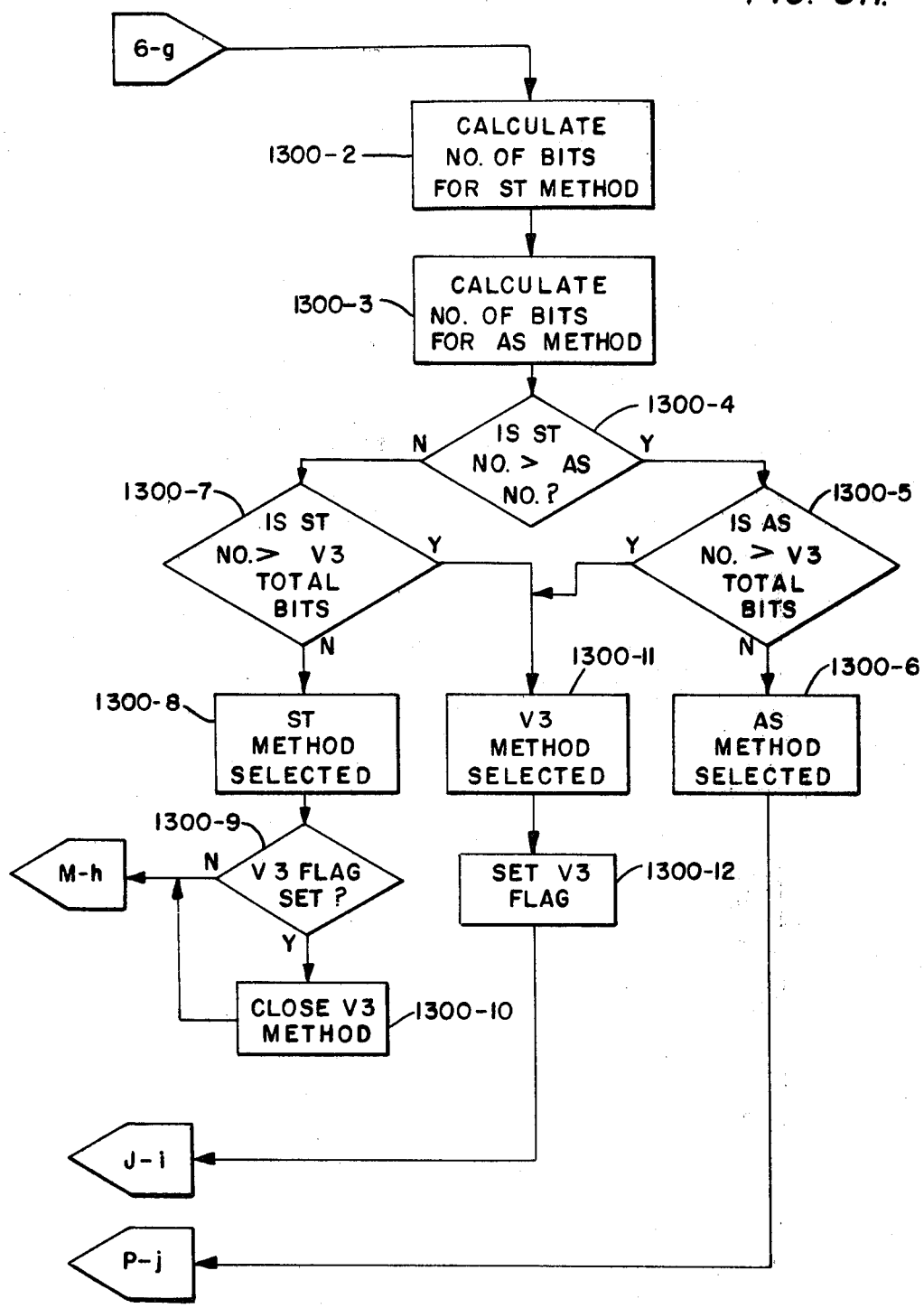
Figure 8J:
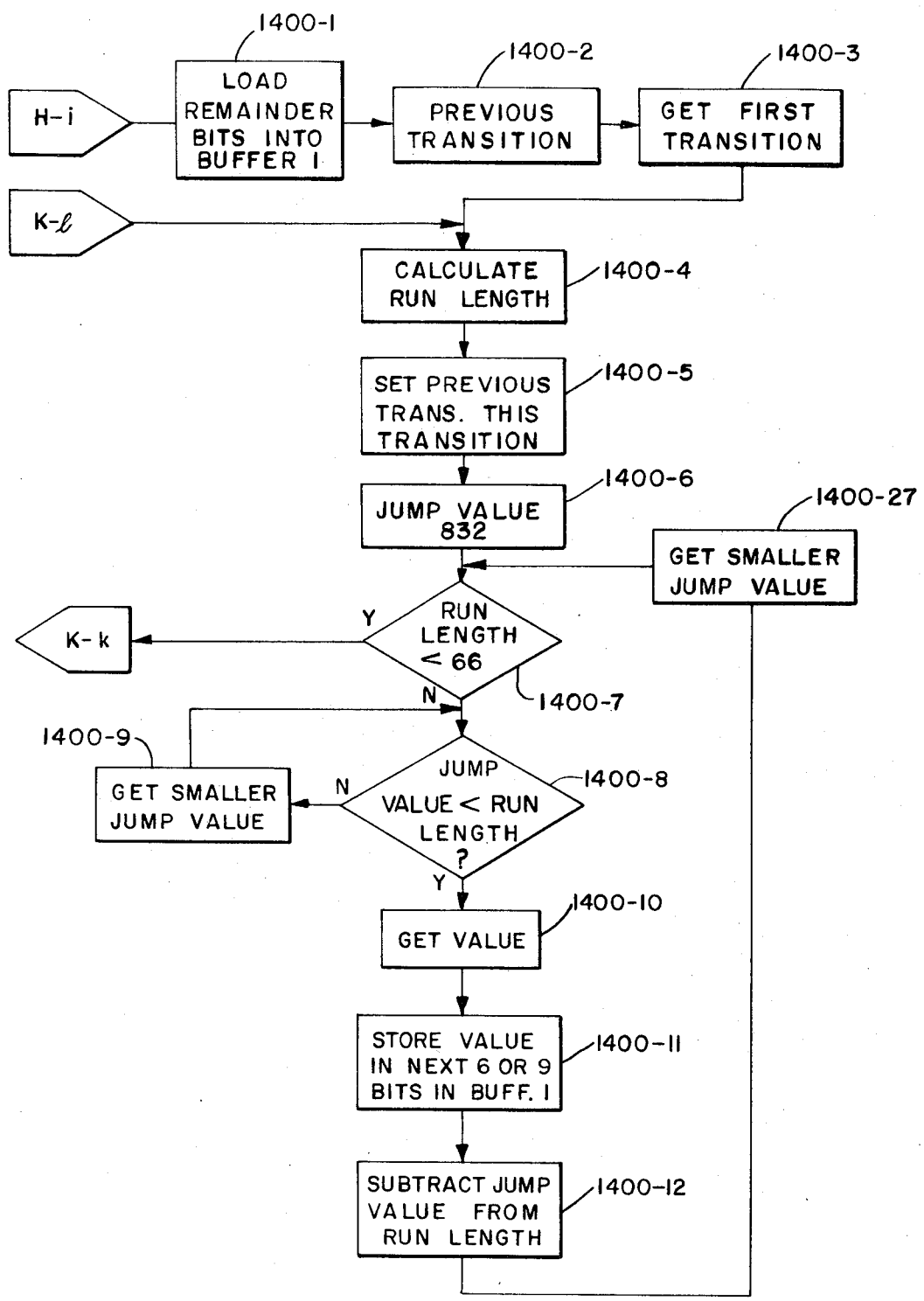
Figure 8K:
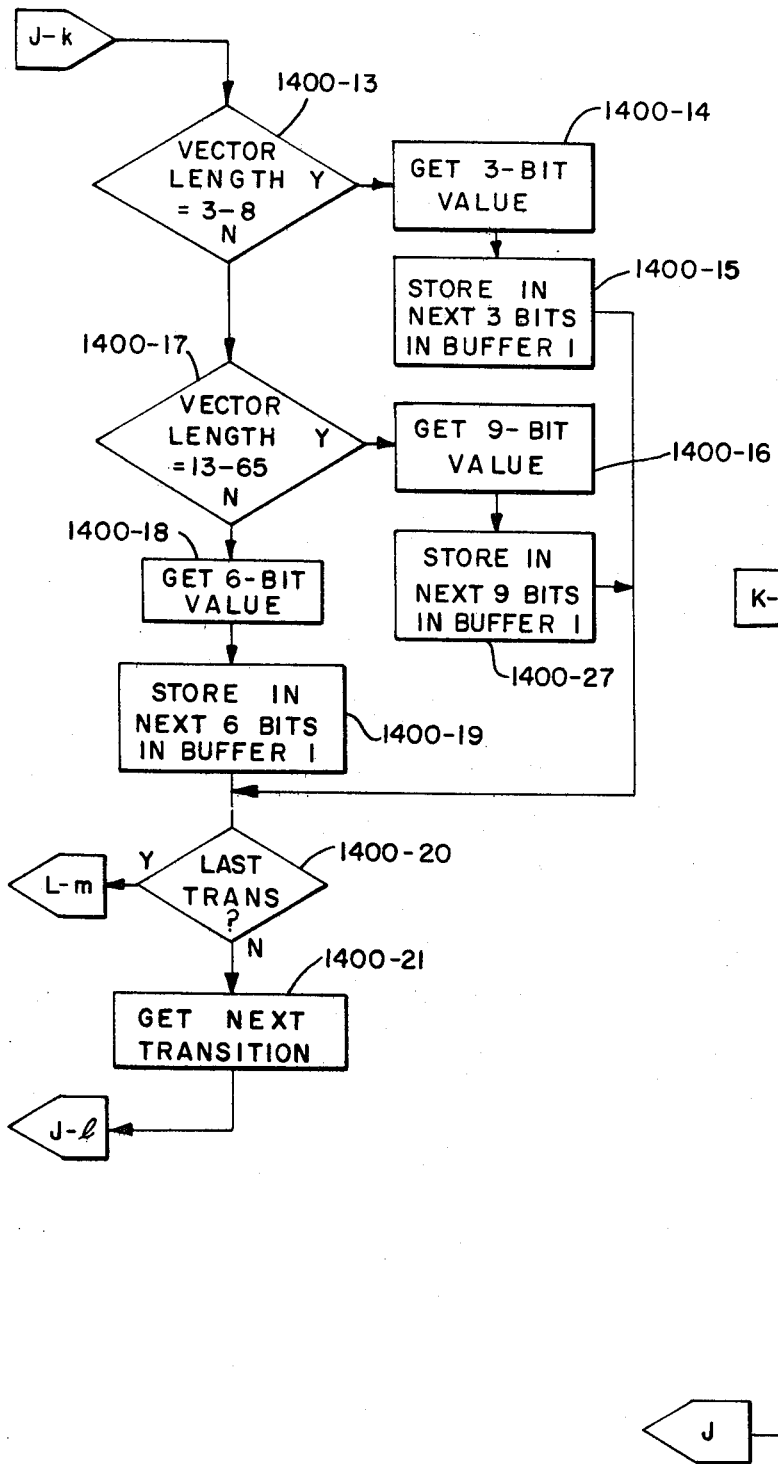
Figure 8L:
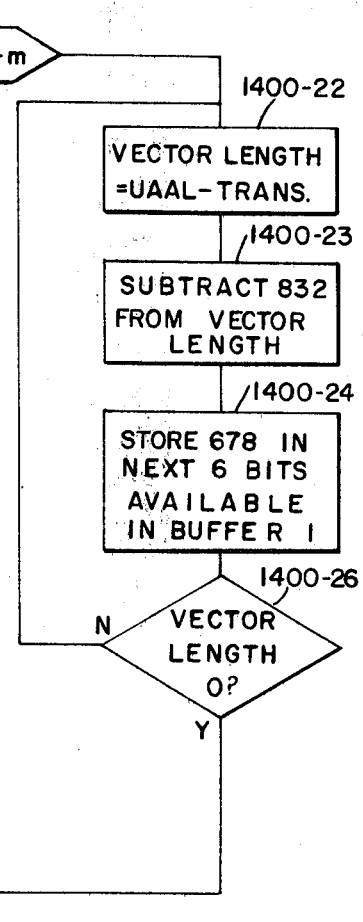
Figure 8M:
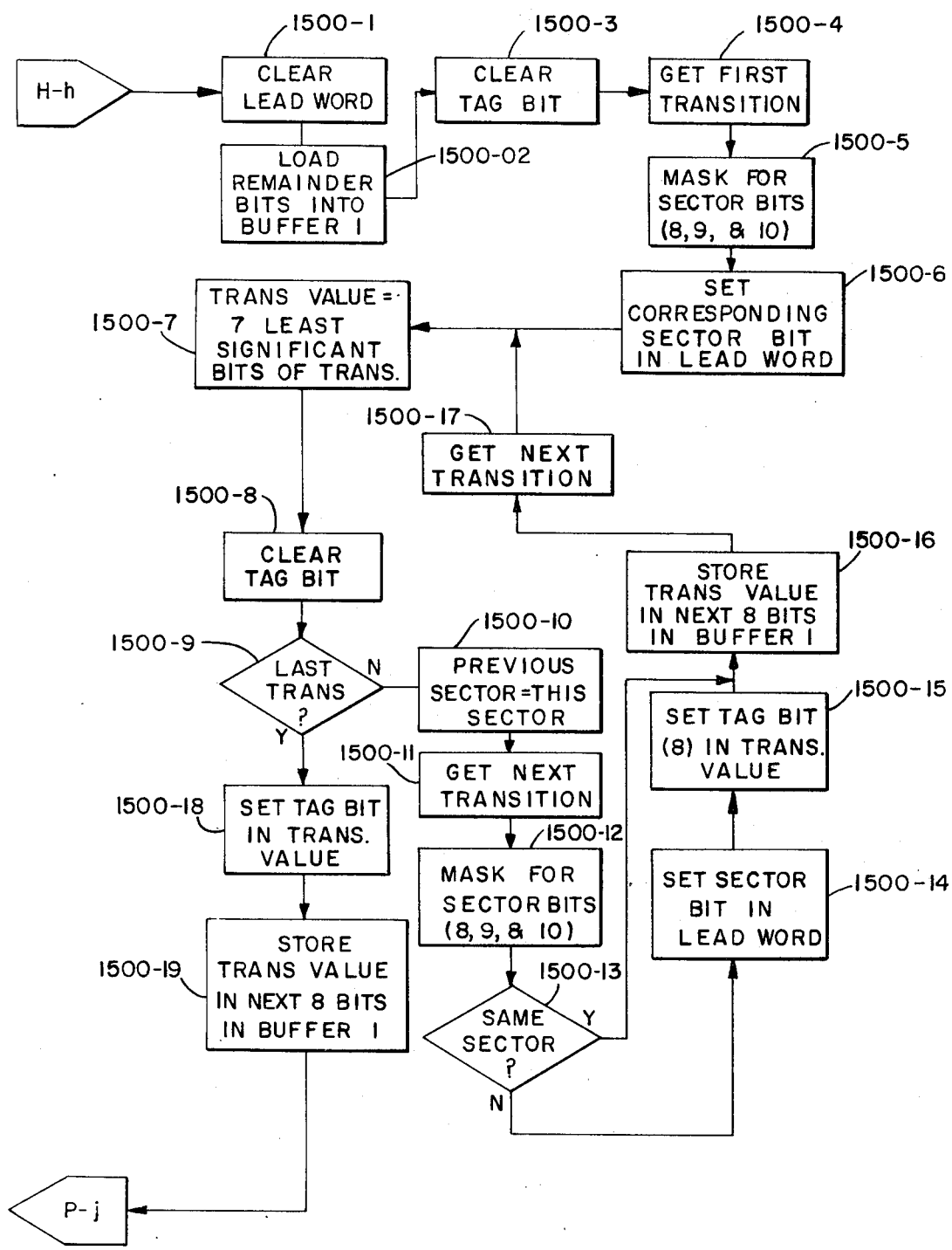
Figure 8N:
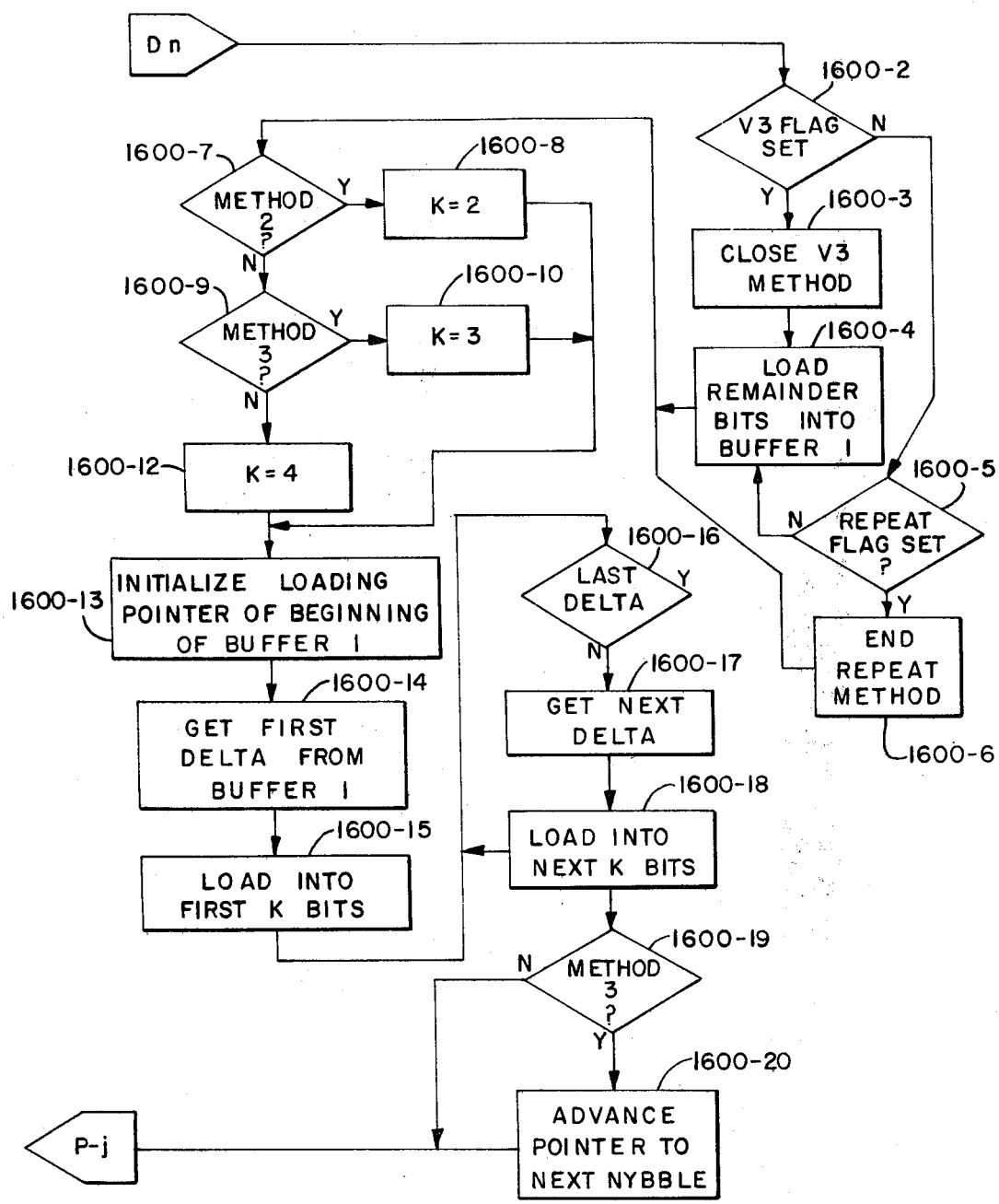
Figure 8O:
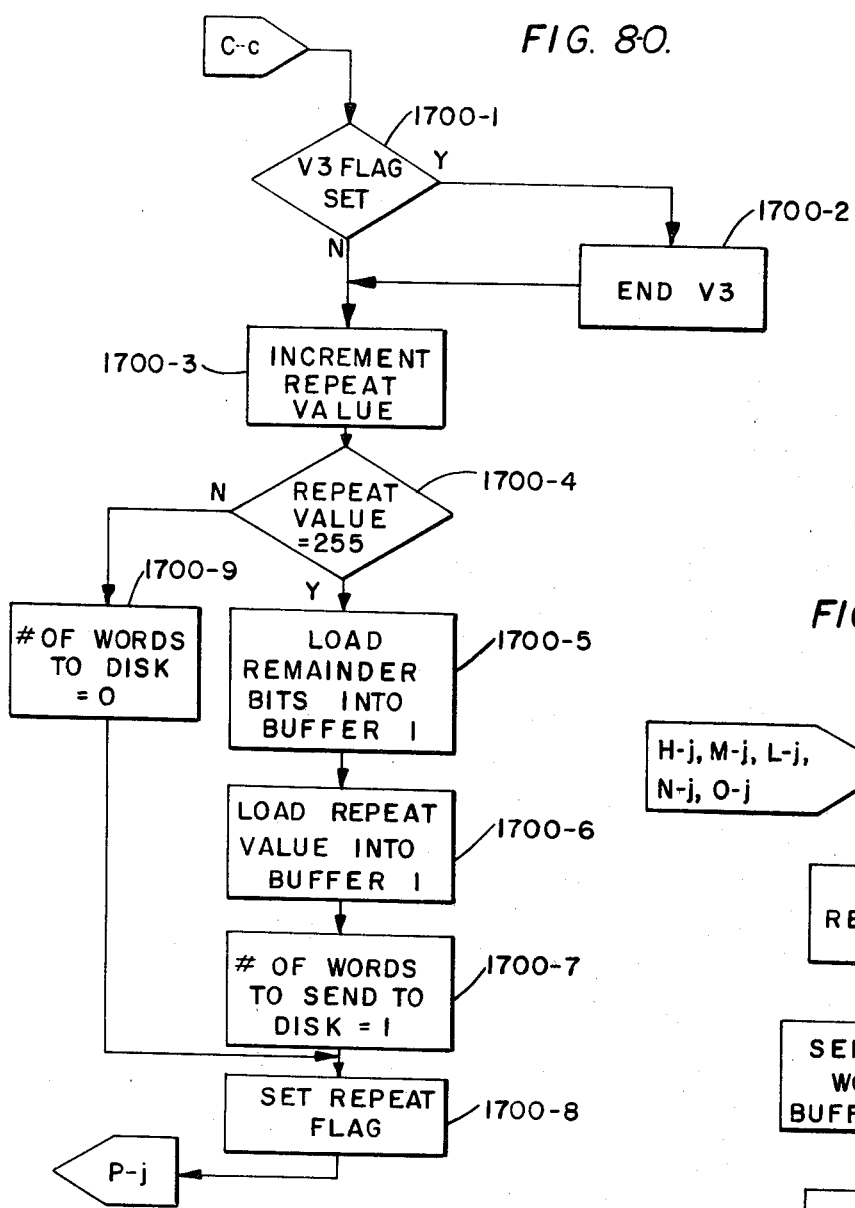
Figure 8P:
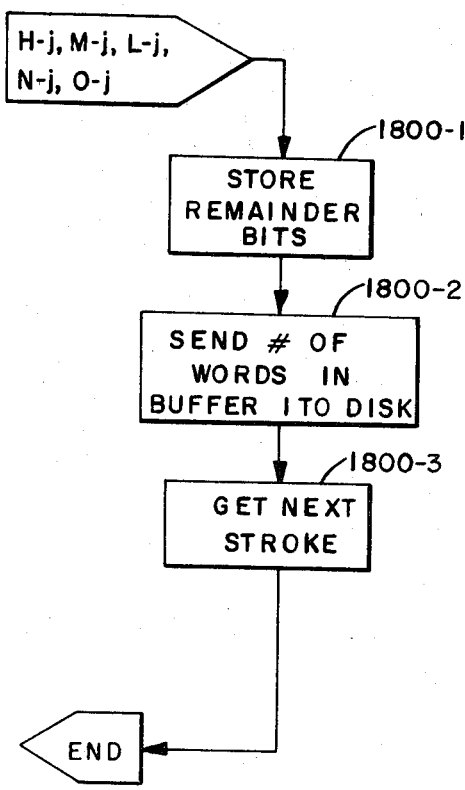
Figure 8Q:
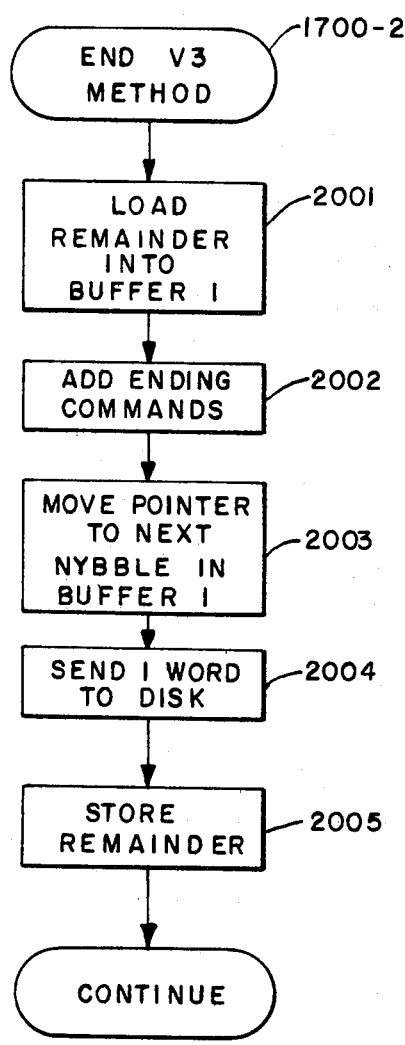
Figure 8R:
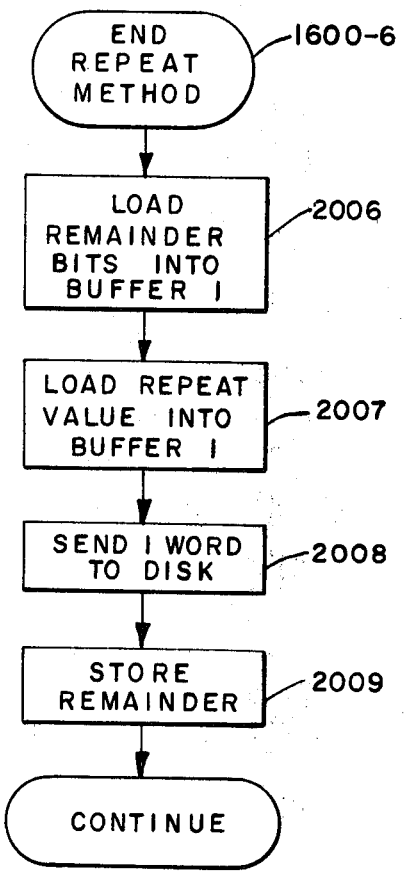

The process for determining which of the above methods of compacting is to be used is set out in FIGS. 8A to 8R, which show in step-by-step fashion the sequential steps as implemented by a plurality of routines for selecting the method of compaction for each stroke and thereafter for compacting and transferring the compacted data from the intermediate storage 47 via the logo magnetic disc controller 92 to the logo magnetic disc 94. In FIG. 8A, there is shown a high level flow diagram of the overall method of selecting one of the above compacting methods. After the initial start step 900, the transitions of the first stroke as initially stored in buffer 2 are transferred to buffer 1, and thereafter the new transitions from the next successive stroke are loaded into buffer 2, as indicated in step 904. Step 906 examines each transition loaded initially into the buffer 2, to insure that it is not an extraneous particle or scratch placed onto the logo or its carrier 4. As will be explained in detail with reference to FIG. 8B, an examination is made of two adjacent transitions to insure that they are not spaced apart less than two vertical counts from each other; if so, these transitions are ignored. In addition, a value as initially detected of the lower active area limit (LAAL) is substracted from the value of the transition.

In the next step 1000, a test is conducted upon the transition values appearing in buffer 1 and buffer 2 corresponding to those transitions of a first and a successive or adjacent stroke. Basically, the transitions stored in buffers 1 and 2 are compared and, if the differences do not exceed −8 or +7, step 1000 indicates that the transitions of that stroke may be eligible for the REPEAT method or one of the DELTA methods. If a flag is set in step 1000 indicating that the logo data as stored in buffers 1 and 2 is eligible for the REPEAT or DELTA methods, step 1002 branches the process to step 1004, wherein the decision is made whether the logo data is to be compacted by the REPEAT method or one of the DELTA methods. Basically, the step 1004 examines the transitions as stored in buffers 1 and 2 to determine whether there has been any change in the position of the transitions and if not, step 1004 branches to the REPEAT method wherein in step 1700 a REPEAT code indicating the number of strokes that are identical to each other and are to be repeated, is encoded. More specifically, as each recurring stroke of the CRT light spot occurs, successive strokes are compared and, if identical, transitions appear in successive strokes, the REPEAT code number is incremented by one up to a maximum illustrative of 255 strokes. After the completion of the compaction by the REPEAT method, the compact data is transferred from the intermediate storage 47 under the control of logo disc controller 92 to be stored in the logo magnetic disc 94, as indicated by step 1800. However, if, in step 1004, it is determined that there has been a difference in the transition values between successive strokes, the process is transferred to step 1600 wherein, depending upon the change of the transition values from one stroke to the next, one of the DELTA methods 2, 3 or 4 is selected to encode the bit words in the buffer 1, before being transferred to the logo magnetic disc 94 by step 1800.

If in step 1002, it is determined that a flag was set in step 1000 indicating that the delta or repeat methods were ineligible, the process is transferred to step 1100, wherein the number of bits necessary to encode the logo data in accordance with the VECTOR 3 method is counted and an indication thereof stored, to be compared with the number of bits resulting from the logo data compacting in accordance with the AUTO-SECTOR method. Next, the process is transferred to step 1200 wherein the date is compacted in accordance with the AUTO-SECTOR method to encode and store compressed four bit words in buffer 1. Next, in step 1300 one of the AUTO-SECTOR, VECTOR 3 and SECTORED TRANSITION methods is selected dependent upon which of the three methods resulted in the least number of data bit that would be required to compact the transition data of the stroke under consideration. If step 1300 selects the AUTO-SECTOR method, the data that has previously been compacted and stored in buffer 1, is at that time transferred to the magnetic disc 94 by step 1800. If, however, the VECTOR 3 method is selected, the logo data is compacted by the rules previously discussed into words of three, six or nine bits which are then compressed into 16 bit words and thereafter transferred to the logo magnetic disc 94 by step 1800. If the SECTORE TRANSITION method is selected in step 1300, the logo data is compacted into a series of eight bit words in buffer 1 and is thereafter transferred to the logo magnetic disc 94 by step 1800.

The steps generally indicated in FIG. 8A are described in detail in the following, wherein the steps of each routine associated with each block of the process of FIG. 8A is set out, with each step therein being identified with a number corresponding to the block numbers. For example, in FIG. 8B, the steps that make up the block 906 in FIG. 8A are identified with a prefix 906. Referring now to FIG. 8B, the initial steps 900, 902 and 904 are shown whereby transition data of two successive strokes are respectively transferred to buffers 1 and 2 and the step routine 96 is now implemented to remove or discard data representing transitions due to scratches or undesired particles that have become loaded upon the logo during the scanning process. Assuming that the logo, as shown in FIG. 7A, is comprised of a clear or light transmitting background and of an opaque character, the routine 906 is designed to first ascertain the existence of clear, extraneous scratches as would appear in the opaque portion of the character, and thereafter to ascertain the existence of dark or black particles that may lodge on a clear portion of the logo. First, after storing the logo data into the buffers 1 and 2, step 906-1 determines which transition stored in the buffer 1 is to be examined. Setting N equal to two for a logo with a clear background, insures that only even or sequences of opaque to clear and clear to opaque transitions will be examined. Thereafter, in step 906-2, each opaque to clear transition is compared with the following transition to see if the spacing therebetween is equal to one count and, if so as determined by step 906-2, the pair of transitions, i.e., opaque to clear and the subsequent clear to opaque transitions are designated as invalid and a flag is set to indicate their invalidity. After setting the flag the process moves to step 906-4 wherein a two is added to N whereby the next even or opaque to clear transition is examined, as explained above. If the transition under consideration is not the last, step 906-7 returns the process to examine the next even transition. If the last even transition has been examined, step 906-7 moves the process to examine clear to opaque transitions as in step 906-8, which sets N, i.e., the number of the transition, equal to one wherein only odd or clear or opaque transitions are examined. Step 906-9 determines whether there is such a transition and if so the process moves to step 906-10, wherein the spacing between an odd transition and the next subsequent transition is examined to see if it is equal to one and if so, a flag is set in step 906-11 indicating the invalidity of that pair of transitions as being an extraneous particle lodged on the logo. After step 906-9 and 906-11, step 906-12 increments the step under consideration and if the transition is not the last in a stroke, as determined by step 906-13, the process is repeated to examine the next even transition and the subsequent transition thereafter. After the last odd transition has been examined, step 906-13 moves the process to step 906-14, wherein the invalid transitions, as identified by steps 906-2 and 906-10, are erased from buffer 1 by step 906-14 before the data is transferred for further examination. In addition, step 906-15 subtracts the lower active area limit (LAAL) so that it is only necessary to encode and compact data within a narrower range thereby minimizing the storage area required for the compacted logo data.

The process now transitions from steps 906, as shown in FIG. 8B, to step routine 1000, as shown in FIGS. 8C and 8D. The transition arrow, as used in FIG. 8B, is designated "B-a", the B indicating the figure on which it appears and the "a" indicating the transition point. As shown in FIG. 8C, the transition is made to arrow C-a, the C indicating the figure and the "a" indicating that the process is transferred from the arrow B-a of FIG. 8B. Generally, the routine as shown in FIG. 8C determines whether the logo data is capable of being compacted by either the REPEAT method or one of the DELTA methods and thereafter encodes selected data in accordance with the DELTA 2 method. Step 1002 examines the number of transitions currently stored in buffers 1 and 2 to determine whether the same number of transitions exist in adjacent strokes and is so, determines that the logo data may be compacted in accordance with either the REPEAT method or one of the DELTA methods. If so eligible, the process is moved to examine the first transition by step 1004-1 and to calculate the DELTA or difference in the y-axis orthogonal values or counts of a given transition in one stroke and the successive stroke. The calculated DELTA is stored by step 1004-3 in the first buffer. If the calculated DELTA is greater than 8 or less than −7, step 1004-4 causes step 1004-17 to set an ineligible flag indicating that the method may not be encoded by one of the DELTA mehods. If within the limits as set by 1004-4, step 1004-5 determines whether the transition under consideration is the last transition within a stroke and if not, the next transition is brought out by step 1004-6 to have its DELTA calculated by step 1004-2. This process repeats itself until the last transition is examined as determined by step 1004-5 and if the Δ's for each of the transitions within the stroke have been calculated, the process moves to the steps 1004-7 and following, for determining whether a DELTA method or REPEAT method should be undertaken. In step 1004-8, the limits with which the delta value is to be compared are set to +0 and −0 (i.e., no difference in the transition values) and thereafter the transitions beginning again with the first are reconsidered by step 1004-9, and the delta value of the first transition is obtained by step 1004-10. Step 1004-12 determines whether the orthogonal values of the first transition change. Step 1004-13 determines whether the transition under consideration is the last and if not, step 1004-15 calls the next transition whereby its calculated delta value is obtained from buffer 1 by step 1004-10. This process continues until the last transition within a stroke is detected by step 1004-13. If all the Δ's as calculated for the transition within a stroke have fallen within the limits of +0 and −0, i.e., no change, step 1004-16 selects the REPEAT method of compacting and a transition will be made from arrow O-c to calculate the REPEAT code by routine 1700, as shown in FIG. 8-0. If not within the limits of +0 and −0 as determined by step 1004-12, the process moves via the arrow D-d to the routine of FIG. 8D, as will be subsequently explained.

Returning to the top of FIG. 8C, if step 1002 determines that the number of transitions is not the same in a first and subsequent stroke, it is known that the method of compaction is not one of the REPEAT or DELTA methods and further examination is made to determine which of the remaining methods could be selected. To this end, the process moves from step 1002 to step 1002-1, wherein it is determined whether the REPEAT flag is set and if so, the repeat value is calculated and stored and the flag is removed in step 1002-2. If the REPEAT flag is not set, the process moves from step 1002-1 via arrow E-b to the routine 1100 as shown in FIGS. 8E and 8F.

In the routine as shown in FIG. 8D, the selection process determines which of the DELTA 2, DELTA 3 and DELTA 4 methods is to be selected for encoding the logo data. First, the process examines by step 1004-18 whether the DELTA 2 method is to be selected. In particular, the limits of +1 and −2 are set by step 1004-20, and the same delta is obtained from buffer 1 by step 1004-24 to be compared by step 1004-26 against the defined limits of +1 and −2. If within the set limits and it is not the last transition, the next transition is called and so tested. If the last transition has been examined as determined by step 1004-44 and it is determined that all transition are within the limits of +1 and −2 as determined by step 1004-26, step 1004-43 sets the selected method to be the DELTA 2 method.

If, however, step 1004-26 determines that the particular delta of a particular transition is not within the limits of +1 and −2, it is next examined to determine whether the method may be compacted by the DELTA 3 method as initiated in step 1004-28. Next, a new set of limits of +3 and −4 are set by step 1004-30, and the same delta may be withdrawn from the first buffer by step 1004-34. Step 1004-36 determines whether the delta of a particular transition is within the delta limits of the DELTA 3 method and further, and if after the examination of the last transition by step 1004-40 all of the deltas of the transitions within a stroke have fallen within the limits of the DELTA 3 method, step 1004-42 selects the DELTA 3 method of compacting. However, if a single transition within a stroke does not meet the limits of the DELTA 3 method, as decided by step 1004-36, the DELTA 4 method is then set.

At the end of he process shown in FIG. 8D, it has been determined which of the DELTA 2, DELTA 3 and DELTA 4 methods is used to compact the logo data. At this point, the process transfers to the routine 1600 as shown in FIG. 8N, wherein the delta values are placed into 2, 3 or 4 bit words and stored in the buffer 1. Generally, routine 1600 determines the size of the word in which the Δ's or differences from the position of one transition to its position or y-axis value in the subsequent stroke is selected, dependent upon the number of bits to code the deltas. As discussed above, for relatively small Δ's , a two bit word is employed to encode the transitions in the DELTA 2 method as set out in Table 1 above. For intermediate values of Δ's , three bit words are employed by the DELTA 3 method as set out in Table 2 above and for larger transitions, a four bit word is required for the DELTA 4 method, as set out in Table 2 above. With reference to FIG. 8N, the process initially clears other flags that may have been set; in particular, step 1600-2 determines whether the V-3 flag is set and if so, the V-3 method is ended and the V-3 flag is removed by step 1600-3 before the remaining bits in buffer 1 are loaded. If the REPEAT flag is set as determind by step 1600-5, an end REPEAT step 1600-6 is set whereby the repeat valve is calculated and stored and the REPEAT flag is removed. After the remaining bits have been set into the buffer 1, step 1600-7 determines whether the DELTA 2 method has been selected and if so, the size of the word for the DELTA 2 method, i.e., two bits, is set. Similarly, if the DELTA 3 method is selected as determined by step 1600-9, a three bit word is set by step 1600-10. If neither a DELTA 2 or DELTA 3 method has been selected, step 1600-12 sets the word size to be four bits for the DELTA 4 method. Thereafter, in step 1600-13, a pointer is set to the beginning of buffer 1 and the first delta value is obtained from buffer 1 and is loaded into the first K bits of the buffer 1 by step 1600-15. If the delta is not the last delta as decided by step 1600-16, the next delta is obtained in step 1600-17 and is loaded by step 1600-18 into the next K bits of buffer 1; the K may be 2, 3, or 4, as determined by steps 1600-7, 1600-9 or 1600-12. Upon the occurrence of the last delta as determined by step 1600-16, a determination is made whether the current method is the DELTA 3 method by step 1600-19 and if so, a pointer is advanced by step 1600-20 to the next nybble, i.e., a four bit word within the buffer 1. The DELTA 3 method employs only three bits in order to encode a word and that it would be necessary to maintain the four bit character of the buffer 1. Thereafter, the DELTA method has been completed and its compacted logo data is transferred from the buffer 1 to the magnetic disc 94.

If, however, the logo data is of a nature that it may not be compacted by one of the REPEAT method or DELTA methods, i.e., the number of transition changes from one stroke to the next, as decided by step 1002 of FIG. 8A or the delta values exceed −8 or +7, the process then needs to select which of the VECTOR 3, AUTO-SECTOR or SECTORED TRANSITION methods is to be employed. To accomplish this, the process moves to step routine 1100, as more fully explained with respect to FIGS. 8E and 8F. In particular, an entry is made from step 1002 via entry C-b to step 1100-1, which determines whether there are more than 31 transitions within a stroke and if so, a determination is made by the routine 1100 of the number of bits required to compact the logo data in accordance with the VECTOR 3 method. If there are less than 31 transitions within a stroke, step 1100-1 directs the process to the routine 1200 wherein the data is compacted by the AUTO-SECTOR method, as more fully shown in FIG. 8G. As shown in FIG. 8E, if it is determined by step 1100-1 that there are more than 31 transitions, the following process 1100 determines the number of bits required to compact the logo data by the VECTOR-3 method. Initially, step 1100-2 resets the bit counter to zero. Thereafter, the value of the "previous" transition is also set to zero by step 1100-3, before the orthogonal value of the first transition is obtained and applied to step 1100-5, wherein its run length is calculated. The run length of a transition is the orthogonal distance along the y-axis from the lower active area limit or the last transition, to the orthogonal value of the present transition. With reference to FIG. 7A, the first run length is that distance between the LAAL and the position of the first transition. The value of the current transition is then set by step 1100-6 into a storage location marked previous transition to indicate the point from which the run length is to be encoded, to the next transition. Thereafter, each of the possible jump values as set out in Tables 6, 7 and 8 is selected to be compared with the run length to determine the combination of jumps and vectors that are necessary to define the distance from the previous transition value (or zero if the first transition) to the next transition. If the current jump value is too large, a smaller jump of the possible jumps is selected for comparison until the largest possible jump less than the run length is found to define the next transition. A decision is made whether the run length is less than 66 counts, if so, the run length may be encoded as one of a plurality of vector lengths and it is not necessary to accumulate the run length with a jump. However, if the run length is greater than 66 it is necessary to code the run length as a combination of a jump and a vector, as shown in FIG. 7A.

If it is necessary to employ a jump, the length of the run length is compared by step 1100-8 first with the largest jump value, i.e., 832, and if the first selected jump value is less than the measured run length, the number of bits to encode that jump value is obtained by step 1100-10. These number of bits are then added to the total number of bits previously required to encode the logo data. Thereafter, the jump value is subtracted from the run length and the difference, i.e., is compared is step 1100-8 to determine whether it is less than 66; assuming so, the remaining length is then encoded as one of the available vectors. Returning to step 1100-9, if the jump value is greater than the run length, it is necessary to obtain a smaller jump value. Thus, it can be seen that jump values of the possible values as set out in Tables 6, 7 and 8 are selected in decreasing order until a jump value is found to be less than the run length and that jump value is selected and the number of bits to encode it are tabulated. After a particular jump value is selected, the process branches from step 1100-8 to 1100-16 wherein the number of bits to encode the particular vector length is determined and that number of bits is set into the bit counter, whose output indicates the total number of bits to encode the transitions of a stroke by the V3 method. If this is the last transition within a particular stroke, the process transfers to the further steps of the routine 1100 as shown in FIG. 8F. If not, the next transition within the stroke is obtained and the compacting or encoding of its run length from the previous transition is calculated in terms of the largest jump required, subtracting that value from the run length to determine the resulting vector, encoding the length of the jump and the resultant vector and adding the number of encoding bits required for both the jump and vector to the bit counter.

After the last transition has been so examined as determined by step 1100-18, the process transfers via arrow F-f to step 1100-20 of FIG. 8F, where step 1100-20 determines the run length between the last transition and the upper area limit. If the vector length is in the order of 3 to 8 units or counts in length, as decided by step 1100-21, three bits are added to the total bits by step 1100-25. If not, 832 counts are subtracted by step 1100-23 from the run length as determined in step 1100-20 and six bits are added to the total in step 1100-23 to indicate that it would take six bits to encode this length. If the length is not less than zero as determined by step 1100-24, the process is repeated adding still more bits to the total to indicate that the length requires a further word to encode. If the vector length is less than zero, the process moves to step 1100-26 where if the V3 flag is not set, the process moves via arrow G-e to routine 1200 and if the V3 flag is set, step 1100-27 substracts nine bits from the total which effect that cost required to transfer out of the VECTOR 3 method and must be accounted for in determining the total space required to compact logo data, if an alternative method is chosen thereafter.

In the routine 1200, as shown in FIG. 8G, the logo data is encoded by the AUTO-SECTOR method and is stored in buffer 1. To this end, entry is made to step 1200-1 wherein the counter recording the number of jumps, i.e., a designated location within the main memory of the digital computer 46, is set equal to zero. Thereafter, step 1200-2 collects the orthogonal value of the first transition, and thereafter sets the storage location for the orthogonal value for the previous transition to zero in preparation for considering the first transition. Thereafter, if the V3 flag is set as determined by step 1200-4, an end V3 instruction is executed in step 1200-5. After the V3 method has been cleared or if the V3 flag was not set, step 1200-6 loads any remaining bits into buffer 1, before calculating the first run length as that distance between the lower active area limit and the orthogonal value of the first transition. This value of the first transition is then in turn stored by step 1200-8 in a location of buffer 1 indicative of the orthogonal value of the previous transition, to be available to calculate the run length for the subsequent transition. If the run length is determined to be less than 12 by step 1200-9, the 4 bit value encoding its length, i.e., a vector as explained above with respect to FIG. 7A, is stored by step 1200-10 in a location of buffer 1. Assuming that the transition under consideration is not the last as determined by step 1200-11, the orthogonal value of the next transition is accessed by step 1200-12 and its run length calculated in step 1200-7.

Assuming that the run length is greater than 11, the maximum length that may be encoded for a vector length, routine 1200 has determined that a jump must be used to define in combination with a vector length the run length from the value of the previous transition. At that point it is necessary to determine the size of the jump required. To this end, step 1200-13 determines whether the run length is greater than 48 and if not, whether the run length is less than 24 by step 1200-19. Similarly, if the run length is greater than 48, as determined by step 1200-13, a determination is made in step 1200-14 whether the run length is less than 96. From these decisions it is known whether a jump of 12, 24, 48 or 96 is required. If, for example, it is decided that a jump of 12 is required, i.e., step 1200-19 decides that the run length is less than 24, a jump of 12 counts is stored in buffer 1 by step 1200-22 and thereafter, a count of 12 is subtracted from the transition's run length. Similarly, if it is decided the run length is greater than 24, a jump of 24 counts is stored by step 1200-20 in buffer 1 and a value of 24 counts, i.e. a four bit value of 13, is subtracted by step 1200-21 from the run length. Similarly, if the run length is determined to be less than 96, a jump of 48 is stored by step 1200-17 in buffer 1 and that value is subtracted from the run length by step 1200-18. Similarly, if the run length is greater than 96, a jump of 96 is stored by step 1200-15 in buffer 1 and that value is subtracted by step 1200-16 from the run length. After the jump has been stored in buffer 1, step 1200-24 increments the jump counter by 1. At this point in the process, jump has been subtracted from the run length and may be less than 12 as decided by step 1200-9; now, the length of the vector, i.e., a segment of the run length less than 12, is encoded and the encoded data is stored in buffer 1 by step 1200-10. This process is repeated for the next transition which is called up by step 1200-12, until the last transition is detected by step 1200-11 and a branch is made to step 1200-25, wherein the distance from the last transition to th upper active area limit is determined and is thereafter stored by step 1200-26 in buffer 1. At that point, the jump count is incremented by adding one to the previously stored number of jumps and the value of 96, i.e., the larget jump, is substracted from the run length determined to be the distance between the last transition and the upper area limit, and the result of the subtraction is examined as to whether it is less than zero. If not, the process is repeated, the jump count incremented by one and a further value of 96 subtracted. The steps 1200-25 to 1200-29 encode and store into buffer 1 and calculate the number of jumps 96 that are necessary in order to advance the stroke from the last transition to a point above the upper active area limit, whereby the stroke is terminated and the process is advanced to the next stroke.

Thereafter, the process is transitioned via arrow G-g to the routine 1300, as more specifically shown in FIG. 8-H, to compare the number of bits required to compact each of the VECTOR 3, SECTORED TRANSITION, and AUTO-SECTOR methods of compacting to select that one method of data compaction that produces the smallest quantity of logo data. The process transitions to step 1300-2, wherein the number of bits required for the SECTORED TRANSITION method is calculated. As described above, in the SECTORED TRANSITION method, the transitions in each stroke require a first word indicating in which sectors of the possible eight sectors the transitions occur and a subsequent eight bit word to decode each such transition within the indicated sectors. Thus, step 1300-2 determines the number of transitions within a stroke to calculate the number of bits to encode these transitions, in terms of 8 bits per transition plus 8 bits for the lead word. Thereafter, step 1300-3 calculates the number of bits required for the AUTO-SECTOR method. The decision is then made in step 1300-4 whether the number of bits required to compact the transition by the SECTORED TRANSITION method is greater than that required to compact the transition data by the AUTO-SECTOR method. If so, a further decision is made in step 1300-5 of whether the number of bits required to compact the transition data by the AUTO-SECTOR method is greater than that required to compact the transition data in the VECTOR 3 method. If in step 1300-5 it is determined that the AUTO-SECTOR method requires a lower total number of bits, step 1300-6 sets a flag to indicate that the AUTO-SECTOR method is the selected one. As described above with respect to FIGS. 8E and 8F, the jumps and vector lengths have been defined, and the encoded data is now stored in buffer 1. After step 1300-6 the process is transferred to step routine 1800 wherein the data is shifted from buffer 1 to the magnetic disc 94.

If the storage space required to store the SECTORED TRANSITION method is less, as determined by step 1300-4, than the space required to store the compacted data by the AUTO-SECTOR method, a further decision is made in step 1300-7 as to whether the number of bits required to store logo data compacted by the SECTORED TRANSITION method is less than that required by the V3 method; if less, the SECTORED TRANSITION method is selected and its flag set in step 1300-8. To initiate the SECTORED TRANSITION method, a check is made in step 1300-9 as whether the VECTOR 3 flag has been set and if so the VECTOR 3 method is terminated in step 1300-10, before transferring to routine 1500, as will be explained with regard to FIG. 8M. On the other hand, if either the spece required to store the data in accordance with the VECTOR 3 method is less than that required to store logo data compacted by the SECTORED TRANSITION method, as determined by step 1300-7, or the space required to store logo data compacted by the VECTOR 3 method is less than that required to store the logo data compacted by the AUTO-SECTOR method as determined by step 1300-5, step 1300-11 selects the VECTOR 3 method and a VECTOR 3 flag is set before transitioning to the routine 1400, wherein the loop data are compressed into three or six or nine bit words and then stored in buffer 1, as will now be explained with regard to FIGS. 8J, 8K, and 8L.

Thus, the VECTOR 3 method has been selected and entry is made via arrow H-i to the routine 1400 as shown in FIG. 8J. Any remainder bits are loaded by step 1400-1 into buffer 1 before clearing the previous transition in step 1400-2. Thereafter, the orthogonal value of the first transition is obtained in step 1400-3 and its run length (with respect to the lower active area limit) is calculated in step 1400-4. Before proceeding, the run length is stored in that position reserved for the orthogonal value of the previous transition to aid in the calculation and encoding of the orthogonal values of subsequent transitions. If the run length is less than 66, the process proceeds to the step 1400-13 shown in FIG. 8K, wherein the vector length is selected and appropriately compacted. If, however, the run length is determined to be greater than 66 by step 1400-7, the run length of a transition is compared with a series of the potential jump values as set out above with respect to Tables 6, 7 and 8, starting with the largest jump value 832 as initially set in step 1400-6. It is now necessary to choose an appropriate jump value and to subtract the value of the selected jump from the run length thereby determining the vector length terminating in a transition. To this end, step 1400-8 determines whether a selected jump value is greater than the run length, starting first with the maximum jump value of 832 and thereafter obtaining smaller values for comparison. If the run length is greater, the jump value with which the run length is compared is called in step 1400-10 and its value is stored by step 1400-1 in the next six or nine bits in buffer 1. Thereafter, the value of the jump is subtracted by step 1400-12 from the run length. A further smaller jump value is set by step 1400-27 to be compared subsequently in step 1400-8 to the difference provided by step 1400-12, on the condition that the difference is still greater than 66 as determined in step 1400-7. This process continues until a run length of less than 66 counts has been achieved.

A vector length has been now determined and the process moves through transition arrow K-k to the steps for determining which vector length is selected and also to encode and compact its length before storing in buffer 1. To this end, as shown in FIG. 8-K, step 1400-13 determines whether the determined vector length is within the range of 3 to 8; if so, the process moves to step 1400-14 wherein an appropriate three bit value encoding the length of that vector length is chosen and is stored in buffer 1 by step 1400-15. If the vector length is longer, the process moves to step 1400-17, wherein a decision is made whether the vector length is in the range of 13 to 65; if so, the appropriate nine bit value is selected by step 1400-16 and that value is stored in the next nine bits in buffer 1 by step 1400-27. If the vector length is greater than 8 and less than 13, the appropriate six bit value is determined by step 1400-18 and is stored in the next six bit space in buffer 1 by step 1400-19. After the vector length has been encoded, a search is conducted for the next transition if not the last whereby the process is taken back via arrow K-1 to step 1400-4 whereby the run length value of the next transition is determined. The process in accordance with the steps of FIGS. 8J and 8K continue until the last transition has been examined after which the process transfers through transition arrow K-m to the steps as further shown in FIG. 8L. In particular, the distance between the last transition and the upper area active limit is determined by step 1400-22. This last vector length as calculated by step 1400-22 is the distance from the last transition to the upper active limit and is that distance that is necessary to be added to the accumulated values of transitions to exit from that stroke and to commence the method of compacting the next adjacent stroke. In step 1400-23, the value of 832 is subtracted from the previously calculated vector length and if less than zero, an exit is made from the present stroke. To achieve this exit, the value of 832 as encoded by the octal code $67_8$ is added to the present transition value to place the accumulated value of the stroke above the upper active area limit. Step 1400-26 determines whether the vector length is less than zero and if so the transition to the next stroke is made.

If, however, in step 1300-8, as shown in FIG. 8H, the SECTORED TRANSITION method is selected, a transition is made through arrow H-h to the routine 1500, the steps of which are shown in detail in FIG. 8-M. Generally, the steps of the routine 1500 compact the logo data to establish a first eight bit word indicative of those sectors in which the transitions occur, followed by a series of second eight bit words identifying the position of each transition within the designed sectors. First, the first or lead word identifying the sectors in which the transitions occur is set to zero by step 1500-1 and thereafter the remainder bits are loaded into buffer 1 by step 1500-2. The clear bit identifying that this is the last transition within a sector is cleared by step 1500-3, and the orthogonal value or count of the first transition is obtained by step 1500-4. Thereafter, a mask is set by step 1500-5 for sector bits 8, 9 and 10, thereby determining the sector in which the first transition occurs, and in step 1500-6 a corresponding sector bit is placed in the lead word location within the buffer 1 thereof. Thereafter, the transition value or the relative orthogonal location within a sector is encoded and is set into the seven least significant bits of the transition value temporary storage location by step 1500-7. At that point the tagged bit, i.e., the most significant bit of the eight bit transition value word is cleared in step 1500-8. If this is not the last transition as determined by step 1500-9, the next transition is examined. First, the storage location indicating the previous sector is made equal by step 1500-10 to the location of the sector under consideration, and the orthogonal data of the next transition is brought up in step 1500-11. Next in step 1500-12, the bits 8, 9 and 10 in the new transition are masked and a determination is made by step 1500-13 of whether this transition is a part of the present sector. If in the same sector the method proceeds to step 1500-16 where the transition value is moved from its storage location and is stored in the next eight bits of buffer 1. If the new transition is in a subsequent sector than that last encoded transition, the corresponding sector bit of the lead word is encoded by step 1500-14 and thereafter, the eighth bit in the storage location containing the transition value is set to one in step 1500-15. Thereafter, the stored transition value is set into buffer 1 by step 1500-16 before continuing to obtain the orthogonal value of the new transition by step 1500-17. Thus, it can be seen in FIG. 8M that successive transitions are considered, setting the sector bit in the lead word and setting the tag bit in the transition value storage location, if a new sector is being examined, storing the 8 bit transition value in buffer 1, and thereafter encoding the new transition value and placing it in the temporary storage location. Upon indication that the last transition within a stroke is under consideration by step 1500-9, the tagged bit in the eight bit temporary storage word is set and thereafter, the transition value of that last transition is stored in buffer 1 by step 1500-19, before causing the data as compacted in accordance with the SECTORED TRANSITION method to be transferred to the logic magnetic disc 94 by step routine 1800.

If step 1004 determines that the logo data is eligible to be compacted by the REPEAT method, the process proceeds via arrow C-c to the calculatd REPEAT routine 1700, whose steps are shown in more detail in FIG. 8-O. First, a search is made in step 1700-1 to determine whether the V3 flag is set and, if so, the Vector-3 method is ended in step 1700-2 before advancing to step 1700-3, which increments the repeat value, i.e, that value indicative of the number of strokes of the CRT light spot that has been made with identical transition points and values. If the repeat value is not equal to 255, i.e., the maximum value, as determined by step 1700-4, the instruction 1700-9 prevents the repeat value from being transferred to the magnetic disc 94 until the REPEAT method is ended prior to the use of another method. The repeat flag is set in step 1700-8 indicating that this method is in use. Thereafter, the process moves to the routine 1800, wherein the logo data compacted by the REPEAT method is transferred to the logo disc 94. However, if the repeat value is equal to 255, as determined by step 1700-4, any remainder bits are stored into the buffer 1 in step 1700-5. Thereafter, the repeat value is loaded by step 1700-7 into buffer 1 and a single 16 bit word is sent to the logo magnetic disc 94.

At the completion of the DELTA, the AUTO-SECTOR, the VECTOR 3, and the SECTORED TRANSITION methods, the process transfers to step 1800-1 as shown in FIG. 8P wherein the remainder bits are stored. By contrast, the transition from the REPEAT method is transferred directly to step 1800-2 wherein next the number of words stored in the buffer 1 as derived from each of the methods is sent to the magnetic disc 94 before initiating the next stroke of the CRT light beam, by step 1800-3. In FIG. 8Q, there is shown a series of "housekeeping" steps that are required at the end of the VECTOR 3 method wherein when the end V3 flag is set, as in step 1700-2. It is necessary to load the remainder bits into buffer 1, to add ending commands by step 2000-2 and to move by step 2003 the pointer to the next nybble in buffer 1, before sending by step 2004 the first word to the logo magnetic disc 94. Thereafter, the remainder, if any, is stored in buffer 1 by step 2005.

In FIG. 8Q, the steps of the end V3 method as generally shown in various of the routines above, for example, step 1200-5 of FIG. 8G, are shown in more detail. In the V3 method, it is assumed that this method will be run continuously for a number of strokes and it is necessary to set a flag in order to end this program. By contrast, the other methods (with the exception of the REPEAT method) select for each stroke which compacting method is to be used. When desired to exit from the V3 method, any remainder is transferred into buffer 1 by step 2001, and an ending command, i.e., a six-bit word indicating the end of the method V3, is added by step 2002, before moving the pointer to the next nybble of buffer 1 by step 2003. Any remainder that may be left is sent via buffer 3 to the magnetic disc 94, before storing any further remainder in the next 16-bit word of the buffer 3. Finally, a return or continue step is made to the next step of the routine that was interrupted by the end V3 method.

Similarly, it is necessary to set a flag to end the REPEAT method, the steps of which are shown in detail in FIG. 8R. Any remainder bits are loaded by step 2006 into buffer 1 before loading the repeat value indicative of the number of strokes to be repeated into buffer 1 by step 2007. Next, the last word is sent to the magnetic disc 94 by step 2008 before storing any remainder in step 2009. At this point a return or continue is made to the interrupted routine.

Figure 5:
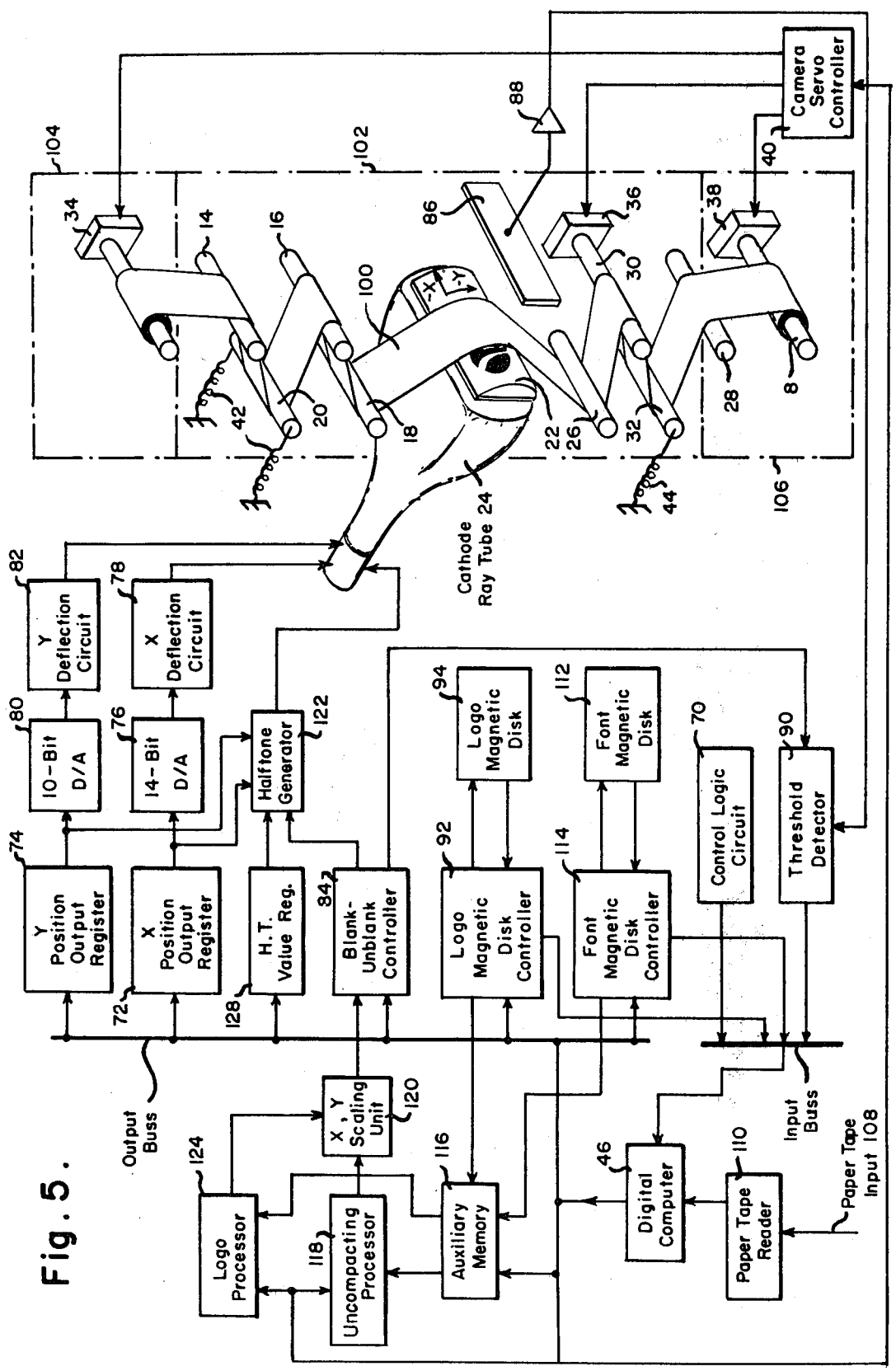
FIG. 5 is a block diagram of the present invention set up for its typeset mode of operation.

FIG. 5 shows phototypeset apparatus of the present invention set up for the typesetting mode of operation. In this mode of operation the logo carrier 4 is replaced by a photosensitive material 100 in the form of film or paper disposed within a camera shown schematically by the dotted block 102, having feed cassette 104 for dispensing the material 100 and a take-up cassette 106.

Both cassettes 104 and 106 may be removably detached from the camera 102 for loading and processing, respectively. The drive and tension control means for the material 100 is essentially the same as that described with respect to the logo carrier in FIG. 1. The material 100 is thus in a position to be exposed by the light output of the cathode ray tube 24 culminated by the fiber optic faceplate 22 so that precise exposure can occur over 1024 bit by 1024 bit format corresponding to the normalized em quad area.

The control logic circuit 70 is set to the typeset mode of operation and estblishes the digital computer 46 for operation in this mode. The input source for type data (as opposed to logo data) to be phototypeset is shown to be inputted as a paper tape input 108 into a paper tape reader 110. The input source is suitably encoded to include the following data: the style of type to be employed from the up to one hundred styles stored in a font magnetic disc 112; the case of the type; the vertical and horizontal sizing factors; the position of the letter or symbol, on line or otherwise; slanting of the characters; the letter or symbol and other parameters as desired. As previously mentioned, the data recorded for each of the type styles is uniquely adapted for each particular font. The decompacting processor 118 is designed to be responsive to provide the necessary output to generate the particular character demanded by the input.

The input source directs the digital computer 46 to request that the particular style of type recorded in the font magnetic disc 112 is read out under the control of the font magnetic disc controller 114. The selected style from the font magnetic disc 112 is translated through the font magnetic disc controller 114 to be stored in an auxiliary memory 116. The output of the font disc controller 114 is also provided to the digital computer 46 to instruct the computer of the location in the auxiliary memory 116 of the individual characters of the selected font. The function of the auxiliary memory 116 is to provide a fast access memory for the selected font rather than being required to employ the font discs 112.

Stored in the auxiliary memory 116 are a plurality of 16-bit word instructions suitable for use by the uncompacting processor 118 for the generation of the individual characters thereof according to the particular style of that font. As will be discussed, the function of the uncompacting processor 118 is to permit the reproduction of various fonts of type while employing a substantially reduced memory capacity as compared to the bulk storage of each coordinate of the 1024 by 1024 array. The output generated by the uncompacting processor 118 in response to the instructions from the auxiliary memory 116 is in a translational format since it must control the blanking and unblanking of the electron beam of the CRT 24.

The transitional output of the uncompacting processor 118 is suplied to an X-Y scaling unit 120 which also receives an input from the output buss defining the scaling factors desired for the particular character being generated. The transitional format outputted by the uncompacting processor 118 is in the normalized em quad format discussed above. By altering the sampling rate in response to the X and Y scaling factor selected, the scaling unit 120 may thus be controlled.

The output of the scaling unit 120 is applied to the blank-unblank controller 84 which functions in the same manner as described with respect to the recording mode of operation. Thus, whenever a light output is desired from the cathode ray tube 24, the controller 84 is unblanked; and is blanked if no light output is desired. In the present mode of operation, the halftone generator 122 shown connected between the blank-unblank controller 84 and the cathode ray tube 24, merely transfers the blank-unblank output of the controller 84 directly to the control grid of the cathode ray tube 24. Thus, a light output is provided from the fiber optic faceplate 22 to expose the material 100 each time the controller 84 is unblanked and non-exposure occurs each time the CRT is blanked in response to the output from the scaling unit 120. The deflection of the cathode ray tube 24 is controlled in a similar manner as that discussed with respect to the record mode, i.e., the digital computer 46 transmits X and Y digital coordinate positions to the register 72 and 74. The D/A converters 76 and 80 supply the proper analog signals to the X and Y deflection circuits 78 and 82, respectively.

Figure 6:
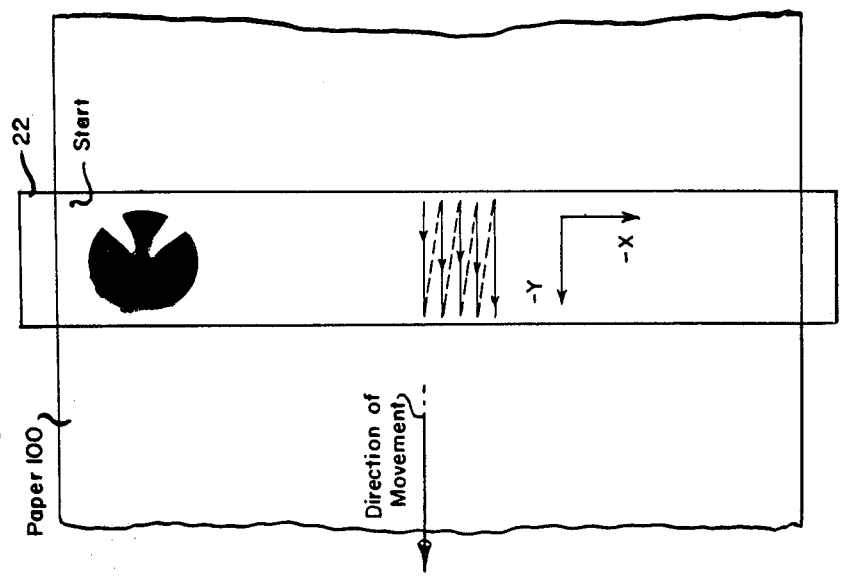
FIG. 6 is a schematic diagram used in explaining the typesetting mode of operation of FIG. 5.

Reference is now made to FIG. 6 which shows the orientation of a photosensitive material 100 having its photosensitive surface toward fiber optic faceplate 22 and the direction of scan as employed in the typeset mode of operation. The start of the scan is in the upper right hand corner of the faceplate 22 and proceeds as indicated on FIG. 6 in the $-Y$ direction for the fast scan and the $-X$ direction for the slow scan. Thus, a character is generated by exposing photosensitive material 100 from the bottom to the top of the character in fast scan and from left to right across the character in slow scan, with a line of characters being built up across the long dimension of the cathode ray rube faceplate 22.

Presume that the logo shown in FIG. 2 is now desired to be phototypeset in response to the access address being punched on paper tape input 108, the digital computer 46 requests the logo magnetic disc controller 92 to go to the particular requested address on the logo magnetic disc 94 and to output the logo data words compacted by the process explained above with respect to FIGS. 8A–R. The compacted logo data is transmitted by the controller 92 to be stored in the auxiliary memory 116. The auxiliary memory 116 is selected to have a capacity at least sufficient to store a standard font from the font magnetic disc 112 and large parts of a logo from the logo magnetic disc 94. The computer 46 is also provided with an input from the controller 92 advising the computer of the address location of the information stored in the auxiliary memory 116 with respect to the selected logo.

A logo processor 124 receives an input from the output buss of the computer 46 and also from the auxiliary memory 116 and is operative to generate a transitional output corresponding to the transitional information originally recorded in the record mode. The transitional output of the logo processor 124 is applied to the scaling unit 120, which is in response to the scaling information for the type data provided on the paper tape input 108 and translated by the computer 46, scales the logo output to the desired reproduction size. The output of the unit 120 is applied to the blank-unblank controller 84 which operates as previously described to cause a light output to occur in the unblanked condition and no light output to occur when blanked. The scanning operation of the CRT 24 proceeds as described previously, and the material 100 (as shown schematically in FIG. 6) is exposed in response to the light output from the CRT from the bottom to the top of the logo in the $-Y$ direction and from left to right of the logo in the $-X$ direction.

The operation of the logo processor 124 will now be more fully explained. The compacted logo data is transferred from the logo magnetic disc 94 to the auxiliary memory 116 to be applied to the logo processor 124 as a stream of data words of varying length, i.e., two, three, four, six or eight bits in length. The length of the word is defined by the method of compacting that was adopted to encode or compact the data dependent upon the configuration of the logo. The auxiliary memory 116 stores data in sixteen bit words with each new stroke starting at bit 0, 4, 8, or 12. Words are transmitted from the auxiliary memory 116 to the logo processor 124 with the least significant bit toward bit fifteen within an auxiliary memory word.

Figure 9:
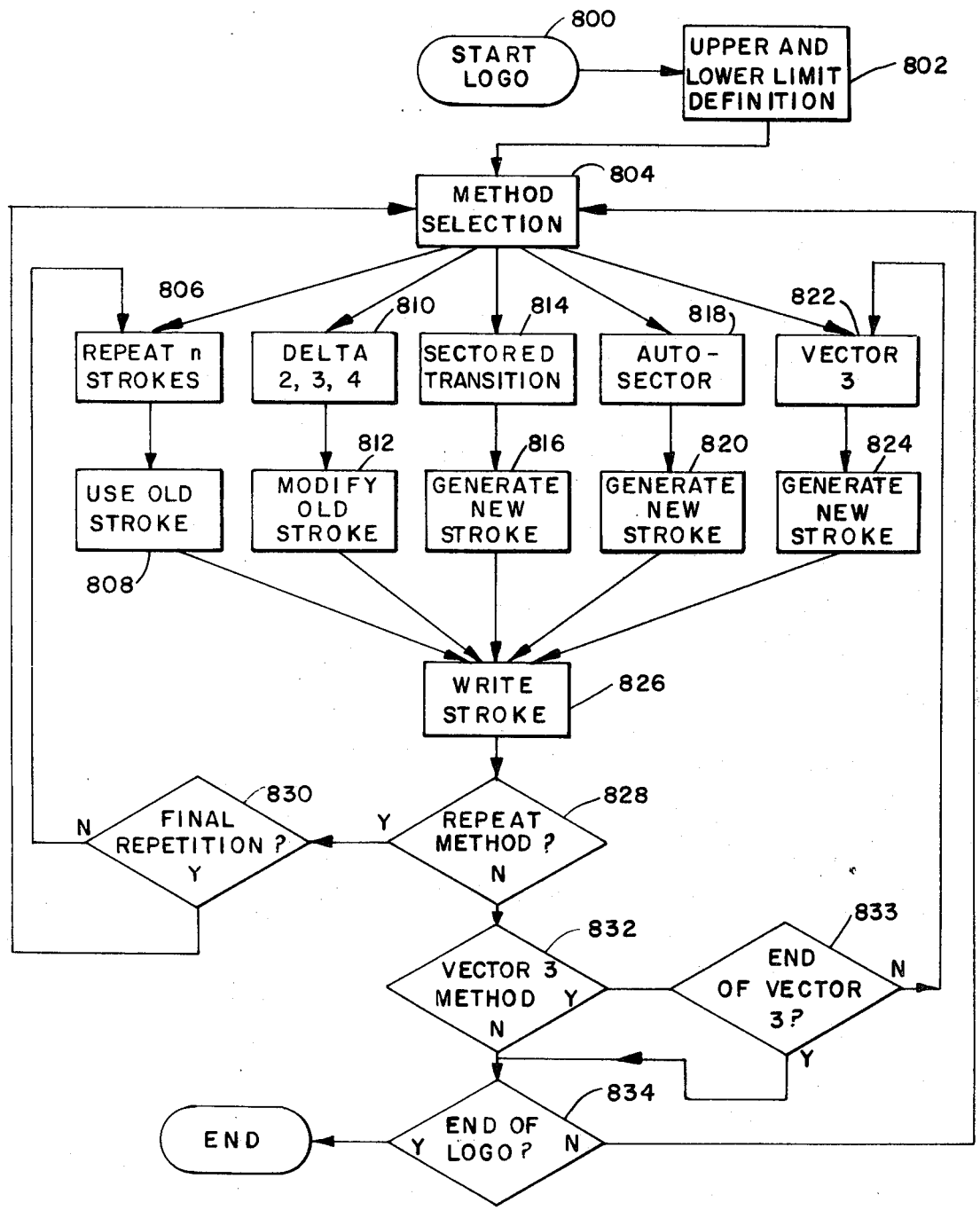
FIG. 9 is a high level flow diagram of the method by which the compacted data is decompacted to be displayed upon a cathode ray tube as shown in FIG. 5.

Referring now to FIG. 9, there is shown a high level flow diagram illustrating the steps of the process by which the logo compactor 124 operates to cause the CRT 24 to draw by a series of strokes upon the CRT face the logo that has been previously compacted and stored in the logo magnetic disc 94. With reference to FIG. 9, the process is initialized by transferring from the logo magnetic disc 94 to the auxiliary memory 116 logo data including four words that are placed at the beginning of the logo data at an auxiliary memory word boundary to define the lower active area limits (LAAL) and the upper active area limit (UAAL), as shown and described above with respect to FIG. 7A. The lower active area limit (LAAL) is a number chosen between zero and 1023 to define a point two counts below the lowest point at which logo data can occur. The upper active area limit (UAAL) is a number which defines the highest point at which transition data can occur. As explained above, these limits serve to limit the amount of data that need be compacted in that the transition values are defined with a relatively small range, for example, 0 to 105, as illustrated in FIG. 7A.

Next, the particular method of uncompaction is selected in step 804. In particular each block of logo data that has been encoded has a code word that is examined by the method selection step 804 to choose one of the REPEAT, DELTA, SECTORED TRANSITION, AUTO-SECTOR, or VECTOR 3 methods. For example, if the REPEAT method is selected, the process is transferred to step 806 wherein the old stroke is repeatedly written for a number of N times. The stroke is written in step 826, before determining in step 830 whether the final repetition has been carried out thereby terminating the REPEAT method. If the DELTA method is selected, the process moves to step 810, wherein the transition values of the last stroke are modified in accordance with the DELTA values as explained above. After the new transition values have been calculated, the next stroke is written in step 826. Thereafter, step 834 indicates that it is not the end of the logo at which time the process again determines which method is selected. For each of the SECTORED TRANSITION, AUTO-SECTOR and VECTOR 3 methods, the process transfers to steps 814, 818 and 822, respectively. In each of these three methods, a new stroke is generated based upon jumps and vectors as explained above. In the SECTORED TRANSITION and AUTO-SECTOR method, after the stroke is written in step 826, the decision is made in step 834 whether that stroke is the end of the logo and, if not, to return to the method selection step 804. In the VECTOR 3 method, step 832 directs the method back to step 822 wherein the transition values for the next stroke are calculated in step 824. At the end of the series of strokes encoded in the VECTOR 3 method suitable coding is provided within the stored data to indicate the end of that method at which time step 833 terminates the VECTOR 3 method.

Figure 10:
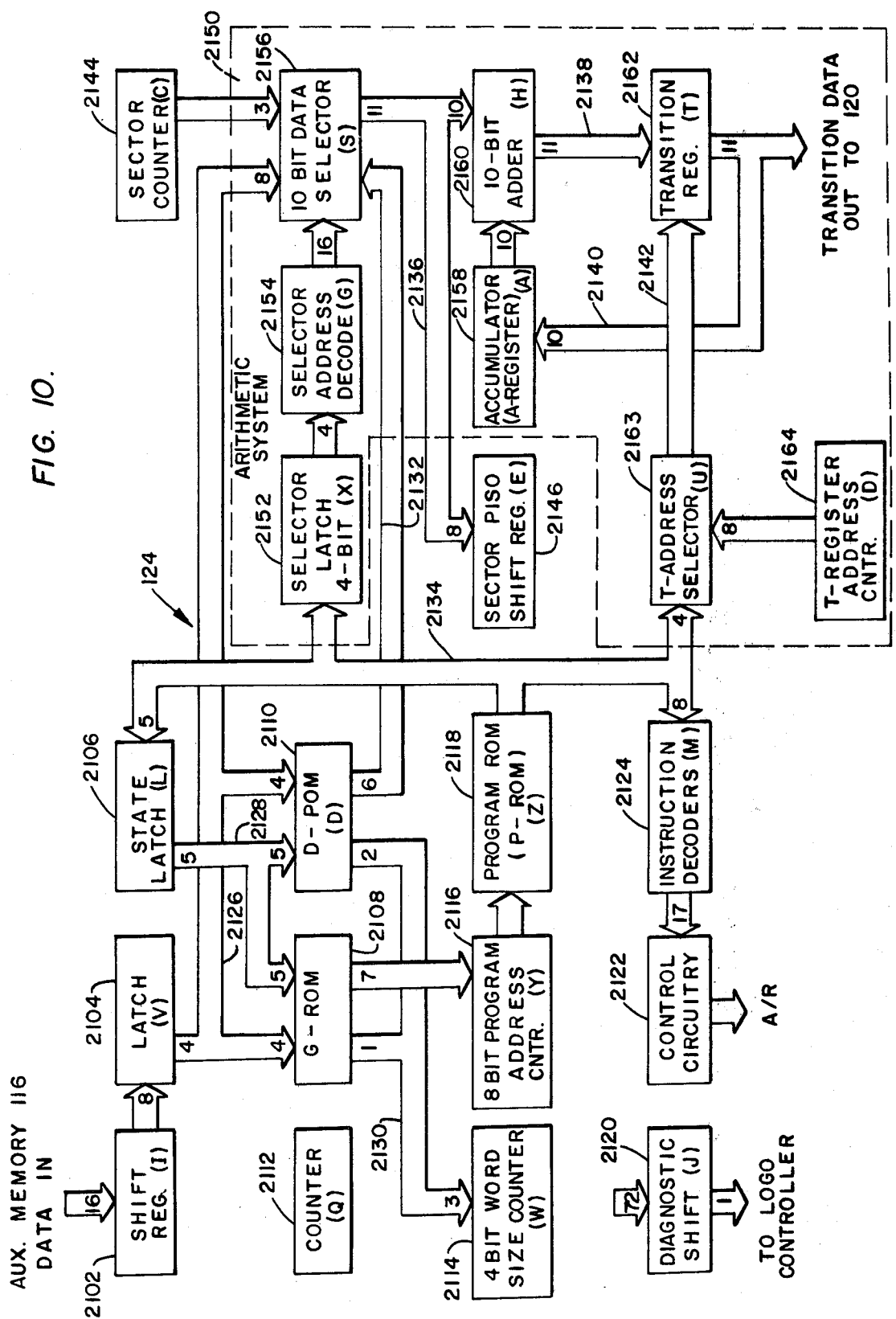
FIG. 10 is a functional block diagram of the logic circuitry for decompacting the data in accordance with the method as illustrated in FIG. 9.

Referring now to FIG. 10, there is shown a more detailed, block diagram of the logo processor 124 that functions generally to calculate the values of the transitions up to 240 per stroke before transmitting same to the X, Y scaling unit 120. As indicated in FIG. 5, data is derived from the auxiliary memory 116 and is applied to the parallel-in-serial-out (PISO) Register 2102. In general, the logo processor 124 is a combination state and program control system utilizing read only memories (ROMs), i.e., the G-ROM 2108 and the D-ROM 2110, and the Programmable ROM 2118 to store programs, program starting addresses, data words and input word lengths. The PISO 2102 shifts serial data that contains two, three, four, six, eight or nine bits to an eight bit latch 2104. The input words placed in latch 2104, as well as the data indicative of the present state as stored in the five bit state latch 2106, initiate the various processes of decompaction as carried out by the logo processor 124. In particular the following four processes are simultaneously carried out:

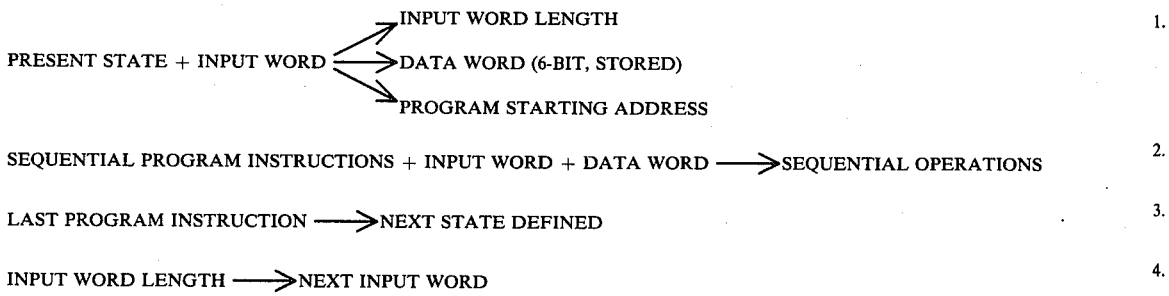

1. PRESENT STATE + INPUT WORD → INPUT WORD LENGTH / DATA WORD (6-BIT, STORED) / PROGRAM STARTING ADDRESS

2. SEQUENTIAL PROGRAM INSTRUCTIONS + INPUT WORD + DATA WORD ⟶ SEQUENTIAL OPERATIONS

3. LAST PROGRAM INSTRUCTION ⟶ NEXT STATE DEFINED

4. INPUT WORD LENGTH ⟶ NEXT INPUT WORD

These processes are effected simultaneously within the logo processor 124 in a manner which will become more evident from the further description.

First, the input word is derived via the auxiliary memory 116 and is shifted serially from the PISO 2102 to the latch 2104, wherein the input data word is stored. In process three above, the next state is placed within the state latch 2106 and serves to step the process from one operation or set of instructions to the next. Primarily the programs for calculating the transition values are stored in the programmable P-ROM 2118. In order to address the programmable ROM 2118, the state number and the value of the four least significant bits of the input words as respectively stored in the state latch 2106 and the latch 2104 are examined and applied via buss 2126 to an address or G-ROM 2108. In turn, the seven least significant bits of the output of the G-ROM 2108 define the starting address as applied via a program address counter 2116 to the operation within the P-ROM 2118. In addition, the most significant bit of the output of the G-ROM 2108 and the two most significant bits from the output of the D-ROM 2110 are applied to a word size counter 2114 to define the size of the word as received from the auxiliary memory 116, realizing that the size of the input words varies dependent upon the method of decompacting. Further, the data word to be used in the calculations as performed by an arithmetic unit 2150 is supplied from the D-ROM 2110 via the buss 2132. The starting address as derived from the G-ROM 2108 via the counter 2116 provides the first address of the operation comprising a series of instructions within the P-ROM 2118, the counter 2116 being incremented upon the execution of each instruction. After the word size has been established in the counter 2114, the next shift operation occurs to shift the next input word to the right within the PISO 2102; the shifting continuing for each shift until the counter 2112 counts to zero to thereby cause the auxiliary memory 116 to load the next word into the PISO 2102 before further shifting.

Upon receipt of a start or initiate signal from the logo magnetic disc controller 92, the logo processor 124 is reset to its zero state, i.e., the zero state is entered into the state latch 2106. The last instruction of each program operation is an instruction to end that operation and also to define the next state by entering an appropriate state word into the state latch 2106.

A sector counter 2144 and a sector shift register 2146 are used in the SECTORED TRANSITION method to generate transitions. In particular, the leading or sector word contains eight bits, as indicated above, which define in which of the eight 128-count sectors any transition occurs. To implement the SECTORED TRANSITION method, the sector word is analyzed to determine in which sector the next transition appears. In particular, the leading or initial sector word is transferred into the sector shift register 2146 via the PISO 2102, the latch 2104 and the data selector 2156. The ones in designated bits of the leading sector word indicate the position of these sectors in accordance with the following Table 9:

| BIT | SECTOR |
|---|---|
| 1 | 0-127 |
| 2 | 128-255 |
| 3 | 256-383 |
| 4 | 384-511 |
| 5 | 512-639 |
| 6 | 640-767 |
| 7 | 768-895 |
| 8 | 896-1023 |

The sector word is shifted within the shift register 2146 until the next one is reached thereby causing the sector counter to count one for each such shift. The initial orthogonal value along the y-axis of each sector is dependent upon the value of the sector counter 2144, i.e., its three most significant bits.

The arithmetic system indicated within dotted lines in FIG. 10 and identified by the numeral 2150, performs the various calculations to obtain the transition values to be transferred to the X, Y scaling unit 120 whereby the CRT light spot is turned on and off to reproduce the light and dark areas of the logo. The T register 2162, illustratively a Schottky 256×11 register, stores various eleven bit numbers required during the transition calculations and is allocated into two sections, a scratch area and a transition data area. The scratch locations are addressed by program instructions, as shown in FIGS. 12A to G, derived from the ROM 2118 via the bus 2134, a T address selector 2163 and a buss 2142. Transition data locations within the T register 2162 are addressed by a T register address counter 2164 through the T register address selector 2163. The register address counter 2164 is advanced one step by the logo controller 92 as the transition values are read out during the typesetting of the stroke. The T register 2162 is loaded from a ten bit adder 2160, which adds together two ten bit numbers, the first derived from an accumulator register 2158 and the second selected by a data selector 2156. The data words are applied to the arithmetic system 2154 from the D-ROM 2110 and, in particular, are applied to its data selector 2156. The output data of the P-ROM 2118 are applied via the buss 2134 to be stored within a selector latch 2152 which are in turn decoded by a selector address decoder 2154 to cause the data selector 2156 to select various data combinations are required from the input word as stored in the latch 2104, the sector count as derived from the sector counter 2144 or the data word as derived from the D-ROM 2110. The output of the P-ROM 2118 is also applied to an instruction decoder 2124, which activates a control circuit 2122 to effect transfer of data from various of the registers or latches of the logo processor 124, to various of the circuits of the arithmetic system 2150. For example, the input word as shifted to the L latch 2104 may be transferred via the bus 2126 to the ten bit data selector 2156.

From a review of FIGS. 12A to G, it is seen that the first column entitled "Start Address" indicates the initial address as set by the address counter 2116 and applied to the P-ROM 2118 to execute the corresponding instruction therein. Upon the execution of one instruction, the address counter 2116 advances by one, to address the next instruction within the stored program. In the next column, there is an indication of the operation number; each new operation number indicates a set of instructions. The mnemonic indicates a short abbreviation of the instruction meaning, while under the heading "instruction meaning" a more detailed description of the instruction is given. Underneath the heading "program instruction", there is an indication of the exact ROM output in terms of the binary zeros and ones that are read out and applied from the P-ROM 2118 via the buss 2134 to the arithmetic system 2150.

As described above, the operation of the logo processor 124 is dependent upon the state as set into the state latch 2106. As illustrated in FIG. 10, the five bit output from the state latch 2106 is applied to each of the G-ROM 2108 to influence the address of the next instruction within the P-ROM 2118 and also to the D-ROM 2110 to determine the data word to be acted upon by the arithmetic system 2150. More specifically, at the end of each set of instructions or operations, the last instruction terminates the particular operation and sets the state, i.e., a five bit word, to be disposed in the state latch 2106. FIG. 13 defines for each of the states zero to 31 the next operation to be processed as well as the data word to be read out from the D-ROM.

Thus, when the binary five bit word indicative of the state 19 is set into the five bit state latch 2106, the output from the G-ROM 2108 indicates that the first instruction corresponding to operation 17 is to be addressed within the P-ROM 2118. FIG. 13 thus defines the interconnection between each set of instructions or operations and the next set of instructions or operation.

The transition register 2162 includes two sections, first a scratch area having addresses zero to 15, and a transition data area having addresses 16 to 255. The scratch locations are addressed by the instructions derived from the P-ROM 2118 via the T address selector 2163, while the transition data area is addressed by the T register counter 2164 via the address selector 2163. The address counter 2164 is advanced one for each word of transition data that is written into the transition data area of the transition register 2162. Successive orthogonal values along the Y-axis of each transition are stored within successive locations beginning at address 16 within the T or transition register 2162. Generally, for most of the methods of compaction and decompaction, the incremental orthogonal values from one transition to the next are computed within the arithmetic section 2150 and are added to the previous transition value transferred from the transition register 2162 to the accumulator 2156 to be added to the transition or delta value produced by the ten bit adder 2160 to be stored then in the next location within the transition register 2162. Upon completion of the calculations of the orthogonal values of each of the transitions within a single stroke, a command is sent to the logo magnetic disk controller 92 to read out the transition value to be applied to the X, Y scaling unit 120 to control the blank-unblank controller 84, whereby the CRT spot light is successively turned on and off to write or expose successive sections of the stroke upon the light sensitive material 100.

FIGS. 12A to G show a listing of the instructions stored within the P-ROM 2118. A selector instruction (SEL) is made up of eight bits wherein the four least significant bits define a selector value from zero to 15, to be stored within the selector latch 2152, to be decoded by the decoder 2154 to determine which data is to be operated upon by the data selector 2156. As shown in FIG. 12A, for example, instruction 4 is a select instruction (SEL-1). In the corresponding instruction meaning, there is shown which bits of data are selected by the data selector 2156 to be applied to the adder 2160. The bits to be added are listed with the least significant bit on the left and the most significant bit on the right. For example, with regard to the instruction SEL-1, D-01 is the least significant bit whereas V-08 is the most significant bit. In this example, the four least significant bits are taken from the D-ROM 210, whereas the four most significant bits are derived from the V latch 2104 to be applied by the data selector 2156 to the adder 2160. A load instruction (LTT) causes the output of the adder 2160 to be loaded into a designated position of the T register 2162. The instruction (LTT) is made up of eight bits wherein the four least significant bits define a location of zero to 14 within the scratch area of the T register 2162. When the value of the four least significant bits is 15, the location for the adder output is defined by the T address counter 2164. A load from the accumulator register 2158 to the transition register 2162 instruction (LAT) is made up of eight bits wherein the four least significant bits define the location within the T register 2164 to which data is to be transferred. The final instruction EGS indicates that the particular operation is terminated and the state to which the process will enter. For example, instruction EGS (05) indicates that that operation has terminated and that the next state to be entered and to be placed into the state latch 2106 is the fifth state.

In an illustrative embodiment, the various elements as shown in block form in FIG. 10 are circuits per se well known in the art. For example, the parallel-in-series-out shift registers 2102 and 2146 may take the form of a "parallel load 8-bit shift register", as manufactured by Texas Instruments, Dallas, Tex., under their serial number 74165. The counters 2112, 2114, 2116, 2144, 2164 may illustratively take the form of a counter as manufactured by Texas Instruments under their serial number 74197. The latches 2104, 2106, 2152 may take the form of those latches as manufactured by Texas Instruments under their serial number 74174. The G-ROM 2108, the P-ROM 2118, and the D-ROM 2110 may take the form of a Schottky bi-polar ROM 3624 as manufactured by Intel. In addition, the accumulator register 2158 may take the form of that register as manufactured by Texas Instruments under their serial number 74174. The ten-bit adder 2160 may take the form of the adder as manufactured by Texas Instruments under their serial number 74283. The transition register may take the form of a 512×1 register as manufactured by Texas Instruments under their serial number 74S201. The address selector 2162 and the address decode circuit 2154 may illustratively take the form of a dual 4-bit selector circuit and a 3-to-8 line decoder as manufactured by Texas Instruments under their serial numbers 74153 and 7442A, respectively.

With respect to FIGS. 12A to G and 13, the steps as broadly shown in FIG. 9 for decompacting the data stored in the auxiliary memory 116 will be set out. In the initial or "0" operation, the first eight bits of data is shifted into the eight bit latch 2104. In particular, as seen in FIG. 10, the accumulator register 2158 is cleared and the address counter 2164 is set to 16 to identify the first location within the transition section of the T register 2162. At that point the initial operation is terminated and a binary word indicative of the first state is placed in the state latch 2106. As seen in FIG. 13, under the "go to operation" heading, state number 1 indicates that the process is to go to the operation number one. The operations 1 to 4, as shown in FIGS. 12A to G, correspond to the step 802 of FIG. 9. As a review of FIGS. 12A to G indicates, operations 1, 2, 3 and 4 load first the lower active area limit and then the upper active area limit into the first and second scratch locations 0 and 1 or the T register 2162. In instruction 19 of operation 4 there is a "Go to State 5", which state is loaded into the state latch 2106. Referring to FIG. 13, state 5 indicates that the next word input into the logo processor 124 is a four bit word, i.e., the program word that is associated with each method of decompaction and is shifted into the value latch 2104 to be interpreted by the G and D-ROMS 2108 and 2110 to select one of the seven methods of decompacting. As indicated in state 5 as shown in FIG. 13, the four bit value as entered into the value latch 2104 is decoded to indicate to which of operations 5 to 13 is to be selected dependent upon the method of decompaction chosen and coded by the program word. As seen in FIGS. 12A and B, operations 6 to 13 correspond respectively to the REPEAT method, the DELTA 2 method, the DELTA 3 method, the DELTA 4 method, the SECTORED TRANSITION method, the AUTO-SECTOR method, the VECTOR method, and finally to providing a control word. Each of these method operations initiate the decompaction of the data of that method.

Considering first the REPEAT method as generally implemented by steps 806 and 808 of FIG. 9, the process moves to operation 6 comprising instructions 24 wherein initially, an address counter 2164 points to the first location of the transition section of the T register 2162. Thereafter, in instruction 25, the process is transferred to state 6. Referring to FIG. 13, state 6 defines that the next operation to be commenced is operation 14, whose first instruction 68 is addressed by the address counter 2116. In instructions 68, 69, 70 and 71, the accumulator register 2158 is cleared and the data select instruction 69, SEL-1, transfers four bits of data from the D-ROM 2110 and four bits of data from the V latch 2104 to the data selector 2156. The repeat count word identifying the number of strokes to be repeated is an eight bit word and is transferred via V latch 2104 and the D-ROM 2110 to the data selector 2156. Thereafter, in instruction 70, the repeat count is loaded into a second location of the scratch area of the T register 2162. In the final instruction 71, the process is told to go to state 18 which, as defined in FIG. 13, is operation 15, i.e., the repeat countdown wherein the repeat number is decremented one by one as the CRT strokes the light spot until the countdown value reaches zero. In operation 15, instruction 72 loads the repeat count into the accumulator 2158 and instruction 73 loads all ones to the ten bit adder 2160 which effects a subtraction of one from the countdown value. Subsequently, the countdown value is reloaded into the second position of the scratch area of the T register 2162 as by step 74. Instruction 76 checks whether the stroke has been completed and, if not, the address counter 2164 points to the first location within the transition register 2162. At that point, a stroke ready flip-flop is set by instruction 78, whereby a signal is sent to the logo magnetic disk controller 92 to readout the transitions of that stroke from the T register and apply them to the X, Y scaling unit 120. Thereafter, the process is returned to state 18 and to the first instruction of operation 15. The countdown proceeds until the countdown value equals to zero at which time the jump instruction 76 jumps the process to instruction 80 to clear the address counter 2164. Thereafter, instructions 81 and 82 transfer the data from the transition register 2162 and return the process to state 5, wherein the G and D-ROMs 2108 and 2110 look for the next program word to identify the next method of data compacting and to direct the process to the corresponding one of the operations 6 through 13.

If the process selected is the DELTA 2 method, as generally shown in steps 810 and 812 of FIG. 9, the process moves to operation 7 and therefrom via state 7 to operation 16 which is defined by instructions 84 to 91, as shown in FIGS. 12A to G. Briefly, the next word to be shifted into the V latch 2104 is a two bit word defining the transition using a delta value from the previous transition, which is decoded by the D-ROM and added by the adder 2160 to the previous transition value as previously brought to the accumulator 2158 before being stored into the next location within the transition section of the T register 2162. This process continues until the last transition is called as detected by instruction 87, when a jump four instruction is given. As a result, the address counter 2164 goes to instruction 91, whereby operation 16 terminates and the process proceeds to operation 17 and state 19, wherein the transition values are transferred from the T register 2162 to the X, Y scaling unit 120. It is understood that in a similar fashion, operations 18 and 19 are transferred from states 8 and 9, respectively, and define the three and four bit words from which the transition or delta values of the next transition are calculated.

If the encoded P-word is interpreted in operation 5 to indicate that the SECTORED TRANSITION method is selected, state 10 is entered into the state latch 2106 and the process moves to operation 20 comprised of instructions 116 to 122. First, the accumulator register 2158 is cleared, and the eight bit lead word indicative of the active sectors in which transitions appear is transferred into the value latch 2104 and therefrom via the bus 2126 and the D-ROM 2110 to the sector shift register 2146. Next in instruction 121, the lower active area limit is loaded into the accumulator register 2158 before operation 20 is terminated to go state 11, whereby one of the operations 21 or 22 is chosen dependent upon whether the next transition occurs within the same sector to initiate operation 21, or whether the next transition occurs within the next active sector (as determined by the first sector word) to initiate operation 22. Bit one of the words following the sector word is indicative of the placement within a given sector of each transition and, if a one is present, an advance is made to the next active sector, and, if a zero is present, no advance is made. In operation 21, data from the value latch 2104, the D-ROM 2110 and the sector counter 2144 are applied by the data selector 2156 to the adder 2160 and added thereby to the active limit as previously stored in the accumulator register 2158, the accumulated value of that particular transition being directed to the next location within the transition section of the T register 2162. Thereafter, the process is returned to state 11 which again examines whether the next transition is within the same sector or whether a jump is required to the next active sector. If so, operation 22 is selected to effect the jump wherein in step 130, each of the sector shift register 2146 and the sector counter 2144 are incremented or clocked. In addition, the next word as loaded into the value latch 2104 and data selected from the D-ROM 2110 and the sector counter 2144 are applied by the data selector 2156 to be added by the adder 2160 with the lower active limit as previously supplied to the accumulator register 2158. In this manner, the next transition within the new sector is calculated. If in step 132 it is determined that this is the last transition, a jump four is made to instruction 136 wherein the process is transferred by state 19 to operation 17, and, as explained above, the transitions stored in successive locations of the transition register 2162 are transferred to the X, Y scaling unit 120.

If, in operation 5, the coded P-word is decoded to indicate the AUTO-SECTOR method of compacting, the process is transferred to operation 11, wherein the address counter 2164 is cleared to point to the first location within the transition section of the T register 2162. Next, the lower active limit is loaded into the first or zero location of the scratch area of the T register 21, before being added with all zeros and re-applied to the seventh or 06 address within the scratch area of the T register 2162. The 06 address is that location within the transition register where the jumps and vectors are accumulated to define a transition, before being stored within successive locations of the transition section of the transition register 2162. At that point instruction 52 is executed and the process is returned to state 12. As indicated in FIG. 13, the next four bit word is examined to transfer to one of operations 23, 24 or 25. If the next four bit word following the P-word as entered into the value latch 2104 is decoded to indicate a value between 0 and 11, the process is transferred to operation 23 as indicated by FIG. 13 (under the heading "Go to Operation Number"), wherein the value of the vector is determined and the delta or transition value is added to location 6 before being stored in the next location within the transition section of the T register 2162, as by instruction 143. Instruction 143 also increments the address counter 2164 to load the next transition value into the next area of the transition section of the T register 2162. Thereafter, the process is returned to state 12, to bring in the next four bit word to be evaluated.

If the next four bit word indicates that a jump of 12, 24 or 48 is to be made, the process is transferred to operation 24, as seen from FIG. 13. In operation 24, the value of the jump is applied via the data selector 2156 to the ten bit adder 2160 and added with the previous accumulation of jumps before being stored into the 06 address of the scratch portion of the T register 2162 and returned to state 12. As indicated above, a transition value is defined by one or more jumps and terminated by a vector. Thus, in operation 24 (and 25), jumps are calculated and are stored into the location 06 within the scratch area of the T register 2162, the final increment being defined by a vector that terminates in the transition.

Again returning to state 12, the process looks at the next four bit word and if interpreted to require a jump of 96, the process is transferred to operation 25, wherein the previous accumulated values of jumps within 06 of the scratch area of the T register 2162, is transferred to the accumulator register 2158. The data indicative of the jump of 96 is called by the data selector 2156 to be added by the adder 2160 with the previous accumulation of jumps derived from the accumulator register 2158. The resultant value is stored at the 06 address of the scratch area of the T register 2162. If the accumulated value of the previously occurring jumps is greater than the maximum orthogonal value, i.e., 1023 counts, the operation proceeds to state 19 to move to operation 17, wherein the data stored in the successive areas of the transition portion of the transition register 2162 are prepared to be read out and applied to the X, Y scaling unit 120. If the accumulated value of the jumps is less than 1024, the accumulated values of the jumps are transferred to the accumulator register 2158 and added with the data stored in the 01 address location of the scratch area of the T register 2162. If the accumulated value is greater than the count of 1024, the operation is transferred to state 19 to transfer the process to operation 17 to prepare the transition data to be read out. However, if the accumulated value of the jumps is less than 1024, the operation shifts to state 12 to evaluate the next four bit words in the AUTO-SECTOR method.

If in state 5 the P-word is encoded with a value 07 (see the value under heading "Go to Operation Number" of FIG. 13) the method transfers to operation 12 and the VECTOR 3 method. The next three bit word is transferred into the value latch 2104, and the address counter 2164 is set to indicate the first location within the transition section of the T register 2162; next, the lower active area limit is transferred from the 00 location to the 06 location of the scratch area of the T register 2162, before moving the process to state 13 wherein the first three bit word is examined. If decoded to have a value between 0 and 5, the process moves to operation 26; if evaluated to have a value of 6 the process moves to operation 27; and if evaluated to have a value of 7, the process moves to operation 28. As indicated in Table 6 above, the three bit word is valued between 0 and 5 to indicate that a vector length of 3 to 8, respectively, has been chosen, and operation 26 functions to define the next transition in accordance with the encoded value of the vector. In operation 26, the stroke in progress as stored in location 06 of the scratch area of the T register 2162 is transferred to the accumulator register 2158 and is added by adder 2160 with the count value in accordance with the selected length of the vector. Thereafter, the calculated value of the transition is placed into the next available location within the T register 2162 to define thereby the next transition.

If in state 13, operation 27 was chosen indicating that the next three bit word was to be evaluated, that three bit word is moved into the value latch 2104 and the process is moved to state 14. If the decoded value of the second three bit word is 0 to 4, the process moves to operation 26 and if decoded to be of a value of 5 to 7, the process moves to operation 29. Operation 26 has been explained above indicating that the calculated value of the vector defines the next transition point that is stored in the next available location within T register 2162. If the process moves to operation 29, one of three jumps 64, 128, 832 is encoded to be loaded into a temporary area having an address 06 within the scratch area of the T register 2162, by instruction 190. Next, the accumulated jumps are evaluated to see that they are less than 1024 as stored at the address location 01 of the scratch area of the T register 2162 and if greater, the process moves to state 20 wherein the transitions stored within the transition register 2162 are conveyed to X, Y scaling unit 120. If less than 1024, the accumulated strokes are added to the data derived from the scratch area and compared to determine whether less than 1024. If the accumulated jumps are less than 1024, the process moves back to state 13, wherein the next three bit word corresponding to the next transition is evaluated.

If, as detected in instruction 191 or 197, the accumulated value of the strokes is in excess of the upper limit, i.e., 1024, the process moves to state 20 and to operation 30 which prepares the transition register 2162 to transfer the stored transitions to the X, Y scaling unit. In operation 30, the accumulator register 2158 is cleared. Next, the set stroke ready flip-flop is set to cause the the transfer of data from the transition register 2162 to the X, Y scaling unit 120.

If, in state 13, the first three bit word is evaluated to indicate that the next word is a six bit word, the process is moved to operation 28 that directs the process to state 15, wherein an evaluation of the six bit word is made in accordance with the Table 8 above. In particular, if the six bit word is interpreted to have a value of 0 or 1, the process is moved to operation 32, if the six bit word is evaluated to have a value of 2, the process is moved to operation 33, a value of 3 to 12 to operation 34, and a value of 13 to 15 to operation 31. First, if the process is moved to operation 32, the accumulated jumps, if any, are placed in the accumulator register 2158 to be added with selected bits derived from the D-ROM 2118 and the value latch 2104 as indicated in instruction 221. If the V5 and V6 bits as derived from the value latch 2104 indicating that the decoded vector is a 64 or 65, a jump four instruction is given. However, if these values are not present, the decoded vector, i.e., one of 16, 17, 32, 34, 48 and 49, is added to the stroke in progress and is stored into the next available area within the transition section of the T register 2162, while incrementing the address counter 2164. At that point, the process is returned to state 13. If, however, the vector 64 or 65 is to be decoded, the above-identified jump by instruction 222 is made to instruction 226, wherein the six bits of the D-ROM are added to the lower active area limit and applied to the next available area within the transition section of the T register 2162, before going to state 13.

If, in state 15, the six bit word is decoded to be a 2, the process moves to operation 33 wherein the previous accumulation of jumps is applied to the accumulator register 2158 and data from the D-ROM 2118 and the value latch 2104 are applied to the data selector 2156. If the fifth and sixth bits of the six bit word as stored in the value latch 2104 are zero, indicating an end of the VECTOR 3 method, the process is transferred to state 22 whereby the data input from the auxiliary memory 116 is advanced to the next four bit boundary, noting that in the VECTOR 3 method word sizes of three and six are used. If V5 and V6 are not zero, the decoded value, i.e., one of 18, 34 or 50, of the vector from the first four bits of the D-ROM 2110 are added by the adder 2160 to be placed into the next available transition area within the transition register 2161, and the address counter 2164 is incremented before transferring back to state 13.

If, in state 15, the six bit word is decoded to indicate operation 34, one of the vectors 19 to 28, 35 to 44, and 51 to 60 may be decoded, or a jump 192 to 768 may be decoded (see Table 8 above). In particular, the stroke in progress is transferred to the accumulator register 2158 and data from the first four bits of the D-ROM 2110 and the V5 and V6 bits from the value latch 2410 are applied by the data selector 2156 to the adder 2160. In instruction 242, if V-05 and V-06 are zero indicating that a jump is to be decoded, a jump four occurs to instructions 246. If V-05 and V-06 are not both zero, indicating that a vector is to be decoded, the value of that vector is added to the stroke in progress and is stored in the next available location within the transition area of the T register 2162. At that point the process returns to state 13 to evaluate the next three bit word supplied from the auxiliary memory 116. If a jump is to be decoded, four bits from the D-ROM 2110 are applied by the data selector 2156 and are added with the stroke in progress to be reloaded into the location 06 within the scratch area of the T register 2162, indicating the accumulated value of jumps to that point. Again, the process returns to state 13. If, in state 15, the six bit word is decoded to indicate that a move is to be made to operation 31, the vectors 13 to 15, 29 to 31, 45 to 47, and 61 to 63 are to be decoded wherein the output of the D-ROM 2110 identifying the length of the decoded vectors is added to the stroke in progress and is placed in the next available location within the transition area of the transition register 2162 before returning to state 13.

If, in state 5, the first four bit P-word is evaluated as a 13, there is an indication that the next word to be received from the auxiliary memory 116 is a control word that can indicate no operation, end of logo, or no transitions, end of stroke. If so decoded, the process moves to operation 13 and therefrom to state 17. As seen in Table 11, the control word may be decoded to move to one of operations 35, 36, 37 and 38. Operation 35 is that operation that is called if an error is noted. If an error state is detected the process moves to operation 35 wherein various registers are set to indicate an error state and the end of logo flip-flop is set to bring the scanning operations of the cathode ray tube 24 to a halt. In operation 36, the word is interpreted to be no operation and the process is returned to state 5. In operation 37, there is an indication that an end of logo is to occur whereby the accumulator register 2156 is cleared and the end of logo flip-flop is set before returning to state 0. Operation 38 functions to effect the next stroke even though no transitions have been placed into the transition register 2162. In effect, the accumulator register, the address counter 2164, are cleared and the set stroke ready flip-flop is set before returning to state 5.

Figure 11B:
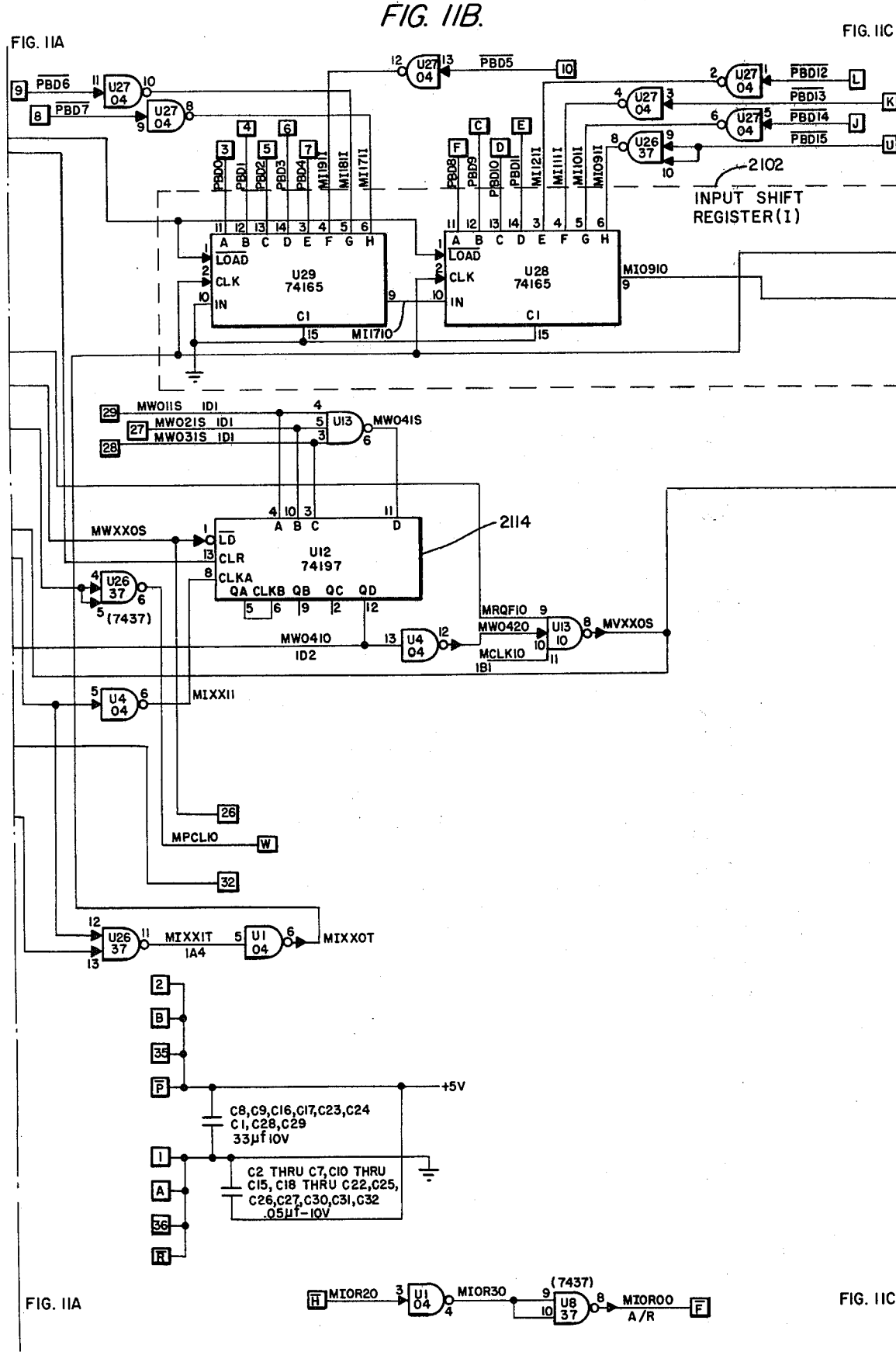
Figure 11C:
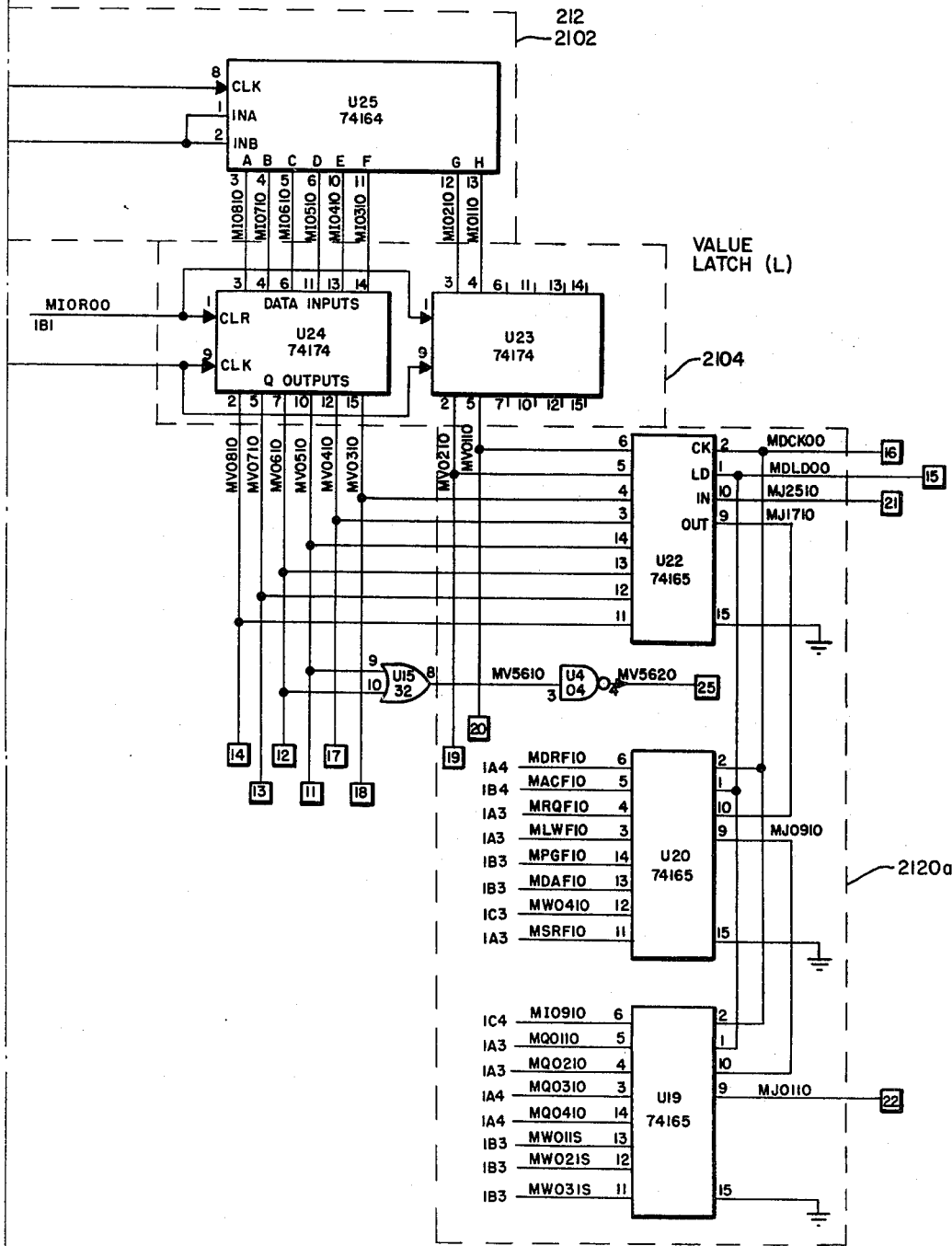
Figure 11D:
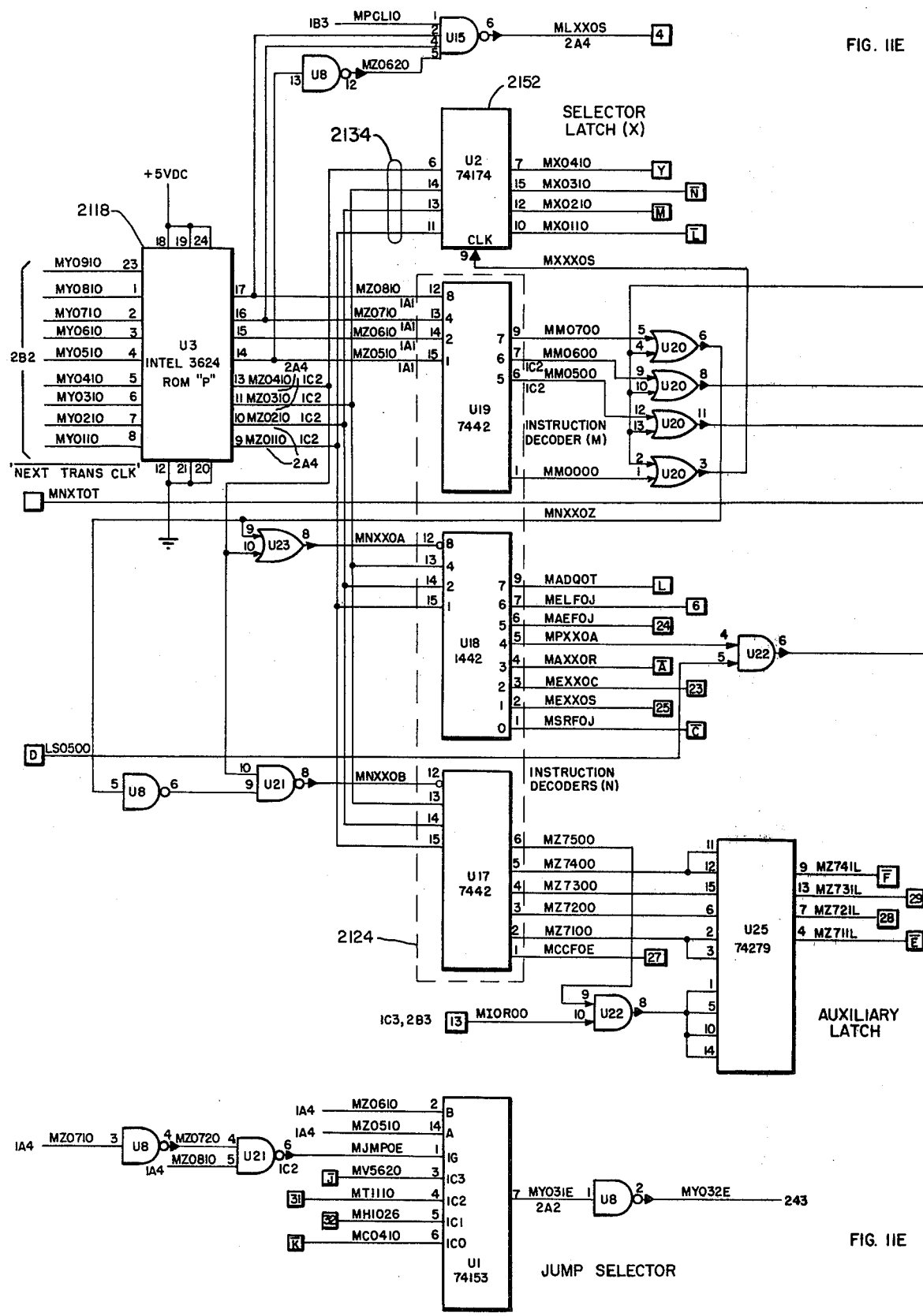
Figure 11F:
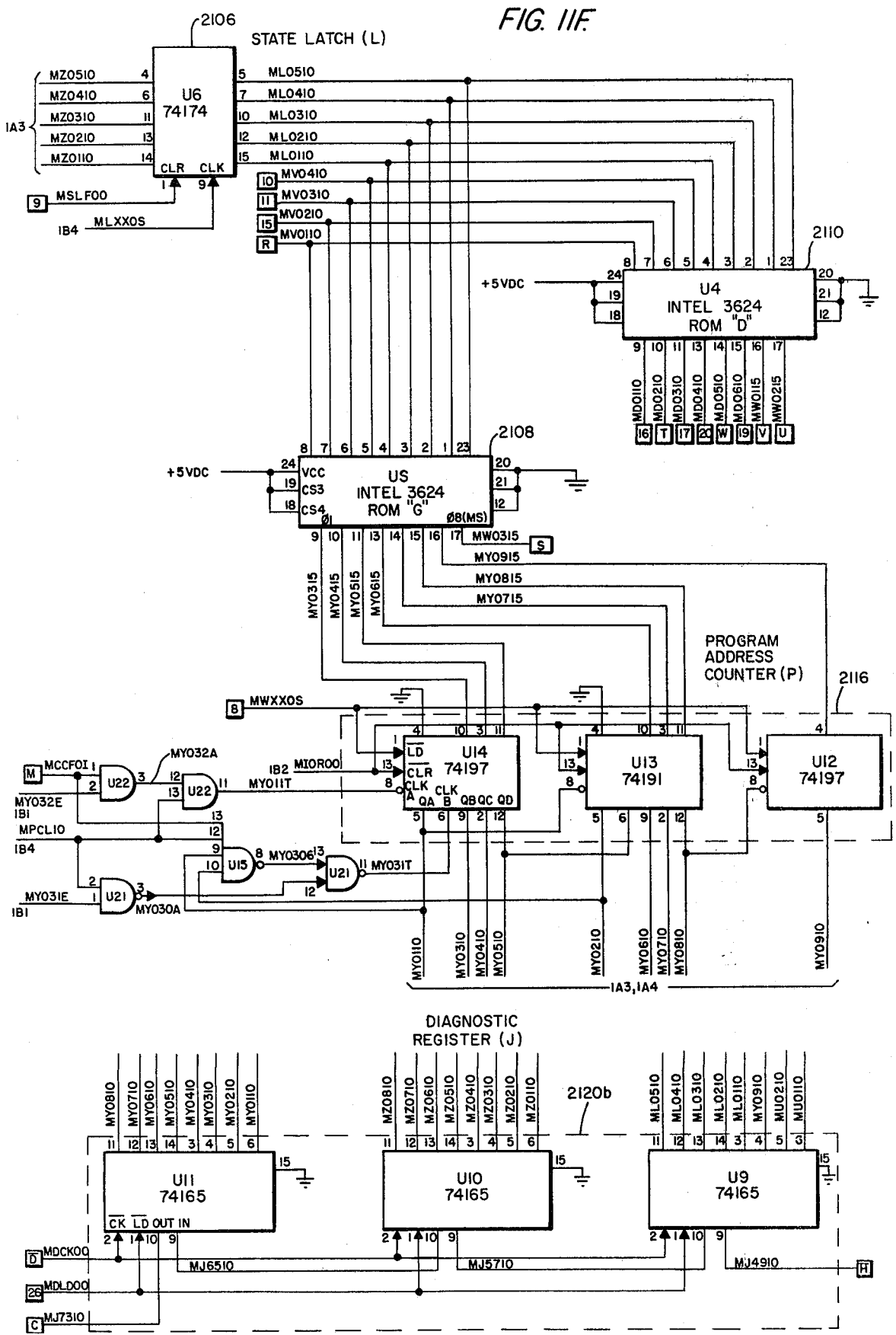
Figure 11G:
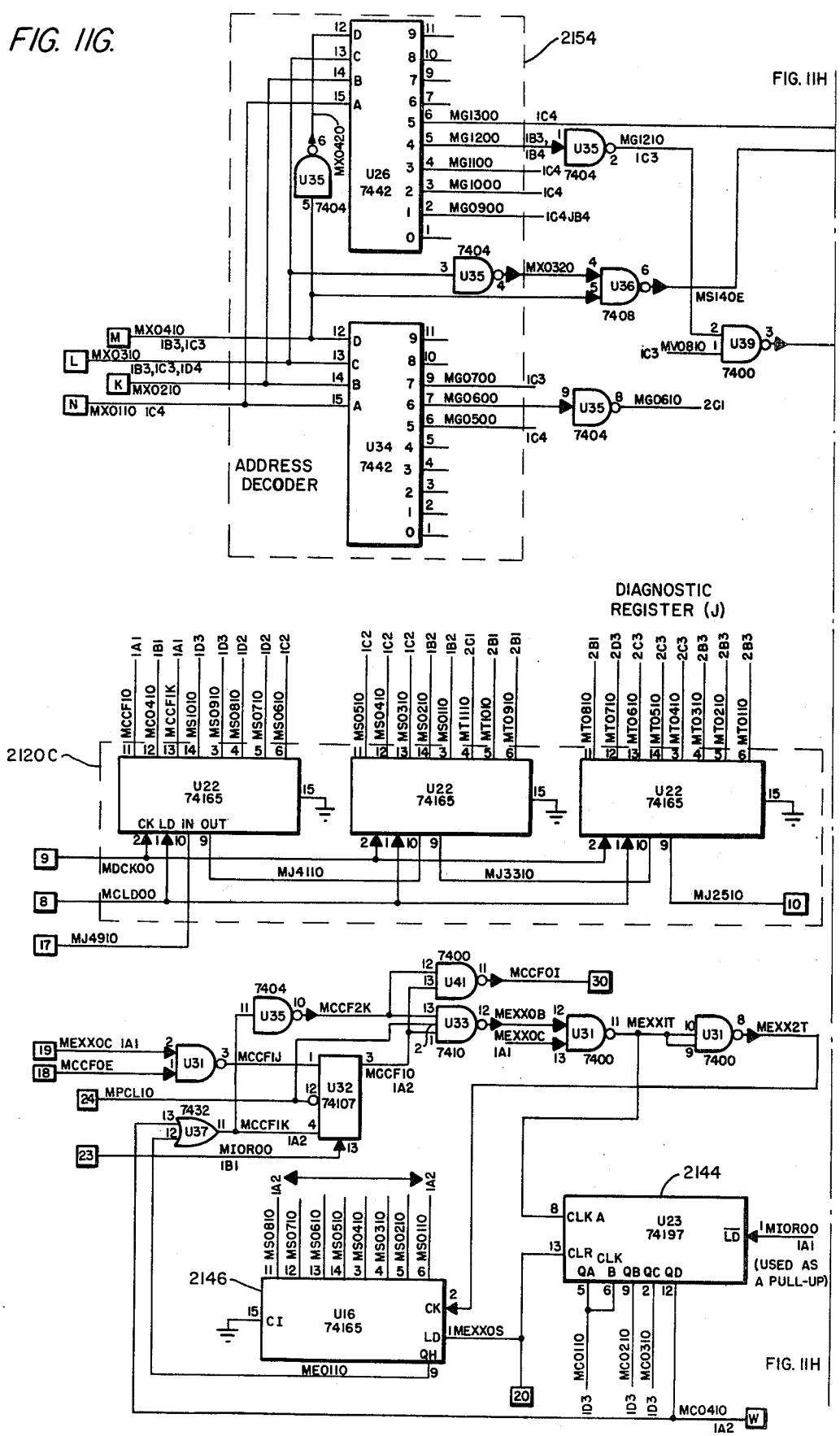
Figure 11I:
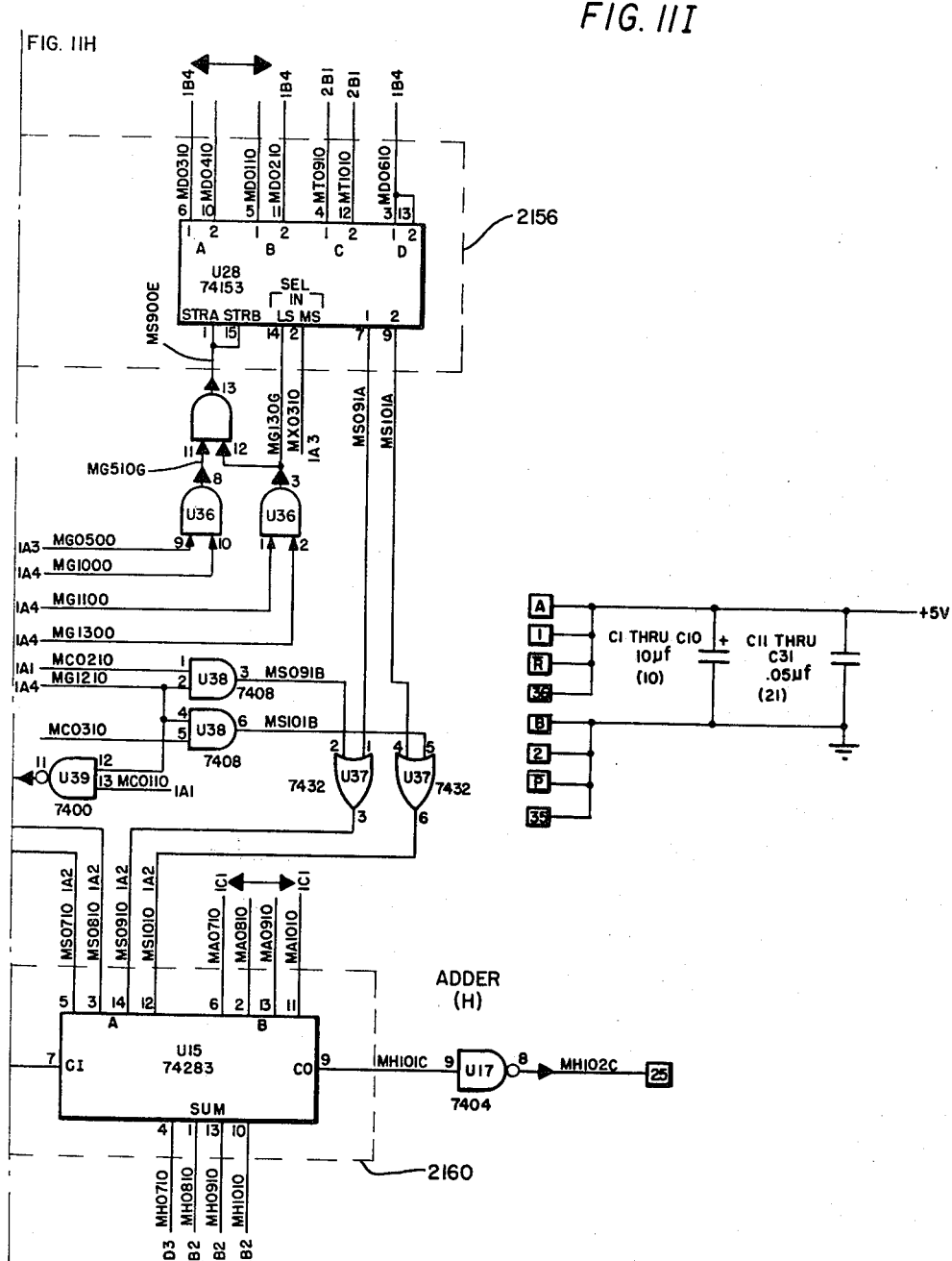
Figure 11J:
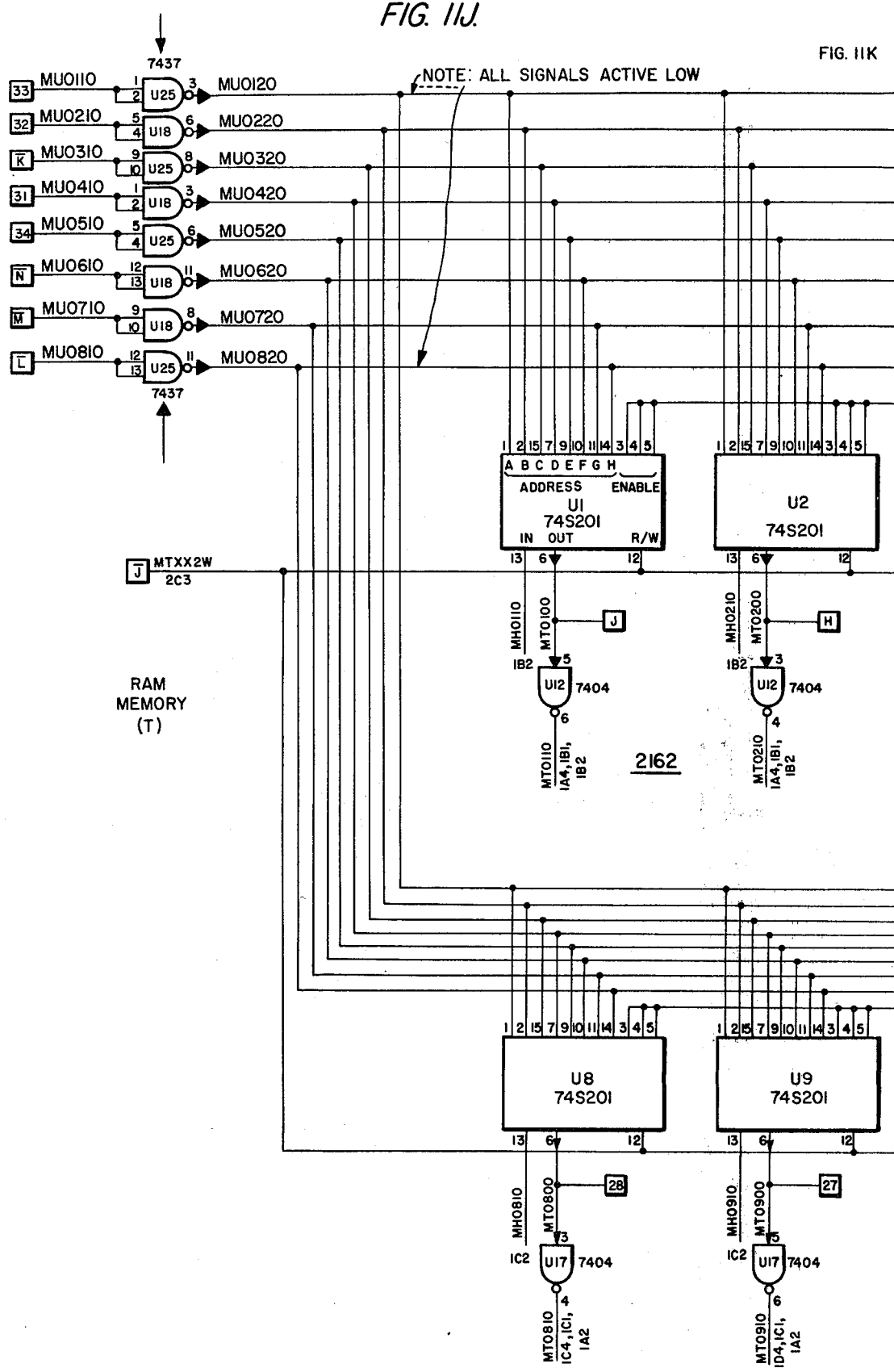
Figure 11K:
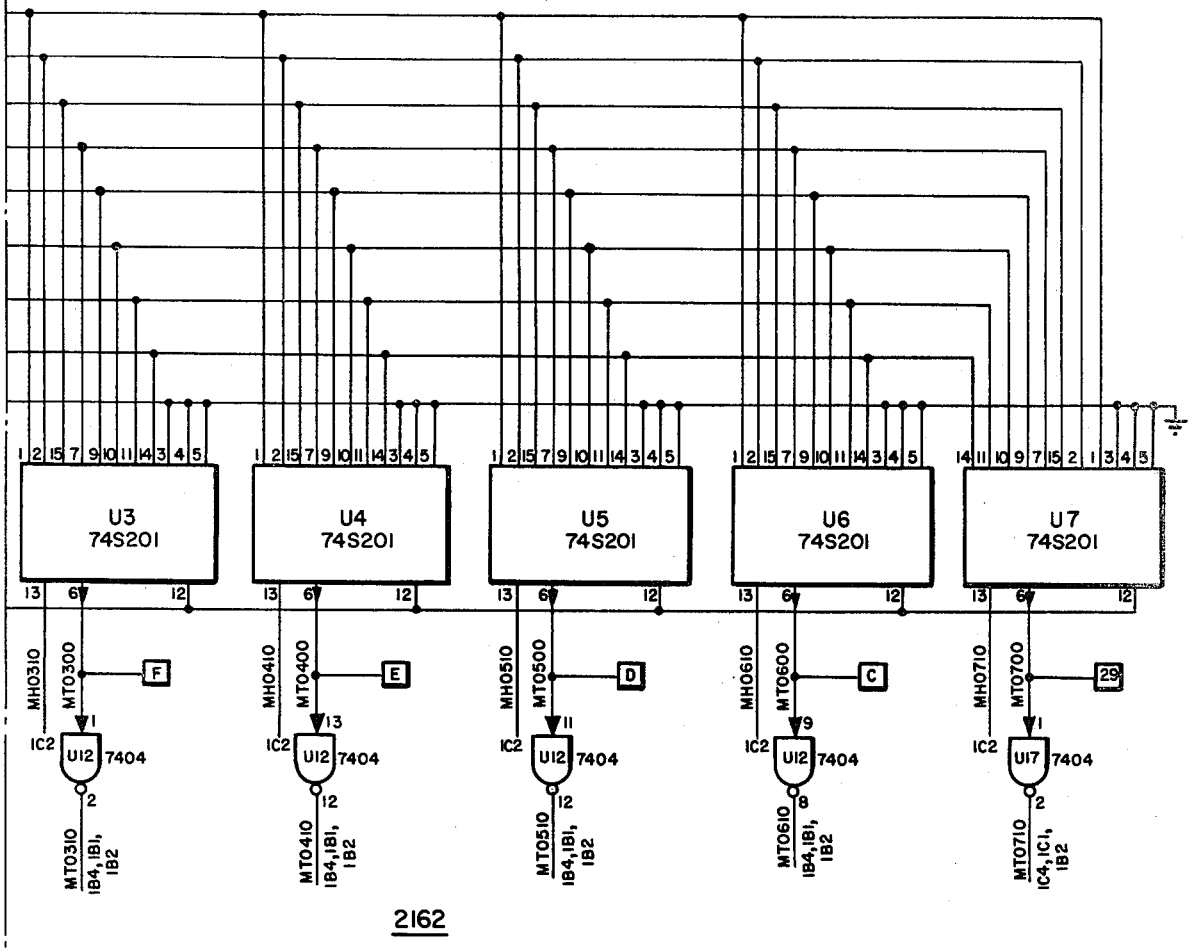
Figure 11K:
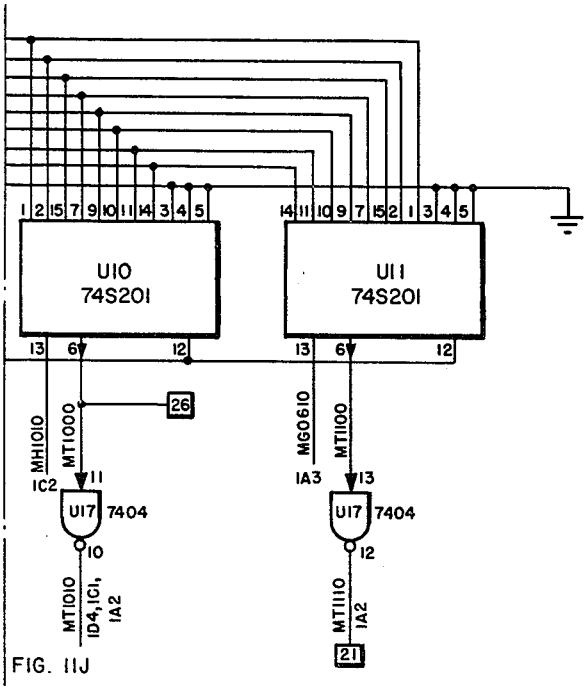

The logo processor 124, as shown in block diagram in FIG. 10, is shown in detail in FIGS. 11A-11J, wherein the particular elements making up a particular block is outlined and identified with a similar numeral. With respect to FIGS. 11A, B and C, the details of the input to the shift register (I) 2102 and the connection therefrom to the value latch 2104 are shown. Further, the interconnection between the word size counter 2114 and the remaining portion of the circuitry is shown. The output of the value latch 2104 is connected to the diagnostic shift register, a part of which is shown in FIG. 11C and identified by the numeral 2120a. The stroke ready flip-flop generally referred to above is shown in FIG. 11A and is identified by the numeral 2166. As indicated, the stroke ready flip-flop 2166 is a part of the control circuitry 2122, the details of which are shown in FIGS. 11A and B. In FIG. 11E, there is shown the program ROM 2118 and its connection via buss 2134 to the selector latch 2152, as well as its connection to the instruction decoders 2124. The output of the selector latch 2152 is applied to the address counter 2164 and therefrom to the T address selector 2163, as shown in FIG. 11E. In FIG. 11F, there is shown the state latch 2106 and its connection to each of the G-ROM 2108 and the D-ROM 2110. Further, there is shown the interconnection between the G-ROM and the program address counter 2116. A further portion of the diagnostic register J is shown in FIG. 11F and identified by the numeral 2120b. In FIGS. 11G, H and I, the address decoder 2154 is shown, as well as its connection to the adder selector 2156. The output of the selector 2156 is applied to the adder 2160. In addition, the sector counter 2144 is shown, as well as the A register 2158. Further, a further portion of the diagnostic register is shown in FIG. 11H and identified by the numeral 2120c. In FIGS. 11J and K, the plurality of memories comprising the transition register 2162, and their interconnection to the various other elements of the logo processor 124, are shown.

Thus, there has been described in detail above the apparatus for decompacting whereby a logo is scanned with a CRT light spot and the dark or opaque and light or transparent areas are evaluated to determine the point of transition therebetween. The points of transition identified in terms of their spacing from a lower limit are encoded in accordance with various criteria set out above to determine the optimum method for storing that data into a suitable storage medium such as a magnetic disc. Illustratively, as described above, any of seven methods may be selected. The data once stored may then be decompacted by a logo processor the apparatus and firm ware. To this end, a P-word or decoding word is evaluated to determine the decompaction method to be selected. The transitions are calculated and placed in an output or T-register to be transferred to the X, Y scaling unit to thereby control the turning on and turning off of a CRT.

Numerous changes may be made in the above-identified apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. An apparatus for providing a coded representation of a character comprising a plurality of substantially linear, adjacent zones, selected of said zones comprising one or more segments, each segment having a transition at each end thereof, the combination of:
   (a) means for providing signals indicative of the orthogonal positions of said transitions;
   (b) means for storing separately the transition signals of a first zone from the transition signals of a second zone adjacent to said first zone;
   (c) means coupled to said storing means for counting the transition signals of said first and second zones to provide first and second counts respectively, for comparing said first count of the number of transition signals in said first zone with respect to said second count of the number of transition signals in said second zone, and for selecting one of a plurality of methods of encoding which provides the smallest quantity of storable data indicative of the transitions of each of said zones dependent upon said comparison; and
   (d) means for encoding the transition signals of each of said zones into encoded data in accordance with the encoding method selected for said zone; said means for counting, comparing and selecting including means responsive to the first and second counts of transition signals in said first and second zones being unequal for examining the number and spacing of said transitions within a zone to select a first encoding method if there are a relatively small number of transitions within a single zone, to select a second encoding method if there are a large number of transitions within a single zone, and to select a third encoding method if there is a larger number of transitions than that required to initiate said second encoding method.

2. The combination of claim 1, wherein there is included means for setting a limit beyond which the transitions of said zones do not occur and for defining the orthogonal values of a transition with respect to said limit.

3. The combination of claim 1, wherein said examining and selecting means comprises means for providing an encoded signal indicative of which of said plurality of methods of encoding has been chosen and for storing same within said first-mentioned storing means.

4. The combination as claimed in claim 1, wherein said counting, comparing and selecting means comprises means for determining whether the first count of transition signals of said first zone equals the second count of transitions of said second zone, and providing a first manifestation if equal.

5. The combination as claimed in claim 4, wherein said examining and selecting means further comprises means for determining whether the orthogonal values of said transition signals of said first and second zones are equal and for providing a second manifestation if equal.

6. The combination as claimed in claim 5, wherein said examining and selecting means comprises first initiating means responsive to the first and second manifestations for initiating a REPEAT method of encoding and said encoding means comprising means for counting the number of adjacent zones in which the orthogonal values of said transition signals are equal for providing a third manifestation indicative thereof.

7. The combination as claimed in claim 6, wherein said examining and selecting means comprises second initiating means responsive to the first manifestation and to the absence of the second manifestation for initiating a DELTA method of encoding and said encoding means comprises means for determining the differences between the orthogonal values of like transition signals of said first and second zones.

8. The combination as claimed in claim 7, wherein said encoding means comprises means responsive to the magnitude of the differences of orthogonal values of like transition signals of said first and second zones for encoding a binary word indicative of said difference, the binary word having a differing number of bits dependent upon the magnitude of said difference.

9. The combination as claimed in claim 4, wherein said selecting means includes initiating means responsive to the absence of said first manifestation for indicating that one of a further plurality of encoding methods is to be selected.

10. The combination as claimed in claim 9, wherein said initiating means determines the quantity of the encoded data required for compacting each of said first, second and third encoding methods and selects that encoding method providing the smallest quantity of encoded data.

11. The combination as claimed in claim 10, wherein said encoding means comprises first means for encoding the orthogonal values of the transition in accordance with said encoding method in response to said initiating means, said zone of said character being divided into a plurality of defined sectors, said first encoding means for determining the placement of the transitions within designated of said sectors and for providing a first coded signal indicative of the sectors in which said transitions appear, and second means for providing one or more second coded words each indicative of the orthogonal value of a transition within its defined sector.

12. The combination as claimed in claim 10, wherein said encoding means comprises second means for dividing the difference between the orthogonal value of a transition and the orthogonal value of the previous transition within a segment into one of a plurality of defined vectors, each vector terminating at its corresponding transition, and means for determining whether the value of said difference is greater than any of said plurality of vectors and if so, for defining at least one of a plurality of defined jumps, said difference being defined in such instance by the sum of its jump, if any, and its vector.

13. The combination of claim 12, wherein said encoding means comprises third means for encoding a first set of predetermined jumps and a first set of predetermined vectors, each with a first coded word of a first number of bits.

14. The combination of claim 13, wherein said encoding means comprises fourth means for encoding a second set of vectors with a word of a second number of bits, said second word indicating whether a third or fourth code word is required to decode the transition value.

15. The combination of claim 14, wherein said fourth means for encoding provides the third code word if a vector or jump is within a third set of vectors or third set of jumps, and provides said fourth code word if the vector or jump is within a fourth set of vectors or fourth set of jumps.

16. The combination of claim 15, wherein said initiating means counts the number of bits as encoded by said third and fourth encoding means for determining which encoding means provides the least number of bits of compacted data and selects that method to store the compacted data by that method in said first-mentioned storing means.

17. A method of coding representations of a character comprising a plurality of substantially linear adjacent zones, selected of said zones comprising one or more segments, each segment having a transition at each end thereof, the method comprising the steps of:
 (a) determining the orthogonal positions of each of said transitions of a first segment and of a second segment within adjacent corresponding first and second zones respectively;
 (b) counting the transition signals of said first and second segments as to provide first and second counts of the numbers of said transitions of said first and second zones respectively, and by determining whether the first count is equal to the second count to provide a first manifestation if equal;
 (c) selecting in response to said first manifestation one of a plurality of methods of encoding which provides the smallest quantity of character data indicative of the transition of each of said first and second segments; and
 (d) encoding the positions of each of said first and second segments in accordance with the selected encoding method to provide encoded data indicative thereof; said step of selecting including determining the number and spacing of said transitions within a zone for selecting a first encoding method if there is a relatively small number of transitions within a single zone, for selecting a second encoding method if there is a relatively large number of transitions within a single zone, and for selecting a third encoding method if there is a larger number of transitions than that required to initiate said second encoding method.

18. The method as claimed in claim 17, wherein the step of encoding includes determining the magnitude of the differences of orthogonal values of like transitions of said first and second zones and for encoding a binary word indicative of said difference, the binary word having a differing number of bits dependent upon the magnitude of such differences.

19. The method as claimed in claim 17, wherein the step of selecting includes responding to the absence of said first manifestation for indicating that one of a further plurality of encoding methods is to be selected.

20. The method as claimed in claim 17, wherein there is included the step of setting a limit beyond which the transitions in each of said zones do not occur and for defining the orthogonal values of a transition with respect to said limit.

21. The method as claimed in claim 17, wherein said step of selecting includes providing and storing an encoded signal indicative of which of said plurality of methods of encoding has been chosen.

22. The method as claimed in claim 17, wherein the step of selecting includes determining whether the orthogonal values of the transitions of said first and second zones are equal and for providing a second manifestation if equal.

23. The method as claimed in claim 22, wherein the step of selecting includes responding to the first and second manifestations to initiate a REPEAT method of encoding and said step of encoding includes counting the number of adjacent zones in which the orthogonal values of the transitions are equal for providing a third manifestation thereof.

24. The method as claimed in claim 22, wherein the step of selecting includes responding to the first manifestation and to the absence of the second manifestation to initiate a DELTA method of compacting, and the step of encoding includes determining the differences between the orthogonal values of like transitions of said first and second zones.

25. The method as claimed in claim 17, wherein the step of encoding includes determining the quantity of the encoded data required for compacting each of said first, second and third encoding methods and selecting that encoding method providing the smallest quantity of encoded data.

26. The method as claimed in claim 25, wherein the step of encoding the orthogonal values in accordance with the first encoding method includes dividing said first segment into a plurality of defined sectors, determining the placement of the transitions within designated of said sectors and providing a first coded signal indicative of the sectors in which said transitions appear, and providing one or more second coded words each indicative of the orthogonal value of a transition within its defined sector.

27. The method as claimed in claim 25, wherein the step of encoding includes the steps of dividing the difference between the orthogonal values of a transition and the orthogonal value of the previous transition within a segment into one of a plurality of defined vectors, each vector terminating at its corresponding transition, and determining whether the value of said difference is greater than any of said plurality of vectors and if so, defining at least one of a plurality of defined jumps, said difference being defined in such instance by the sum of its jump, if any, and its vector.

28. The method as claimed in claim 25, wherein the step of encoding includes the step of encoding a first set of predetermined jumps and a first set of predetermined vectors, each with a first coded word of a first number of bits and defining each transition within one of said zones by a selected combination of said predetermined jumps and said predetermined vectors.

29. The method as claimed in claim 28, wherein the step of encoding includes the step of encoding a second set of vectors with a word of a second number of bits, said second word indicating whether a third or fourth code word is required to encode the transition value.

30. The method as claimed in claim 29, wherein the step of encoding includes the step of providing the third code word if a vector or jump is within a third set of vectors or third set of jumps, and of providing said fourth code word if the vector or jump is within a fourth set of vectors or fourth set of jumps.

31. The method as claimed in claim 30, wherein the step of encoding includes counting the number of bits of the second, third and fourth code words for determining which of the methods of encoding provides the least number of bits of compacted data and selecting that method to encode the encoded data.

32. A method of forming a character upon a photosensitive medium, the character comprising a plurality of substantially linear, adjacent zones, selected of said zones comprising one or more segments, each segment having a transition at each end thereof, the method comprising the steps of:
- (a) examining the character to count the numbers of transitions within adjacent zones of the character to provide first and second counts indicative thereof, and to compare the first and second counts of the numbers of transitions;
- (b) determining whether the first and second counts are equal or unequal and, if unequal, encoding said characer data in a first encoding method if there are a relatively small number of transitions within a single zone, encoding said character data in a second encoding method if there are a relatively large number of transitions within a single zone, and encoding said character data in a third encoding mode if there is a larger number of transitions than that required to initiate said second encoding method;
- (c) encoding data indicative of said character in accordance with a selected one of a plurality of encoding methods dependent on said comparison of the first and second counts to ensure that the smallest quantity of image data results, the character data including a code signal indicative of said selected encoding method;
- (d) examining the code signal and decompacting the encoded data in accordance with the code signal; and
- (e) scanning the light beam across said photosensitive medium, while turning on and off the light beam at said transitions to thereby reproduce said character upon said photosensitive medium.

* * * * *